(12) United States Patent
Kurobe et al.

(10) Patent No.: US 6,389,073 B1
(45) Date of Patent: May 14, 2002

(54) CODING CONTROL METHOD, CODING CONTROL APPARATUS AND STORAGE MEDIUM CONTAINING CODING CONTROL PROGRAM

(75) Inventors: Akio Kurobe, Tondabayashi; Shoichi Masaki, Katano, both of (JP)

(73) Assignee: Matsushita Electric Industrial Co. LTD, Osaka-fu (JP)

( * ) Notice: Subject to any disclaimer, the term of this patent is extended or adjusted under 35 U.S.C. 154(b) by 0 days.

(21) Appl. No.: 09/287,337

(22) Filed: Apr. 7, 1999

(30) Foreign Application Priority Data

| Apr. 7, 1998 | (JP) | .......................................... | 10-094305 |
| Apr. 7, 1998 | (JP) | .......................................... | 10-094307 |

(51) Int. Cl.$^7$ ................................................ H04N 7/50
(52) U.S. Cl. ............................ 375/240.03; 375/240.05; 375/240.08
(58) Field of Search ....................... 375/240.03, 240.04, 375/240.05, 240.08

(56) References Cited

U.S. PATENT DOCUMENTS

| 5,150,208 A | | 9/1992 | Otaka et al. | ............. | 348/420.1 |
| 5,410,352 A | | 4/1995 | Watanabe | ............. | 375/240.03 |
| 5,956,430 A | * | 9/1999 | Kunitake et al. | ...... | 375/240.03 |
| 6,157,741 A | * | 12/2000 | Abe et al. | ............. | 375/240.08 |

FOREIGN PATENT DOCUMENTS

| JP | 62-262590 | 11/1987 |
| JP | 4-57489 | 2/1992 |
| JP | 4-156794 | 5/1992 |
| JP | 5-252403 | 9/1993 |
| JP | 5-252535 | 9/1993 |
| JP | 5-344493 | 12/1993 |
| JP | 7-107482 | 4/1995 |

OTHER PUBLICATIONS

Patent Abstracts of Japan, publication No. 63232691, dated Sep. 28, 1988.
Patent Abstracts of Japan, publication No. 06078282, dated Mar. 18, 1994.
Patent Abstracts of Japan, publication No. 03190482, dated Aug. 20, 1991.
Patent Abstracts of Japan, publication No. 08280031, dated Oct. 22, 1996.
Patent Abstracts of Japan, publication No. 10200898, dated Jul. 31, 1998.
"A Study on Low Delay Interframe Prediction Coding" D–162 (1992) Senda et al.

* cited by examiner

Primary Examiner—Howard Britton
(74) Attorney, Agent, or Firm—Wenderoth, Lind & Ponack, L.L.P.

(57) ABSTRACT

In a coding control apparatus deciding, when coding of motion picture data on the basis of a generated information amount Aig of coded data generated by coding one frame, a quantization characteristic to be used for coding a next frame, a threshold comparison part compares the generated information amount Aig with upper bound and lower bound thresholds Th_U and Th_L, and on the basis of the comparison result, a quantization characteristic decision part decides the quantization characteristic to be used for coding the next frame. In other words, the quantization characteristic decision part divides each frame of the motion picture data previously into a plurality of areas and classifies the plurality of areas in each frame into a first group and a second group, and sets, in response to the aforementioned comparison result, the same quantization characteristic for the first and second groups, or sets one of most approximate two different quantization characteristics for the first group and the other one for the second group respectively. Due to such a structure, a quantization state corresponding to the average quantization characteristic of most approximate two quantization characteristics q(s) and q(s+1) can be created, whereby precision of coding control improves.

43 Claims, 32 Drawing Sheets

Fig. 4

(1) CASE OF MAKING STATE TRANSITION IN DIRECTION IMPROVING PICTURE QUALITY

| GOB1:QUANT5 | GOB2:QUANT5 |
|---|---|
| GOB3:QUANT5 | GOB4:QUANT5 |
| GOB5:QUANT5 | GOB6:QUANT5 |
| GOB7:QUANT5 | GOB8:QUANT5 |
| GOB9:QUANT5 | GOB10:QUANT5 |
| GOB11:QUANT5 | GOB12:QUANT5 |

CODING CONTROL STATE 1

Aig<Th_L →

| GOB1:QUANT4 | GOB2:QUANT5 |
|---|---|
| GOB3:QUANT4 | GOB4:QUANT4 |
| GOB5:QUANT4 | GOB6:QUANT4 |
| GOB7:QUANT4 | GOB8:QUANT4 |
| GOB9:QUANT4 | GOB10:QUANT4 |
| GOB11:QUANT4 | GOB12:QUANT4 |

CODING CONTROL STATE 2

Aig<Th_L →

| GOB1:QUANT4 | GOB2:QUANT4 |
|---|---|
| GOB3:QUANT4 | GOB4:QUANT4 |
| GOB5:QUANT4 | GOB6:QUANT4 |
| GOB7:QUANT4 | GOB8:QUANT4 |
| GOB9:QUANT4 | GOB10:QUANT4 |
| GOB11:QUANT4 | GOB12:QUANT4 |

CODING CONTROL STATE 1

(2) CASE OF MAKING STATE TRANSITION IN DIRECTION DETERIORATING PICTURE QUALITY

| GOB1:QUANT5 | GOB2:QUANT5 |
|---|---|
| GOB3:QUANT5 | GOB4:QUANT5 |
| GOB5:QUANT5 | GOB6:QUANT5 |
| GOB7:QUANT5 | GOB8:QUANT5 |
| GOB9:QUANT5 | GOB10:QUANT5 |
| GOB11:QUANT5 | GOB12:QUANT5 |

CODING CONTROL STATE 1

Aig>Th_U →

| GOB1:QUANT4 | GOB2:QUANT4 |
|---|---|
| GOB3:QUANT4 | GOB4:QUANT4 |
| GOB5:QUANT4 | GOB6:QUANT4 |
| GOB7:QUANT4 | GOB8:QUANT4 |
| GOB9:QUANT4 | GOB10:QUANT4 |
| GOB11:QUANT4 | GOB12:QUANT4 |

CODING CONTROL STATE 2

Aig>Th_U →

| GOB1:QUANT3 | GOB2:QUANT3 |
|---|---|
| GOB3:QUANT3 | GOB4:QUANT3 |
| GOB5:QUANT3 | GOB6:QUANT3 |
| GOB7:QUANT3 | GOB8:QUANT3 |
| GOB9:QUANT3 | GOB10:QUANT3 |
| GOB11:QUANT3 | GOB12:QUANT3 |

CODING CONTROL STATE 2

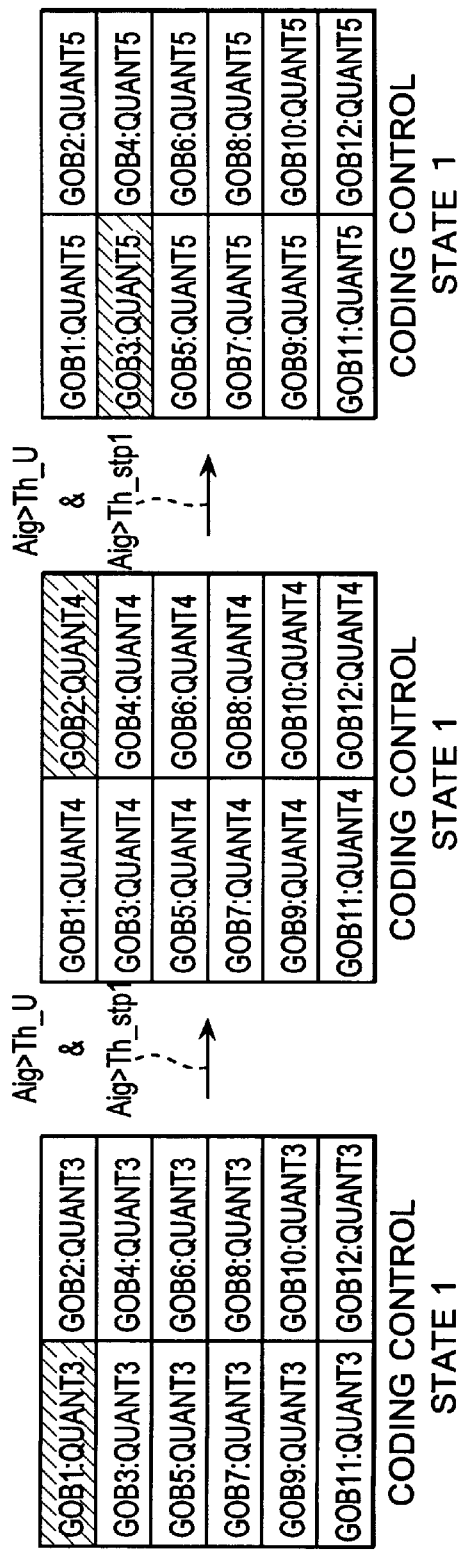
Fig. 5

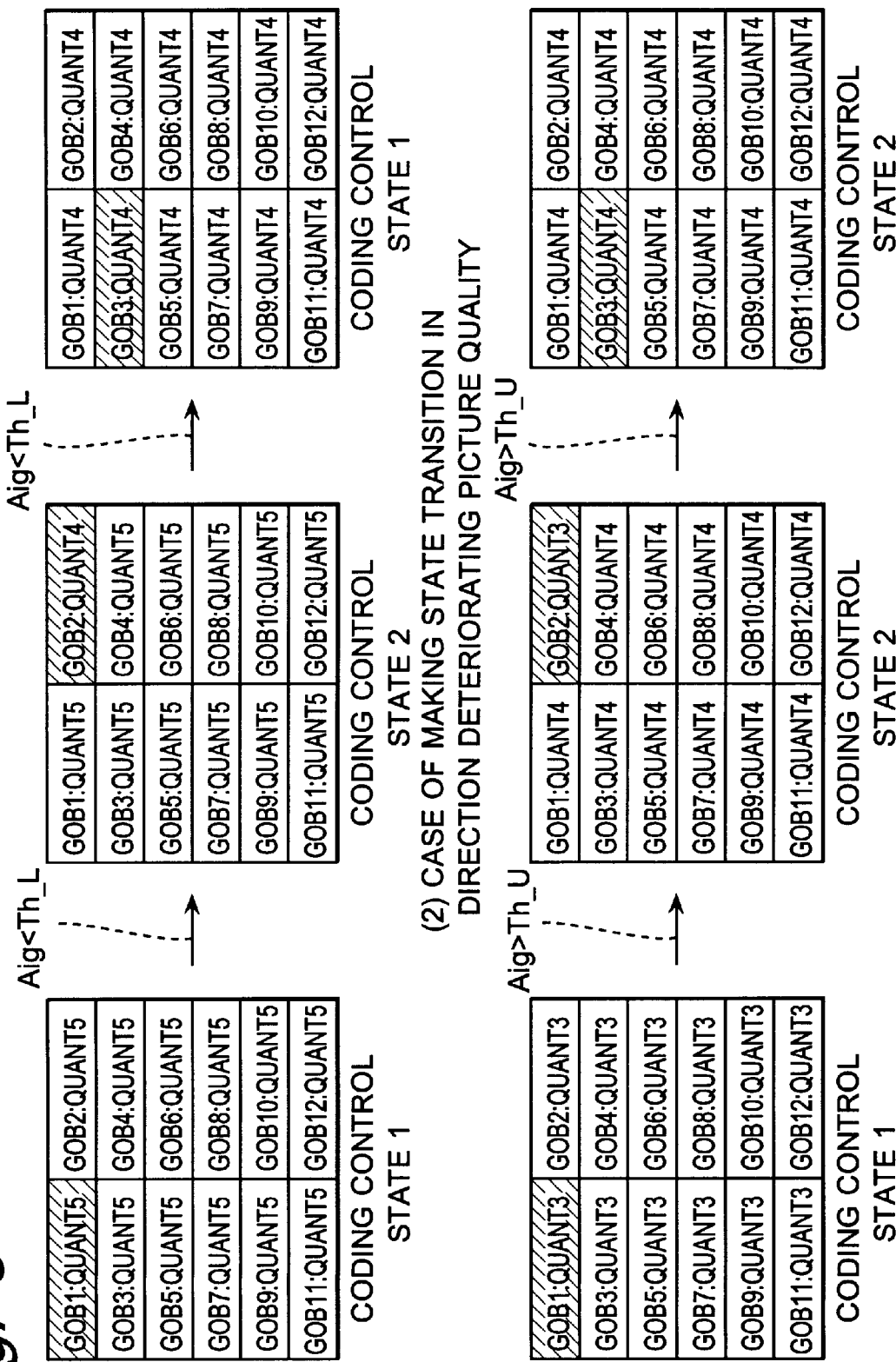

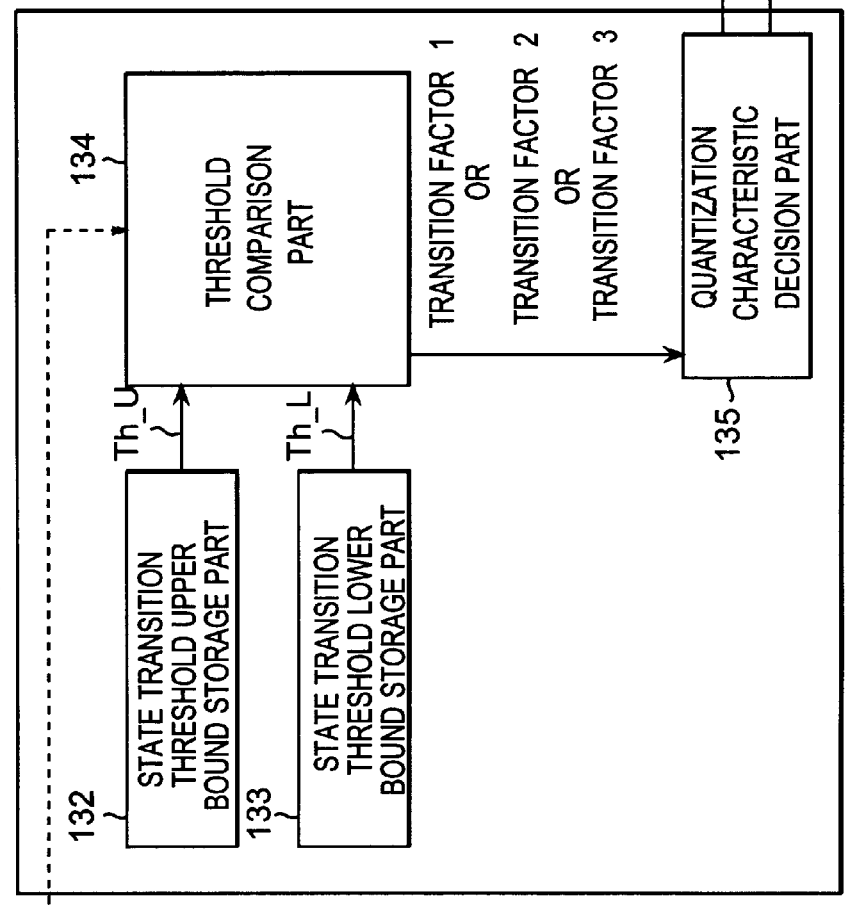

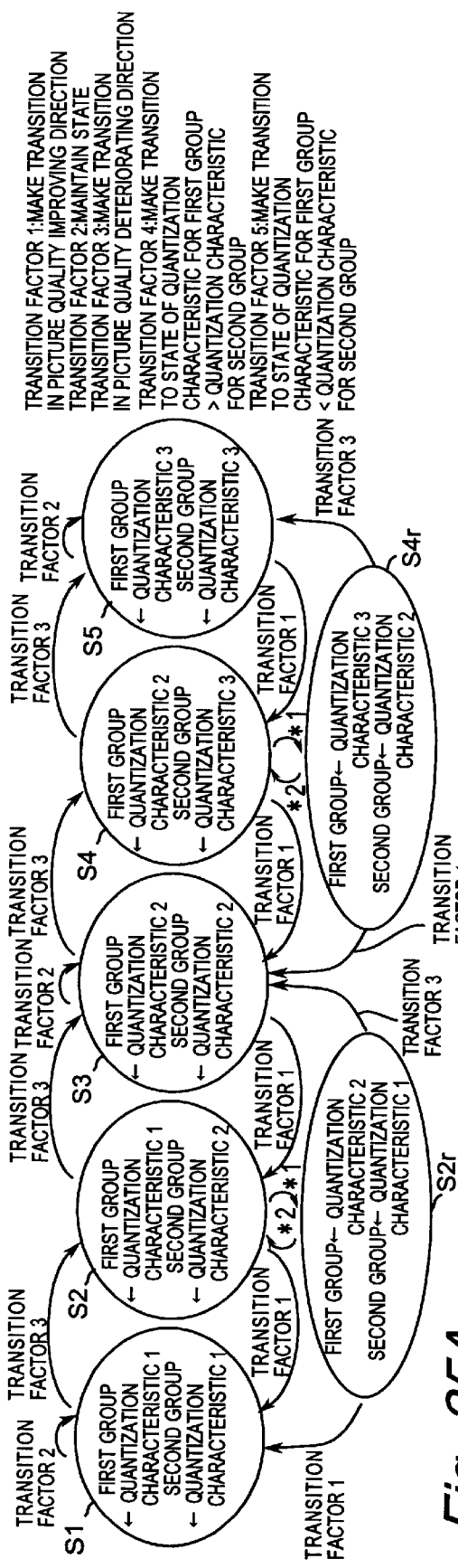
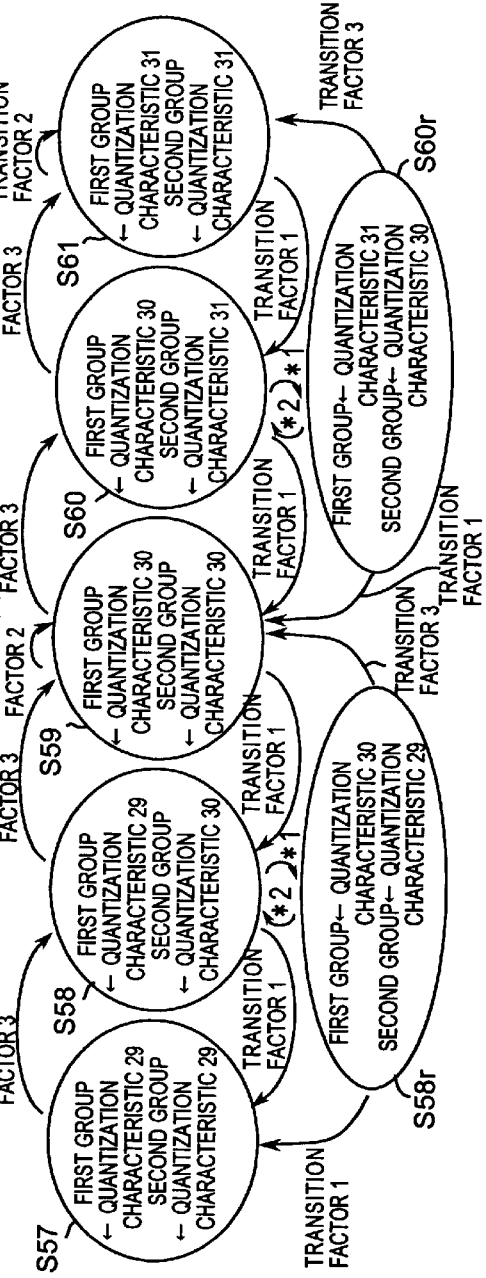
Fig. 25A
Fig. 25B

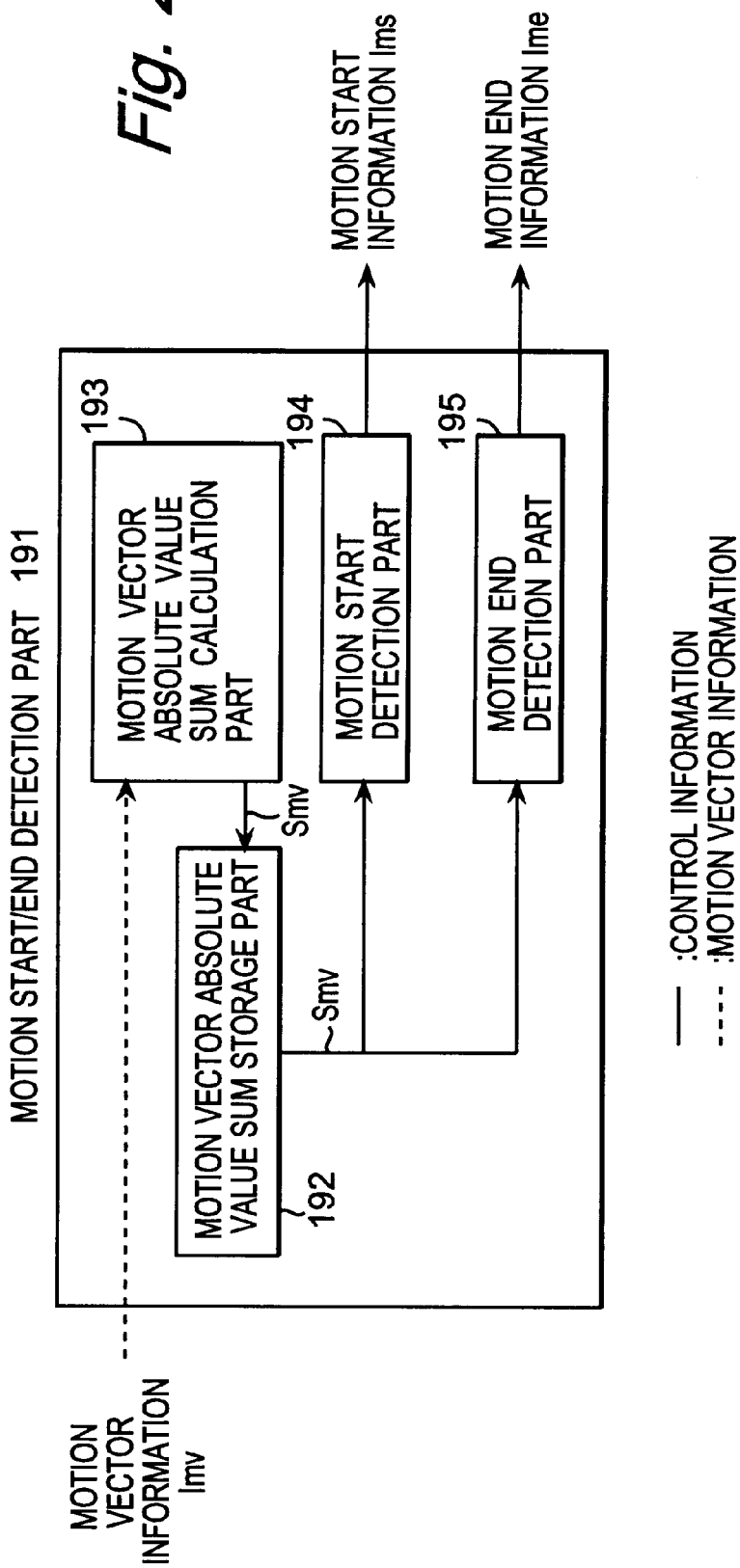

Fig. 31 PRIOR ART
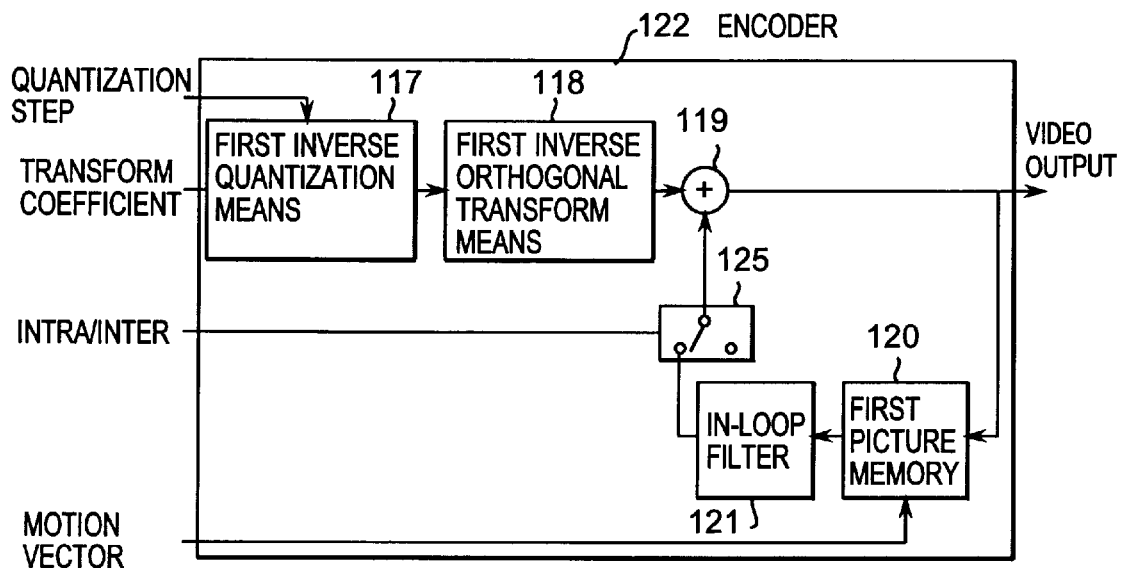
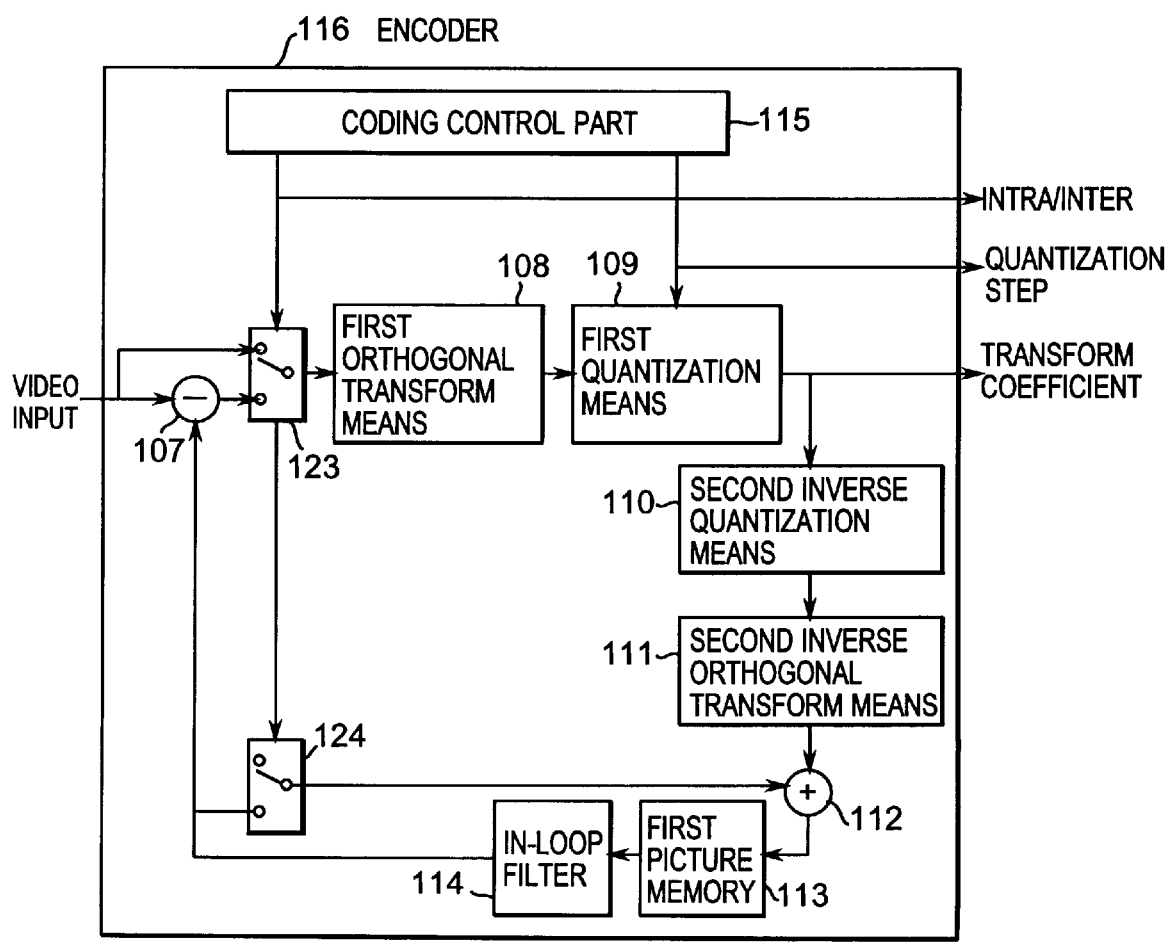

VIDEO SERVER          PC

CODING CONTROL METHOD, CODING CONTROL APPARATUS AND STORAGE MEDIUM CONTAINING CODING CONTROL PROGRAM

BACKGROUND OF THE INVENTION

1. Field of the Invention

The present invention relates to a coding control method and a coding control apparatus for compression-coding a video signal or the like and transmitting the same in high efficiency.

2. Description of the Background Art

As the field of application of the technique of compression-coding a video signal in high efficiency and transmitting the same, a visual telephone or a video conference shown in FIG. 33A is general. Further, application to a system shown in FIG. 33B for transmitting a video signal through digital radio communication utilizing a transmission path of wireless LAN for monitoring a danger point or transmitting a picture between mobiles, and application to picture distribution utilizing Internet shown in FIG. 33C are expected.

With reference to video coding in a video conference or a visual telephone, the conventional video coding method is now described in detail.

Conventionally, in coding of a video conference or visual telephone signal, it is general to employ coding combining inter-picture coding utilizing inter-frame temporal correlation and intra-picture coding utilizing intra-frame spatial correlation with each other. A television image formed by 30 pictures (frames) per second has large correlation along the time axis direction, and if employing pixels on the same position of a screen precedent by one frame for prediction through inter-frame correlation, it follows that most ideal prediction can be performed when the screen is still. In INTER coding, however, inter-frame correlation contrarily lowers if there is motion in the screen, to be rather lower even as compared with correlation between adjacent pixels in a field. On the other hand, each pixel of a picture signal per frame has small level change with respect to an adjacent pixel and its correlation is strong. It is assumed that its self correlation function can be analogous to a negative exponential function. At this time, power spectral density which is Fourier transform of the self correlation function has a property of being maximized at a zero frequency component (i.e., dc component) and monotonously decreasing as the frequency component increases. While Fourier transform is best known as orthogonal transform to a frequency region, the Fourier transform includes complex number calculation and its structure is complicated, and hence it is general to employ two-dimensional DCT (Discrete Cosine Transform) in coding of pictures as substitute orthogonal transform. After a transform coefficient decomposed into frequency components by DCT is quantized to a level zero which is an uncoded transform coefficient (zero value of the coded coefficient) and a level ±1 to a level ±K which are non-zero values of the coded coefficient (LEVEL) taking discrete quantization representative values, run-length coding for coding the number of successive zeros preceding the coded coefficient (RUN) and Huffman coding for allocating variable length codes in response to the originating rate of the level of the non-zero value of the coded coefficient (LEVEL) are performed, whereby video data are compressed.

For example, ITU-T recommendation H.261 applies motion compensation inter-picture coding to a picture having small motion while performing coding shown below on a prediction error between frames. Further, no inter-picture coding is applied to a picture having large motion but the following coding is directly performed on frame pixels. FIG. 31 shows an encoder and a decoder for video data according to H.261.

As shown in FIG. 31, an encoder 116 for video data according to H.261 comprises a subtraction part 107, a first orthogonal transform part 108 performing two-dimensional cosine transform, a first quantization part 109, a second inverse quantization part 110, a second inverse orthogonal transform part 111, an addition part 112, a second picture memory 113 for motion compensation, an in-loop filter 114, a coding control part 115 and selectors 123 and 124.

On the other hand, a decoder 122 comprises a first inverse quantization part 117, a first inverse orthogonal transform part 118, an addition part 119, a first picture memory 120 for motion compensation, an in-loop filter 121 and a selector 125.

The encoder 116 calculates by the subtraction part 107 a prediction error between frames by taking the difference between a video input signal previously transformed to CIF (Common Intermediate Format) of 352 by 288 dots and prediction data stored in the second picture memory 113 for motion compensation. At this time, motion in the range of 15 by 15 pixels is motion-compensated by specifying the prediction data as an arbitrary block of 16 by 16 pixels among 16 by 16 pixels around the block. The motion quantity is specified by a two-dimensional motion vector and transmitted to the decoder along with the video data. The decoding side decodes data of the picture memory for motion compensation in a region displaced from a decoding block by this motion vector as prediction data. For such large motion that no motion compensation is effective, INTRA coding with no prediction is selected by the selectors 123 and 124. The prediction error and the frame pixels are divided into blocks of 8 pixels by 8 lines, and two-dimensional cosine transform is performed on each block in the first orthogonal transform part 108. The pixels of each block are transformed to frequency components by the DCT. The obtained transform coefficients are quantized in the first quantization part 109. By the quantization, the respective transform coefficients are represented from the level 0 of the zero value of the coded coefficient to levels of non-zero values of the coded coefficient (LEVEL) which are integers up to a level ±127. The quantized data, transmitted to the decoder through a communication part or the like, is inverse-transformed by the second inverse quantization part 110 and the second inverse orthogonal transform part 111 at the same time, thereafter added to the prediction data stored in the second picture memory 113 for motion compensation by the addition part 112, and stored in the second picture memory 113 for motion compensation to be next prediction data. The decoder 122 inverse-transforms the inputted video data through the first inverse quantization part 117 and the first inverse orthogonal transform part 118, thereafter adds the same to the prediction data stored in the first picture memory 120 for motion compensation through the adder 119, and obtains a video output while storing the same as next prediction data in the first picture memory 120 for motion compensation. When an input block is INTRA data, no prediction data is selected by the selector 125 but the input data is directly inverse-transformed, extracted as a video output, and stored in the picture memory for motion compensation.

The above is exemplary predictive coding of a video signal, particularly coding combining inter-picture coding and intra-picture coding. In INTER coding, mismatch is caused between the contents of frame memories of the coding side and the decoding side upon occurrence of a transmission error, and hence influence of the error propagates to all subsequent reproduced pictures. Therefore, it is necessary to transmit INTRA-coded video data for refreshing the reproduced pictures.

INTRA coding, which is coding utilizing no inter-frame correlation, has an enormous coding amount as compared with INTER coding. When transmitting a frame in which all blocks are INTRA-coded for refresh, therefore, it takes time for transmission and hence a delay time increases. In general, therefore, means of dividing one frame into a plurality of groups of blocks and refreshing a group of blocks every frame by INTRA coding thereby reducing increase of the coding amount per frame is considered.

The conventional coding control method in the coding control part 115 is now described. Spatial correlation or temporal correlation of a picture changes from moment to moment, and hence an information amount resulting from removing redundancy by DCT or inter-frame difference also changes from moment to moment. The information amount after coding can be controlled by changing the quantization characteristic in quantization of information resulting from performing DCT. However, compression of information by quantization is accompanied with distortion of the picture resulting from a quantization error. Coding control is achieved by selecting the quantization characteristic for approximating a generated information amount to a desired value. If the transmission rate is constant, redundancy fluctuating in response to the characteristic of an input picture is predicted to select the quantization characteristic so that the generated information amount is regularly uniform. For example, in a report "A Study on Low Delay Interframe Prediction Coding" announced in Proceedings of the 1992 Autumn Conference of the Institute of Electronics, Information and Communication Engineers, D-162 (1992) by Senda et al., there is disclosed a technique of coding amount control dividing a picture frame into blocks of 16 by 16 pixels called macroblocks and deciding, on the basis of the difference between an information amount generated before reaching an i-th macroblock and its predicted value, the quantization characteristic for a macroblock to be subsequently coded every time a macroblock is coded. In this report, the quantization characteristic (quantization parameter) for the next macroblock is decided by a target generated information amount in units of the macroblocks and an actually generated information amount thereby performing control of approximating a generated information amount of one picture frame to a target generated information amount of one picture frame. The processing is simple when uniformalizing the target generated information amount in units of the macroblocks in frames, while, when setting a macroblock having high inter-frame correlation and no such macroblock at the same target generated information amount, there arises such a problem that the picture quality of a block having large motion is deteriorated. In JP-A-5-344493, on the other hand, there is disclosed a motion picture coding apparatus which decides a coding parameter on the basis of an output from a predictive coding efficiency calculator calculating inter-picture coding efficiency and thereby performing optimum coding every part of a motion picture for solving this problem. However, it is not easy to decide a target generated information amount every macroblock responsive to inter-frame correlation while suppressing an information amount per frame within the target generated information amount but complicated processing follows.

In this regard, an operation of deciding the quantization characteristic with reference to a coding parameter control table previously decided on the basis of a generated information amount or an occupied amount of a buffer resulting from coding precedent by one frame is generally performed. However, the relation between the generated information amount and the quantization characteristic is not univocally decided and hence, as disclosed in JP-A-4-57489, having a coding parameter control table for each of previously assumed scene types is considered. Further, the applicant has proposed in JP-A-7-107482 a coding control method not univocally calculating the quantization characteristic on the basis of a generated information amount or an occupied amount of a buffer resulting from coding precedent by one frame but previously setting an upper bound and a lower bound of a target generated information amount for the quantization characteristic, also coding a next frame with the same quantization characteristic if a generated information amount resulting from coding one frame with a certain quantization characteristic is between the upper bound and the lower bound of the target generated information amount, and changing the quantization characteristic in a direction reducing quantization precision (i.e., in a direction deteriorating the picture quality) if the generated information amount resulting from coding one frame exceeds the upper bound of the target generated information amount, while changing the quantization characteristic in a direction raising the quantization precision (i.e., in a direction improving the picture quality) if the generated information amount resulting from coding one frame is below the lower bound of the target generated information amount. This gazette is incorporated herein by reference. According to this coding control method, it is possible to suit all scenes by simple control without defining an absolute level. With reference to FIG. 7A, the operation is now described.

It is assumed that the vertical axis in FIG. 7 shows a generated information amount, and the upper direction of this vertical axis is a direction increasing the generated information amount. It is also assumed that the horizontal axis in FIG. 7 shows quantization characteristics (QUANT), largeness/smallness of the quantization characteristics corresponds to largeness/smallness of quantization step sizes, and the right direction of this horizontal axis is a direction increasing the quantization step sizes (quantization errors greater). When regularly transmitting a picture of 30 frames per second under a constant transmission rate, it is ideal to render a generated information amount per frame transmission rate/30 frames. In practice, however, it is impossible to correctly control the generated information amount, and hence generated information amount taking a proper margin into consideration is set as a target generated information amount. It is assumed here that the quantization characteristics are expressed as q(s) for identifying each quantization characteristic by an index s which is a natural number, and the quantization step size of the quantization characteristic q(s) increases as the index s increases. At this time, the state of the quantization characteristic q(s) for a frame to be coded is specified by the value of the index s. It is hereinafter assumed that the state of the quantization characteristic for the frame to be coded is also expressed as q(s). In the coding control method disclosed in JP-A-7-107482, an upper bound threshold and a lower bound threshold of a generated information amount are decided every state of the quantization characteristic. These are decided to hold the target generated information amount therebetween. If a generated information amount resulting from coding a certain frame in a certain state q(s) is not in excess of the threshold (a), this state is left intact and coding of the next frame is also performed in the state q(s). If the generated information amount resulting from coding the certain frame in the certain state q(s) exceeds the upper bound threshold (b), transition is made to a state of a large quantization characteristic (a state of a large quantization step size), and as a result of coding the next frame with a quantization characteristic q(s+1), the next generated information amount is (c). If the generated information amount resulting from coding the certain frame in the certain state q(s) is below the lower bound threshold (d), transition is made to a state of a small quantization characteristic (a state of a small quantization step size), and as a result of coding the next frame with a quantization characteristic q(s−1), the next generated information amount is (e).

The aforementioned coding control method controlling the quantization characteristic every frame has the following problem:

The quantization characteristic is a set of predetermined discrete quantization representative values. When quantizing one frame entirely with one quantization characteristic, errors are accumulated by the number of macroblocks forming one screen to result in difference in information amount, and hence the information amount largely fluctuates even if the quantization characteristic is most finely controlled. Thus, the control is accompanied with large errors. Particularly when using the coding control method proposed by the applicant, i.e., the coding control method not univocally calculating the quantization characteristic on the basis of a generated information amount or an occupied amount of a buffer resulting from coding precedent by one frame but deciding increase/decrease of the quantization characteristic on the basis of the generated information amount or the occupied amount of the buffer resulting from coding precedent by one frame, the generated information amount falls below the lower bound of the target generated information amount with the quantization characteristic q(s) while it exceeds the upper bound of the target generated information amount with the quantization characteristic q(s−1) even if the correlation of the picture is constant, and hence such a situation may take place that the quantization characteristic fluctuates between q(s) and q(s−1) every frame and the resulting generated information amount vibrates. In other words, such a situation may take place that the quantization characteristic fluctuates between two states corresponding to the respective ones of a point (e') and a point (d) shown in FIG. 7A and the generated information amount vibrates. FIG. 8A shows temporal transition of the generated information amount of the coding result at this time. In order not to exceed the target generated information amount even if the generated information amount is large, the upper bound of this vibration must be set smaller than the target generated information amount, and hence the generated information amount remarkably reduces on the lower bound of vibration and a transmission band cannot be efficiently used.

A generated information amount when coding a picture tends to increase as the motion of the object increases, and tends to increase if the area of the object is large even if the motion of the object is small. Further, when a background hidden behind the object appears due to motion of the object, the generated information amount increases/decreases depending on the fineness of the pattern of the background. In addition, in such a motion picture that motion of the object or a moving area gradually reduces and inter-frame correlation gradually rises, the generated information amount tends to reduce, while, in such a motion picture that motion of the object or a moving area gradually increases, the generated information amount tends to increase. Thus, mainly the generated information amount is influenced by the magnitude of the motion of the object, the magnitude of the moving area and the pattern of the background, and hence it is extremely difficult to correctly control a generated information amount of a picture frame to be subsequently coded, on the basis of a generated information amount of a previously coded picture frame. Therefore, in the aforementioned conventional coding control disclosed in JP-A-7-107482, the upper bound threshold and the lower bound threshold are set taking a proper margin into consideration for the target generated information amount. However, it is extremely difficult to set an upper bound threshold and a lower bound threshold taking into consideration the magnitude of the motion of the object, the magnitude of the moving area, the speed of the object and the pattern of the background, as well as a motion start and a motion end of the object. Therefore, for example, such a situation may take place that a generated information amount has fallen below the lower bound threshold and hence the quantization characteristic has been set in a direction improving the picture quality but the generated information amount exceeds the upper bound threshold if performing coding with the quantization characteristic set in the direction improving the picture quality, or such a situation may also take place that a generated information amount has exceeded the upper bound threshold on the contrary and hence the quantization characteristic has been set in a direction deteriorating the picture quality but the generated information amount falls below the lower bound threshold value if performing coding with the quantization characteristic set in the direction deteriorating the picture quality.

Problems in the case of applying the conventional coding control method disclosed in JP-A-7-107482 in such a situation that the magnitude of motion of the object or a moving area gradually reduces or increases are now described with reference to FIG. 32.

First, problems in the case of applying the conventional coding control method in such a situation that inter-frame correlation gradually rises.

Problem 1: In the case (b) where the generated information amount resulting from performing coding in the certain state q(s) exceeds the upper bound threshold value, such a situation is assumed that the motion of the object or the moving area gradually reduces and the inter-frame correlation gradually rises. In this case, the generated information amount has exceeded the upper bound threshold, and hence the quantization characteristic is set at q(s+1) to code the next frame. However, when setting the quantization characteristic at q(s+1) although the inter-frame correlation gradually rises and the generated information amount tends to gradually reduce, there arises such a problem that, due to the synergistic effect of the quantization characteristic and the inter-frame correlation, the generated information amount falls below the lower bound threshold value (c') to deteriorate the picture quality beyond necessity. Further, inter-frame difference between the picture coded with the quantization characteristic q(s+1) and deteriorated in picture quality and a picture to be coded is taken in the next frame, and hence the difference increases and compressibility lowers by the deterioration of the picture quality.

Problem 2: In the case (d) where the generated information amount resulting from performing coding in the certain state q(s) is below the lower bound threshold, such a situation is assumed that the motion of the object or the moving area gradually reduces and the inter-frame correlation gradually rises. Since the generated information amount is below the lower bound threshold, the quantization characteristic is set at q(s−1) to code the next frame. However, the inter-frame correlation gradually rises and the generated information amount tends to reduce, and hence, if performing coding with the quantization characteristic q(s−1), the generated information amount may again fall below the lower bound threshold or reach a value around the lower bound threshold (e"). Consequently, there arises such a problem that a transmission band cannot be efficiently used in transmission of coded data of a motion picture.

Problems in the case of applying the aforementioned conventional coding control in such a situation that inter-frame correlation gradually lowers are now described.

Problem 3: In the case (d) where the generated information amount resulting from performing coding in the certain state q(s) is below the lower bound threshold, such a situation is assumed that the motion of the object or the moving area gradually increases and the inter-frame correlation gradually lowers. In this case, the generated information amount is below the lower bound threshold and hence the quantization characteristic is set at q(s−1) to code the next frame. However, when setting the quantization characteristic at q(s−1), although the inter-frame correlation gradually lowers and the generated information amount tends to increase, the generated information amount abruptly increases (e') due to the synergistic effect of the quantization characteristic and the inter-frame correlation, to cause frame skip.

Problem 4: In the case (b) where the generated information amount resulting from performing coding in the certain state q(s) exceeds the upper bound threshold, such a situation is assumed that the motion of the object or the moving area gradually increases and the inter-frame correlation gradually lowers. In this case, the generated information amount exceeds the upper bound threshold, and hence the quantization characteristic is set at q(s+1) to code the next frame. However, the inter-frame correlation gradually lowers and the generated information amount tends to increase, and hence, when performing coding with the quantization characteristic q(s+1), the generated information amount may again exceed the upper bound threshold or reach a value around the upper bound threshold value (c"). Consequently, there arises such a problem that frame skip is caused in a motion picture transmitted in a coded state.

SUMMARY OF THE INVENTION

The present invention has been proposed in order to solve the aforementioned problems, and an object thereof is to provide a coding control method and a coding control apparatus improving precision of coding control and reducing a margin of a target generated information amount to the utmost and thereby enabling efficient transmission of a coded image to reduce loss. More concretely, the present invention aims at improving the precision of control of a quantization characteristic performed every frame with a simple structure. Further, the present invention aims at improving the precision and the speed of coding control by taking into consideration change of the magnitude of motion of an object or a moving area.

The present invention has the following features to solve the problems above.

A first aspect of the present invention is directed to a coding control apparatus for deciding, in coding data formed by a plurality of frames, on the basis of a generated information amount which is the amount of coded data generated by coding one frame or an occupied amount in a smoothing buffer used for transmission of data after coding, a quantization characteristic employed for coding a next frame to the one frame, comprising:

a comparison part for comparing the generated information amount or the occupied amount with a predetermined value, and a quantization characteristic decision part dividing each frame of the plurality of frames previously into a plurality of areas while classifying the plurality of areas in each frame into a first group and a second group for setting in response to a comparison result by the comparison part the same quantization characteristic for the first and second groups or setting one of most approximate two different quantization characteristics for the first group and the other one for the second group respectively.

As described above, in the first aspect, the quantization characteristic decision part sets one of most approximate two quantization characteristics q(s) and q(s+1) for the first group while setting the other one for the second group, whereby a quantization state corresponding to an intermediate quantization characteristic between q(s) and q(s+1) is created, and hence with a simple algorithm more fine coding control is enabled.

According to a second aspect, in the first aspect, the plurality of areas are so classified that the amount of coded data obtained by coding the first group and the amount of coded data obtained by coding the second group balance with each other previously into the first and second groups.

As described above, in the second aspect, the plurality of areas in each frame are previously classified into the first and second groups so that the respective coded data balance with each other, whereby precision of coding control can be improved without performing complicated analysis during the control.

According to a third aspect, in the second aspect, the areas belonging to the first group and the areas belonging to the second group are spatially alternately arranged.

As described above, in the third aspect, the areas of the first group and the areas of the second group are spatially alternately arranged, whereby also in the case of coding data of a picture containing objects such as a background and a person having different properties a plurality of areas in its picture frame are classified into two groups uniformly.

According to a fourth aspect, in the second aspect, the coding control apparatus further comprises:

a time axis placement control part for outputting a signal instructing an operation of exchanging a quantization characteristic to be set for the first group and a quantization characteristic to be set for the second group every prescribed time as a time axis placement control signal, and the quantization characteristic decision part sets in response to the time axis placement control signal quantization characteristics for the first and second groups.

As described above, in the fourth aspect, the quantization characteristic employed for coding GOBs of the first group and the quantization characteristic employed for coding GOBs of the second group exchange every prescribed time, whereby distortion of a picture or non-uniformity of the picture quality resulting from spatial difference between the quantization characteristics can be rendered inconspicuous.

According to a fifth aspect, in the second aspect,
in the case that forced updating by INTRA coding is performed on a prescribed area among the plurality of areas when coding the data formed by the plurality of frames, the quantization characteristic decision part classifies, among the plurality of areas, an area to be subjected to forced updating to the first group while classifying the remaining areas other than the area to be subjected to forced updating to the second group.

As described above, in the fifth aspect, also when performing forced updating, a quantization state corresponding to an intermediate quantization characteristic between most approximate two quantization characteristics q(s) and q(s+1) can be created, whereby with a simple algorithm coding control of high precision is enabled.

According to a sixth aspect, in the fifth aspect, the quantization characteristic decision means sets quantization characteristics for the first and second groups so that quantization precision for coding areas to be subjected to forced updating among the plurality of areas is higher or equal to quantization precision for coding the remaining areas other than the areas to be subjected to forced updating.

As described above, in the sixth embodiment, when different quantization characteristics are set for the first and second groups, the quantization precision of an area to be INTRA-coded for forced updating is higher than the quantization precision of the other area to be INTER-coded, whereby block distortion due to INTRA coding is reduced.

According to a seventh aspect, in the first aspect,
the areas are groups of blocks.

As described above, in the seventh aspect, in transmission of coded data, single specification information may be transmitted every GOB as information specifying a quantization characteristic and no extra information may be transmitted, whereby compressibility improves.

According to a eighth aspect, in the first aspect,
the coding control apparatus further comprises:
a transition step width control part for comparing previously set upper bound and lower bound transition step width control thresholds with the generated information amount, wherein
a quantization characteristic set part sets, on the basis of a comparison result by the transition step width control part,
the quantization characteristic employed for coding the next frame so that, when the generated information amount is less than the upper bound transition step width control threshold and greater than the lower bound transition step width control threshold, only a quantization characteristic having been set for one of the first and second groups is changed or quantization characteristics for the first and second groups are maintained, and
sets the quantization characteristic employed for coding the next frame so that, when the generated information amount is greater than the upper bound transition step width control threshold or less than the lower bound transition step width control threshold, both the quantization characteristics having been set for the first and second groups are changed.

As described above, in the eighth aspect, in coding of picture data, when inter-frame correlation abruptly rises or lowers due to abrupt change of motion of an object or the like and hence abrupt increase/decrease of the generated information amount takes place, both the quantization characteristics for the first and second groups are so changed that the state (quantization state) of the quantization characteristic in the next frame is changed more greatly than general, whereby a delay of control resulting from performance of fine coding control can be prevented.

An ninth aspect of the present invention is directed to a coding control apparatus deciding in coding motion picture data formed by a plurality of frames on the basis of a generated information amount which is the amount of coded data generated by coding one frame or an occupied amount in a smoothing buffer used for transmission of data after coding a quantization characteristic employed for coding a next frame to the one frame, comprising:
a detection part for detecting, on the basis of a motion quantity of an object expressed by the motion picture data either one or both of a motion start state of the object and a motion end state of the object, and
a quantization control part for deciding, on the basis of the generated information amount or the occupied amount and a detection result by the detection part, the quantization characteristic employed for coding the next frame.

As described above, in the ninth aspect, on the basis of detection of the motion start state and/or the motion end state of the object, the quantization characteristic is controlled in response to the motion characteristic of the object, whereby the precision of coding control can be improved, and a time required until a proper quantization characteristic is set can be reduced (i.e., the speed of coding control can be improved).

According to a tenth aspect, in the ninth aspect,
the quantization control part suppresses, on the basis of the detection result by the detection part, change of a quantization characteristic employed for frame coding in the motion start state of the object in a direction improving the picture quality.

As described above, in the tenth aspect, when the object is in the motion start state and hence the generated information amount resulting from coding increases, the quantization characteristic is not changed in the direction improving the picture quality, whereby fluctuation of the generated information amount is suppressed and coding control of excellent precision can be performed.

According to an eleventh aspect, in the ninth aspect,
the quantization control part suppresses, on the basis of the detection result by the detection part, change of a quantization characteristic employed for frame coding in the motion end state of the object in a direction deteriorating the picture quality.

As described above, in the eleventh aspect, when the object is in the motion end state and hence the generated information amount resulting from coding reduces, the quantization characteristic is not changed in a direction deteriorating the picture quality, whereby fluctuation of the generated information amount is suppressed and coding control of excellent precision can be performed.

According to a twelfth aspect, in the ninth aspect,
the quantization control part changes, in the case of changing the quantization characteristic in a direction deteriorating the picture quality, when the motion start state of the object is detected by the detection part, the quantization characteristic more largely than that when the motion start state of the object is not detected.

As described above, in the twelfth aspect, in the motion start state of the object the quantization characteristic must be changed in the direction deteriorating the picture quality, when the quantization characteristic is largely changed, whereby the time required until a proper quantization characteristic is set can be reduced and coding control quickly following motion of the object can be performed.

According to a thirteenth aspect, in the ninth aspect,
the quantization control part changes, in the case of changing the quantization characteristic in a direction improving, when the picture quality the motion end state of the object is detected by the detection part, the quantization characteristic more largely than that when the motion end state of the object is not detected.

As described above, in the thirteenth aspect, in the motion end state of the object, when the quantization characteristic must be changed in the direction improving the picture quality, the quantization characteristic is largely changed, whereby the time required until a proper quantization characteristic is set can be reduced and the picture quality can be quickly improved.

According to a fourteenth aspect, in the ninth aspect,
the coding control apparatus further comprises
a storage part for storing an upper bound threshold and a lower bound threshold for the generated information amount or the occupied amount, and
a threshold set part for setting, on the basis of the detection result by the detection part, the upper bound threshold in a period of the motion start state of the object at a value lower than the upper bound threshold in a period other than the period of the motion start state of the object, and
the quantization control part changes the quantization characteristic in a direction deteriorating the picture quality when the generated information amount or the occupied amount exceeds the upper bound threshold and changes the quantization characteristic in a direction improving the picture quality when the generated information amount or the occupied amount falls below the lower bound threshold.

As described above, in the fourteenth aspect, in the period of the motion start state of the object the upper threshold is set low so that, when the object is in the motion start state and hence the generated information amount increases, the quantization characteristic is readily changed in the direction deteriorating the picture quality, whereby coding control quickly following motion of the object can be performed.

According to a fifteenth aspect, in the ninth aspect,
the coding control apparatus further comprises
a storage part for storing an upper bound threshold and a lower bound threshold for the generated information amount or the occupied amount, and
a threshold set part for setting, on the basis of the detection result by the detection part, the lower bound threshold in a period of the motion start state of the object at a value lower than the lower bound threshold in a period other than the period of the motion start state of the object, and
the quantization control part changes the quantization characteristic in a direction deteriorating the picture quality when the generated information amount or the occupied amount exceeds the upper bound threshold and changes the quantization characteristic in a direction improving the picture quality when the generated information amount or the occupied amount falls below the lower bound threshold.

As described above, in the fifteenth aspect, in the period of the motion start state the lower bound threshold is set low so that, when the object is in the motion start state and hence the generated information amount increases, the quantization characteristic is hardly changed in the direction improving the picture quality, whereby fluctuation of the generated information is suppressed and coding control of excellent precision can be performed.

According to a sixteenth aspect, in the ninth aspect,
the coding control apparatus further comprises
a storage part for storing an upper bound threshold and a lower bound threshold for the generated information amount or the occupied amount, and
a threshold set part for setting, on the basis of the detection result by the detection part, the upper bound threshold in a period of the motion end state of the object at a value higher than the upper bound threshold in a period other than the period of the motion end state of the object, and
the quantization control part changes the quantization characteristic in a direction deteriorating the picture quality when the generated information amount or the occupied amount exceeds the upper bound threshold and changes the quantization characteristic in a direction improving the picture quality when the generated information amount or the occupied amount falls below the lower bound threshold.

As described above, in the sixteenth aspect, in the period of the motion end state of the object the upper bound threshold is set high so that, when the object is in the motion end state and hence the generated information amount reduces, the quantization characteristic is hardly changed in the direction deteriorating the picture quality, whereby fluctuation of the generated information is suppressed and coding control of excellent precision can be performed.

According to a seventeenth aspect, in the ninth aspect,
the coding control apparatus further comprises
a storage part for storing an upper bound threshold and a lower bound threshold for the generated information amount or the occupied amount, and
a threshold set part f or setting, on the basis of the detection result by the detection part, the lower bound threshold in a period of the motion end state of the object at a value higher than the lower bound threshold in a period other than the period of the motion end state of the object, and
the quantization control part changes the quantization characteristic in a direction deteriorating the picture quality when the generated information amount or the occupied amount exceeds the upper bound threshold and changes the quantization characteristic in a direction improving the picture quality when the generated information amount or the occupied amount falls below the lower bound threshold.

As described above, in the seventeenth aspect, in the period of the motion end state of the object the lower bound threshold is set high so that, when the object is in the motion end state and hence the generated information amount reduces, the quantization characteristic is readily changed in the direction improving the picture quality, whereby the picture quality can be quickly improved.

According to an eighteenth aspect, in the ninth aspect,
the detection part detects such a state that a motion quantity of the object is greater than a previously set threshold and the motion quantity of the object continuously increases as the motion start state of the object.

As described above, in the eighteenth aspect, the motion start state of the object can be detected through simple processing.

According to a nineteenth aspect, in the ninth aspect,
the detection part detects such a state that a motion quantity of the object is greater than a previously set threshold and the motion quantity of the object continuously reduces as the motion end state of the object.

As described above, in the nineteenth aspect, the motion end state of the object can be detected through simple processing.

According to a twentieth aspect, in the ninth aspect, the motion quantity is the sum of absolute values of motion vectors which are coded data when performing motion prediction inter-frame differential coding.

As described above, in the twentieth aspect, it is not necessary to provide new processing for detection of the motion start state of the object and the motion end state of the object, whereby reduction of coding processing ability can be prevented while low power consumption and cost reduction can be attained.

A twenty-first aspect of the present invention is directed to a coding control apparatus for deciding, in coding data formed by a plurality of frames, on the basis of a generated information amount which is the amount of coded data generated by coding one frame or an occupied amount in a smoothing buffer used for transmission of data after coding, a quantization characteristic employed for coding a next frame to the one frame, comprising:

a comparison part for comparing the generated information amount or the occupied amount with a predetermined value, and a quantization characteristic decision part dividing each frame of the plurality of frames previously into a plurality of areas while classifying the plurality of areas in each frame into a first group and a second group for setting in response to a comparison result by the comparison part the same quantization characteristic for the first and second groups or setting one of most approximate two different quantization characteristics for the first group and the other one for the second group respectively.

According to a twenty-second aspect, in the twenty-first aspect, the plurality of areas are classified previously into the first and second groups so that the amount of coded data obtained by coding the first group and the amount of coded data obtained by coding the second group can balance with each other.

According to a twenty-third aspect, in the twenty-second aspect, the areas belonging to the first group and areas belonging to the second group are spatially alternately arranged.

According to a twenty-forth aspect, in the twenty-second aspect, a quantization characteristic to be set for the first group and a quantization characteristic to be set for the second group are exchanged every prescribed time in the quantization characteristic decision step.

According to a twenty-fifth aspect, in the twenty-second aspect, in case that forced updating by INTRA coding is performed on any one area among the plurality of areas when coding the data formed by the plurality of frames, an area to be subjected to forced updating among the plurality of areas is classified to the first group, while the remaining areas other than the area to be subjected to forced updating is classified to the second group in the quantization characteristic decision.

According to a twenty-sixth aspect, in the twenty-first aspect, the areas are groups of blocks.

According to a twenty-seventh aspect, in the twenty-first aspect, the coding control method comprising:

a second comparison step of comparing previously set upper bound and lower bound transition step width control thresholds with the generated information amount; wherein in quantization characteristic decision steps, on the basis of a comparison result by the second comparison step, the quantization characteristic employed for coding the next frame is set so that, when the generated information amount is less than the upper bound transition step width control threshold and greater than the lower bound transition step width control threshold, only a quantization characteristic having been set for one of the first and second groups is changed or quantization characteristics for the first and second groups are maintained, and the quantization characteristic employed for coding the next frame is set so that, when the generated information amount is greater than the upper bound transition step width control threshold or less than the lower bound transition step width control threshold, both the quantization characteristics having been set for the first and second groups are changed.

According to a twenty-eighth aspect, a coding control method for deciding, in coding motion picture data formed by a plurality of frames, on the basis of a generated information amount being the amount of coded data generated by coding one frame or an occupied amount in a smoothing buffer used for transmission of data after coding, a quantization characteristic employed for coding a next frame to the one frame, comprising:

a detection step of detecting, on the basis of a motion quantity of an object expressed by the motion picture data, either one or both of a motion start state of the object and a motion end state of the object; and a quantization control step of deciding, on the basis of the generated information amount or the occupied amount and a detection result by the detection step, the quantization characteristic employed for coding the next frame.

According to a twenty-ninth aspect, in the twenty-first aspect, on the basis of the detection result by the detection step, change of a quantization characteristic employed for frame coding in the motion start state of the object in a direction improving the picture quality is suppressed in the quantization control step.

According to a thirtieth aspect, in the twenty-eighth aspect, on the basis of the detection result by the detection step, change of a quantization characteristic employed for frame coding in the motion end state of the object in a direction deteriorating the picture quality is suppressed in the quantization control step.

According to a thirty-first aspect, in the twenty-eighth aspect, in the case of changing the quantization characteristic in a direction deteriorating the picture quality, when the motion start state of the object is detected by the detection step, the quantization characteristic is changed more largely than that when the motion start state of the object is not detected in the quantization control step.

According to a thirty-second aspect, in the twenty-eighth aspect, in the case of changing the quantization characteristic in a direction improving the picture quality, when the motion end state of the object is detected by the detection step, the quantization characteristic is changed more largely than that when the motion end state of the object is not detected in the quantization control step.

According to a thirty-third aspect, in the twenty-eighth aspect, a coding control further comprising:

a first set step of setting an upper bound threshold and a lower bound threshold for the generated information amount or the occupied amount; and a second set step of setting, on the basis of the detection result by the detection steps, the upper bound threshold in a period of the motion start state of the object at a value lower than the upper bound threshold in a period other than the period of the motion start state of the object, wherein the quantization characteristic is changed in a direction deteriorating the picture quality when the generated information amount or the occupied amount exceeds the upper bound threshold and the quantization characteristic is changed in a direction improving the picture quality when the generated information amount or the occupied amount falls below the lower bound threshold in the quantization control step.

According to a thirty-fourth aspect, in the twenty-eighth aspect, a coding control method further comprising:

a first set step of setting an upper bound threshold and a lower bound threshold for the generated information amount or the occupied amount; and a second set step of setting again, on the basis of the detection result by the detection step, the lower bound threshold in a period of the motion start state of the object at a value lower than the lower bound threshold in a period other than the period of the motion start state of the object, wherein the quantization characteristic is changed in a direction deteriorating the picture quality when the generated information amount or the occupied amount exceeds the upper bound threshold and the quantization characteristic is changed in a direction improving the picture quality when the generated information amount or the occupied amount falls below the lower bound threshold in the quantization control step.

According to a thirty-fifth aspect, in the twenty-eighth aspect, a coding control further comprising:

a first set step of setting an upper bound threshold and a lower bound threshold for the generated information amount or the occupied amount; and a third set step of setting again, on the basis of the detection result by the detection step, the upper bound threshold in a period of the motion end state of the object at a value higher than the upper bound threshold in a period other than the period of the motion end state of the object, wherein the quantization characteristic is changed in a direction deteriorating the picture quality when the generated information amount or the occupied amount exceeds the upper bound threshold and the quantization characteristic is changed in a direction improving the picture quality when the generated information amount or the occupied amount falls below the lower bound threshold in the quantization control step.

According to a thirty-sixth aspect, in the twenty-eighth aspect, a coding control method further comprising:

a first set step of setting an upper bound threshold and a lower bound threshold for the generated information amount or the occupied amount; and a third set step of setting, on the basis of the detection result by the detection step, the lower bound threshold in a period of the motion end state of the object at a value higher than the lower bound threshold in a period other than the period of the motion end state of the object, wherein the quantization characteristic is changed in a direction deteriorating the picture quality when the generated information amount or the occupied amount exceeds the upper bound threshold and the quantization characteristic is changed in a direction improving the picture quality when the generated information amount or the occupied amount falls below the lower bound threshold in the quantization control step.

According to a thirty-seventh aspect, in the twenty-eighth aspect, such a state that a motion quantity of the object is greater than a previously set threshold and the motion quantity of the object continuously increases is detected as the motion start state of the object in the detection step.

According to a thirty-eighth aspect, in the twenty-eighth aspect, such a state that a motion quantity of the object is greater than a previously set threshold and the motion quantity of the object continuously reduces is detected as the motion end state of the object in the detection steps.

According to a thirty-ninth aspect, in the twenty-eighth aspect, the motion quantity is the sum of absolute values of motion vectors being coded data when performing motion prediction inter-frame differential coding.

According to a fortieth aspect, a storage medium containing a coding control program deciding, in coding data formed by a plurality of frames on the basis of a generated information amount which is the amount of coded data generated by coding one frame or an occupied amount in a smoothing buffer used for transmission of data after coding, a quantization characteristic employed in coding of a next frame to the one frame as a program executed in a computer unit, wherein the coding control program implementing on the computer unit an operating environment which includes:

a comparison step of comparing the generated information amount or the occupied amount with a predetermined value, and a quantization characteristic decision step of dividing each frame of the plurality of frames previously into a plurality of areas, classifying the plurality of areas in each frame into a first group and a second group, and setting the same quantization characteristic for the first and second groups or setting one of most approximate two different quantization characteristics for the first group and the other one for the second group respectively, in response to a comparison result by the comparison step.

According to a forty-first aspect, a coding control program deciding, in coding motion picture data formed by a plurality of frames on the basis of a generated information amount which is the amount of coded data generated by coding one frame or an occupied amount in a smoothing buffer used for transmission of data after coding, a quantization characteristic employed in coding of a next frame to the one frame as a program executed in a computer unit, wherein the coding control program implementing on the computer unit an operating environment which includes:

a detection step of detecting, on the basis of a motion quantity of an object expressed by the motion picture data, either one or both of a motion start state of the object and a motion end state of the object, and a quantization control step of deciding, on the basis of the generated information amount or the occupied amount and a detection result by the detection step, the quantization characteristic employed in coding of the next frame.

According to a forty-second aspect, in the ninth aspect, the motion quantity is the sum of macroblocks whose absolute values of motion vectors being coded data at the time of motion prediction inter-frame differential coding performed to the respective macroblocks exceed a previously set threshold.

As described above, in the forty-second aspect, it is not necessary to provide new processing for detection of the motion start state of the object and the motion end state of the object, whereby reduction of coding processing ability can be prevented and low power consumption and cost reduction can be realized.

According to a forty-third aspect, in the twenty-eighth aspect, the motion quantity is the sum of macroblocks whose absolute values of motion vectors being coded data at the time of motion prediction inter-frame differential coding performed to the respective macroblocks exceed a previously set threshold.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a diagram showing an exemplary operation of a coding control apparatus according to a fourth embodiment of the present invention;

FIG. 5 is a diagram showing another exemplary operation of the coding control apparatus according to the fourth embodiment;

FIG. 9 is a diagram showing an exemplary operation of a coding control apparatus according to a fifth embodiment of the present invention;

FIG. 22 is a block diagram showing the structure of a quantization control part in a coding control apparatus according to a first embodiment of the present invention;

FIG. 25 is a state transition diagram showing an operation of the quantization control part in the coding control apparatus according to the second embodiment;

FIG. 28 is a block diagram showing the structure of a motion start/end detection part in the coding control apparatus according to the sixth embodiment;

FIG. 31 is a block diagram showing the structures of conventional picture encoder and decoder;

DESCRIPTION OF THE PREFERRED EMBODIMENTS

Figure 21:
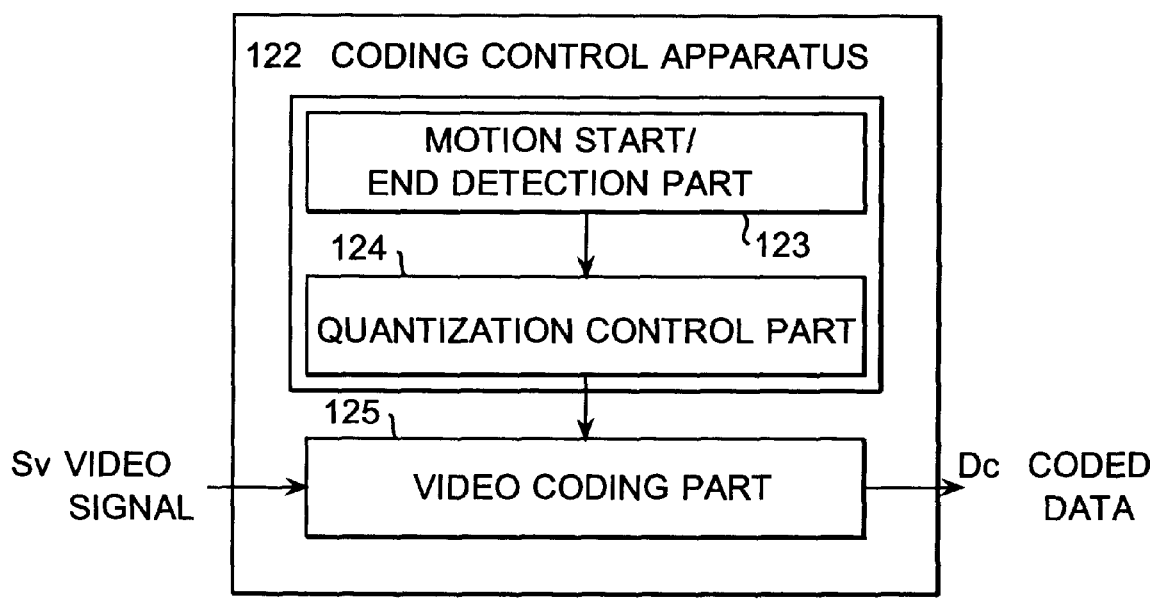
FIG. 21 is a block diagram showing a video coding apparatus in which the coding control apparatus according to each embodiment of the present invention is used.

FIG. 21 is a block diagram showing the structure of a video coding apparatus 121 in which a coding control apparatus 122 based on a coding control method according to each embodiment of the present invention described below is used. This video coding apparatus 121 comprises the coding control apparatus 122 and a video coding part 125. The video coding part 125 performs compression coding on a video signal Sv inputted in the video coding apparatus 121, thereby generating coded data Dc and outputs the coded data Dc from the video coding apparatus 121. The coding control apparatus 122 comprises a motion start/motion end detection part 123 and a quantization control part 124, and controls coding of the video signal Sv in the video coding part 125 by the coding control method according to each embodiment of the present invention. In the coding control by the coding control apparatus, the motion start/motion end detection part 123 detects a motion start and a motion end of an object in a picture indicated by the input video signal Sv, and the quantization control part 124 employs the detection results and controls quantization in coding by the video coding part 125.

Each part of the aforementioned video coding apparatus 121 shown in FIG. 21 inclusive of the interior of the coding control apparatus 122 may be directly implemented by hardware, while the same can also be implemented employing software. In the latter case, each part of the video coding apparatus 121 can be implemented by forming the video coding apparatus with a CPU (Central Processing Unit), a memory and an external memory device so that the CPU executes a prescribed program (hereinafter referred to as "video coding program") loaded from the external memory device in the memory, for example. In this case, the video coding program is typically provided by a storage medium (flexible disk, CD-ROM, DVD or the like) storing the program. In other words, the user sets a purchased storage medium in the video coding apparatus 121, lets the video coding apparatus 121 read the video coding program stored therein and installs the same in a memory device such as a hard disk unit. Alternatively, a video coding program transmitted to the video coding apparatus 121 through a communication line online may be installed in the memory device. Further, the maker may previously install the video coding program in the memory device before shipping the video coding apparatus 121. The program installed in such a manner is loaded in the memory from the memory device and executed by the CPU. When the interior of the coding control apparatus 122 is implemented with software, a coding control program is also included in the aforementioned video coding program so that the CPU executes this coding control program, whereby coding of the video signal Sv is controlled.

Description is now made on the case of applying the coding control method according to each embodiment of the present invention to a CIF picture of H.261 or H.263 recommended by ITU (Internal Telecommunication Union). The CIF picture is of 352 by 288 dots, and in H.261 or H.263, this is divided into 22 by 18 blocks in units of macroblocks of 16 by 16 dots, and a group of blocks (hereinafter referred to as "GOB") is further formed every 11 by 3 blocks. In other words, the CIF picture is formed by 2 by 6 GOBs, and each GOB is further formed by 11 by 3 macroblocks. In the present invention, a picture area of one frame is divided in coding control into not less than two areas. This area is an area having an arbitrary magnitude and not restricted to an area of a GOB, while in each embodiment of the present invention this area is assumed to be a GOB for making description. It is assumed that "GOB" is used as an expression meaning a partial picture as the aforementioned set of pixels, and also used as an expression meaning an area of the partial picture. It is also assumed that among GOBs in each frame, GOBs having the same position in the frame are not distinguished but identified as the same GOBs, and referred to with assignment of the same number. Concretely, numbers from GOB1 to GOB12 are assigned to GOBs in the order shown in FIG. 1 and FIG. 2. Each GOB is coded with the quantization characteristic shown in FIG. 1 and FIG. 2. In other words, macroblocks forming each GOB are coded with the quantization characteristic shown in FIG. 1 and FIG. 2.

Also in each embodiment of the present invention, an upper bound threshold and a lower bound threshold of a generated information amount are decided every state of the quantization characteristic, similarly to the conventional coding control method disclosed in JP-A-7-107482. These upper bound and lower bound thresholds are set to hold a target generated information amount set for the picture frame therebetween. It is assumed that these upper and lower thresholds are generally referred to as "state transition threshold".

First Embodiment

A coding control method and an apparatus according to a first embodiment of the present invention are now described.

In this embodiment, coding control is so performed as to switch such coding that the quantization characteristic employed for coding each GOB forming one picture frame varies with the GOB and such coding that all are identical in response to a generated information amount resulting from coding one picture frame. For such coding control, a concept "coding control state" is introduced.

Figure 1:
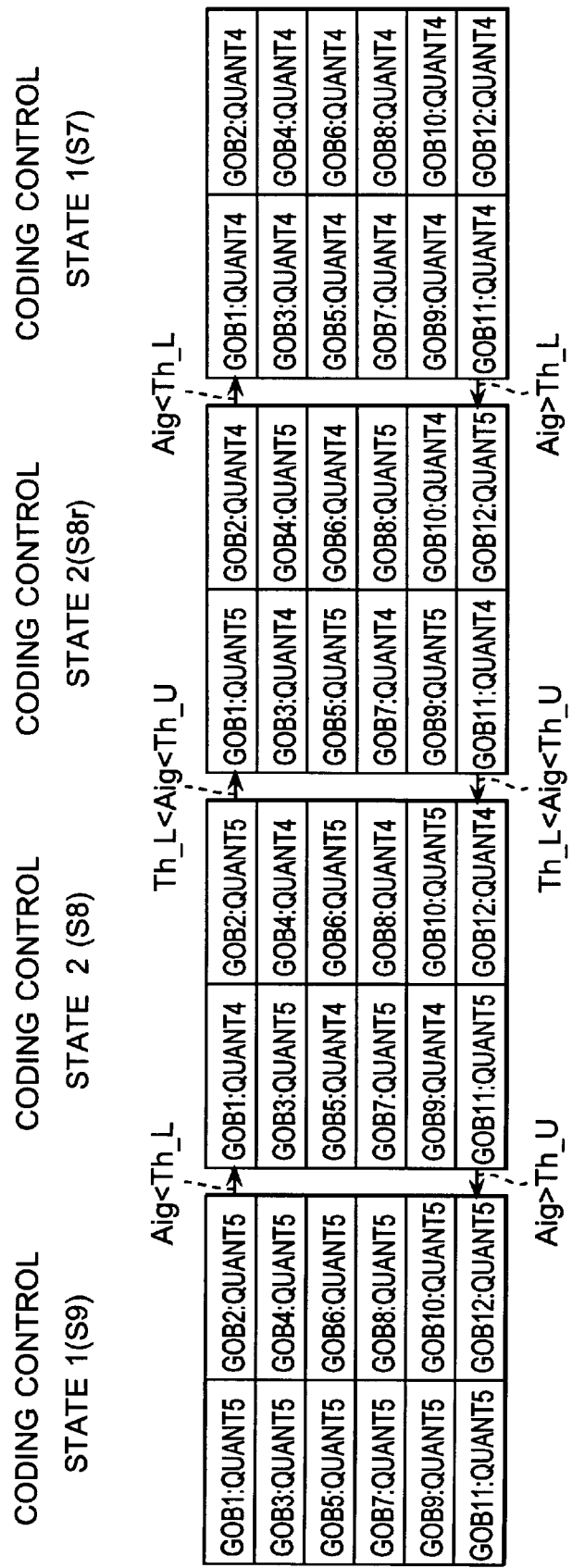
FIG. 1 is a diagram showing an exemplary operation of a coding control apparatus according to a second embodiment of the present invention.

FIG. 1 shows transition of the coding control state when the generated information amount falls below the lower bound of the state transition threshold and when the generated information amount exceeds the upper bound of the state transition threshold. Referring to FIG. 1, "coding control state 1" means such a state that all quantization characteristics employed for coding each GOB forming a picture frame are identical. Further, "coding control state 2" means a state previously dividing GOBs into two groups of first and second, assuming that all GOBs belonging to the same group are coded with the same quantization characteristic, and coding either group with the same quantization characteristic as a first coding control state 1 while coding the other group with the same quantization characteristic as a second coding control state 1 respectively. The first coding control state 1 corresponds to the certain state $q(s)$ of the quantization characteristic in the aforementioned conventional coding control method, and the second coding control state 1 corresponds to the state $q(s+1)$ of the quantization characteristic subsequent to the state $q(s)$. In this embodiment, grouping in the coding control state 2 is so performed that the generated information amount of the first group and that of the second group are equal to each other when performing coding with the same quantization characteristic, whereby the object of the present invention is attained. In other words, it is the object to simply create such a state that the generated information amount becomes the average generated information amount of the first coding control state 1 and the second coding control state 1 as the coding control state 2.

The coding control method according to this embodiment is now concretely described. This embodiment aims at, by spatially alternately arranging GOBs of different groups, substantially equally separating into two groups a background, a person and the like which are objects respectively. In this case, this aim is attained in higher precision, as an area forming the base is refined, while to what extent the refinement is performed becomes trade-off with the processing amount. It is hereinafter assumed that, among GOB1 to GOB12 forming one frame, GOB1, 4, 5, 8, 9 and 12 form the first group and GOB2, 3, 6, 7, 10 and 11 form the second group.

FIG. 22 is a block diagram showing the structure of a quantization control part in the coding control apparatus according to this embodiment, i.e., a block diagram showing an exemplary structure of the quantization control part 124 in the aforementioned coding control apparatus 122 shown in FIG. 21 (it is hereinafter assumed that the quantization control part of this structure is denoted by reference numeral "131"). This quantization control part 131 comprises a state transition threshold upper bound storage part 132, a state transition threshold lower bound storage part 133, a threshold comparison part 134 and a quantization characteristic decision part 135, inputs a signal indicating a generated information amount Aig resulting from coding one picture frame in the video coding part 125, decides quantization characteristics Q1 and Q2 employed for coding the GOBs of the first and second groups, and inputs signals indicating the decided quantization characteristics as control signals for quantization in the video coding part 125.

The state transition threshold upper bound storage part 132 holds a predetermined upper bound Th_U of the state transition threshold, and the state transition threshold lower bound storage part 133 holds a predetermined lower bound Th_L of the state transition threshold respectively. The threshold comparison part 134 compares these upper bound Th_U and lower bound Th_L of the state transition threshold with the generated information amount Aig resulting from coding one picture frame, and if the generated information amount Aig is below the lower bound Th_L of the state transition threshold, it outputs a signal instructing change of the quantization characteristic in a direction improving the picture quality as a signal indicating a transition factor 1, while, if the generated information amount Aig is between the lower bound Th_L and the upper bound Th_U of the state transition threshold, it outputs a signal instructing maintenance of the picture quality as a signal indicating a transition factor 2, and, if the generated information amount Aig exceeds the upper bound Th_U of the state transition threshold, it outputs a signal instructing change of the quantization characteristic in a direction deteriorating the picture quality as a signal indicating a transition factor 3. On the basis of the signal indicating any of these transition factors 1 to 3, the quantization characteristic decision part 135 outputs a signal indicating the quantization characteristic Q1 employed for coding the GOBs of the first group (hereinafter simply referred to as "quantization characteristic Q1 for the first group"), and a signal indicating the quantization characteristic Q2 employed for coding the GOBs of the second group (hereinafter simply referred to as "quantization characteristic Q2 for the second group"). These signals indicating the quantization characteristics Q1 and Q2 are inputted in the video coding part 125, and in the video coding part 125, coding of a next picture frame is performed with these quantization characteristics Q1 and Q2.

Figure 23A:
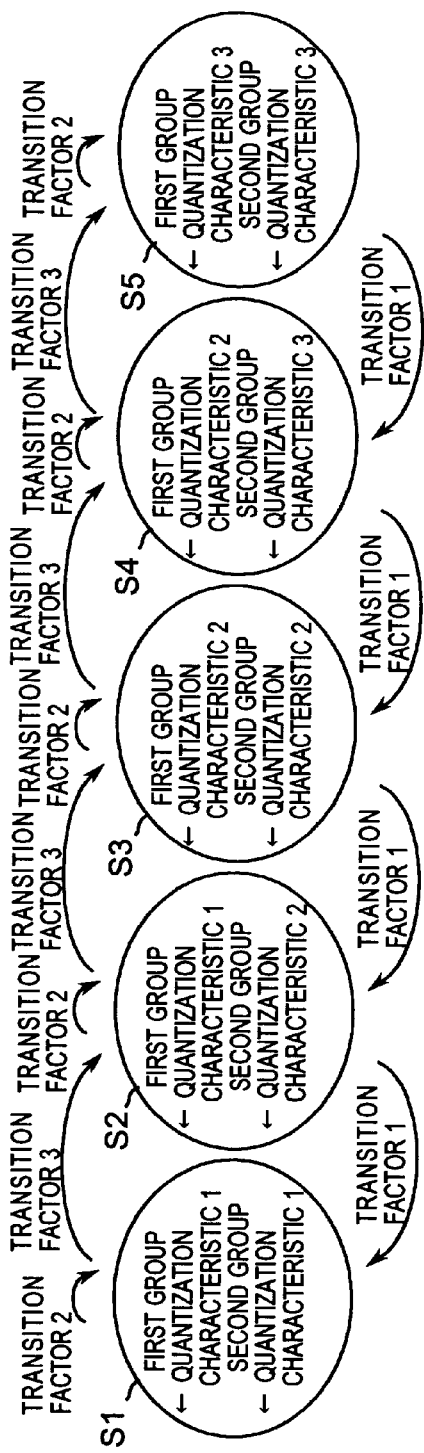
FIG. 23 is a state transition diagram showing an operation of the coding control part in the coding control apparatus according to the first embodiment.
Figure 23B:
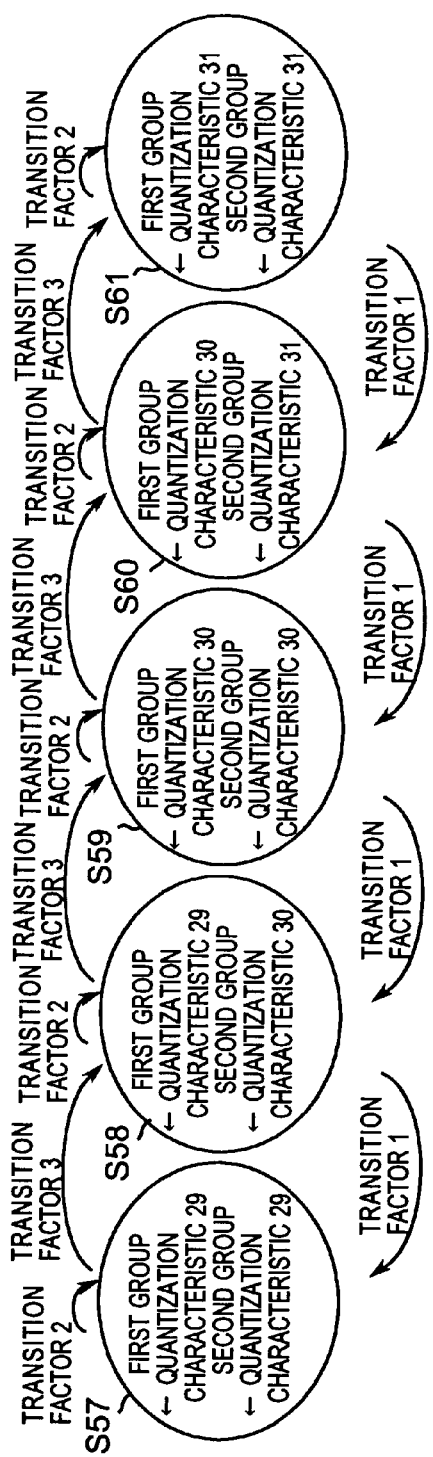

FIG. 23 is a state transition diagram showing the operation of the quantization control part 131. The state of the quantization control part 131 corresponds to the combination of the quantization characteristic Q1 for the first group and the quantization characteristic Q2 for the second group. It is hereinafter assumed that the state of the quantization control part is called "quantization state", and this is specified by the combination (Q1, Q2) of the values of the quantization characteristics Q1 and Q2. It is also assumed that the quantization characteristics are identified with natural numbers, and largeness/smallness of a quantization characteristic j corresponds to largeness/smallness of j. As j increases, therefore, the quantization step size also increases while quantization precision lowers. In the drawings, it is assumed that quantization characteristics are denoted as "QUANT".

Consider such a case that both of the quantization characteristics Q1 and Q2 employed for coding the GOBs of the first and second groups are a quantization characteristic 1, i.e., the case of (Q1, Q2)=(1, 1). When the transition factor 3 takes place in a quantization state $S_1$ where (Q1, Q2)=(1, 1), the state of the quantization control part 131 makes transition to a quantization state $S_2$ where (Q1, Q2)=(1, 2), and the quantization characteristic decision part 135 outputs a signal indicating the quantization characteristic 1 as the quantization characteristic Q1 for the first group and a signal indicating a quantization characteristic 2 as the quantization characteristic Q2 for the second group respectively. Since the quantization state $S_1$ belongs to the coding control state 1 and the quantization state $S_2$ belongs to the coding control state 2, the aforementioned state transition is also transition from the coding control state 1 to the coding control state 2. Thereafter when the transition factor 1 takes place in the quantization state $S_2$, the state of the quantization control part 131 returns to the quantization state $S_1$ belonging to the coding control state 1, and the quantization characteristic decision part 135 outputs, as the signal indicating the quantization characteristic Q1 for the first group and the quantization characteristic Q2 for the second group, signals both indicating the quantization characteristic 1.

On the other hand, when the transition factor 3 takes place in the quantization state $S_2$, the state of the quantization control part 131 makes transition to a quantization state $S_3$ where (Q1, Q2)=(2, 2). This is also transition from the coding control state 2 to the coding control state 1. At this time, the quantization characteristic decision part 135 outputs signals both indicating the quantization characteristic 2 as the quantization characteristic Q1 for the first group and the quantization characteristic Q2 for the second group. Thereafter when the transition factor 1 takes place in the quantization state $S_3$ belonging to the coding control state 1, the state of the quantization control part 131 returns to the quantization state $S_2$ belonging to the coding control state 2, and the quantization characteristic decision part 135 outputs a signal indicating the quantization characteristic 1 as the quantization characteristic Q1 for the first group and a signal indicating the quantization characteristic 2 as the quantization characteristic Q2 for the second group respectively. When the transition factor 3 takes place in the quantization state $S_3$, on the other hand, the state of the quantization control part 131 makes transition to a quantization state $S_4$ belonging to the coding control state 2, and the quantization characteristic decision part 135 outputs a signal indicating the quantization characteristic 2 as the quantization characteristic Q1 for the first group and a signal indicating the quantization characteristic 3 as the quantization characteristic Q2 for the second group respectively.

Thereafter, in a similar manner, the quantization state of the quantization control part 131 makes transition, every time the transition factor 3 takes place, in a direction where the numerical value indicating the quantization characteristic increases, i.e., in a direction where the quantization precision lowers, while the quantization state makes transition, every time the transition factor 1 takes place, in a direction where the numerical value indicating the quantization characteristic reduces, i.e., in a direction where the quantization precision improves. The quantization decision part 135 outputs as signals indicating the quantization characteristics for the first and second groups signals indicating quantization characteristics corresponding to each quantization state of the transition destination. If the transition factor 2 takes place in each quantization state, the quantization control part 131 remains in the quantization state, and output signals from the quantization characteristic decision part 135 remain unchanged.

Figure 7A:
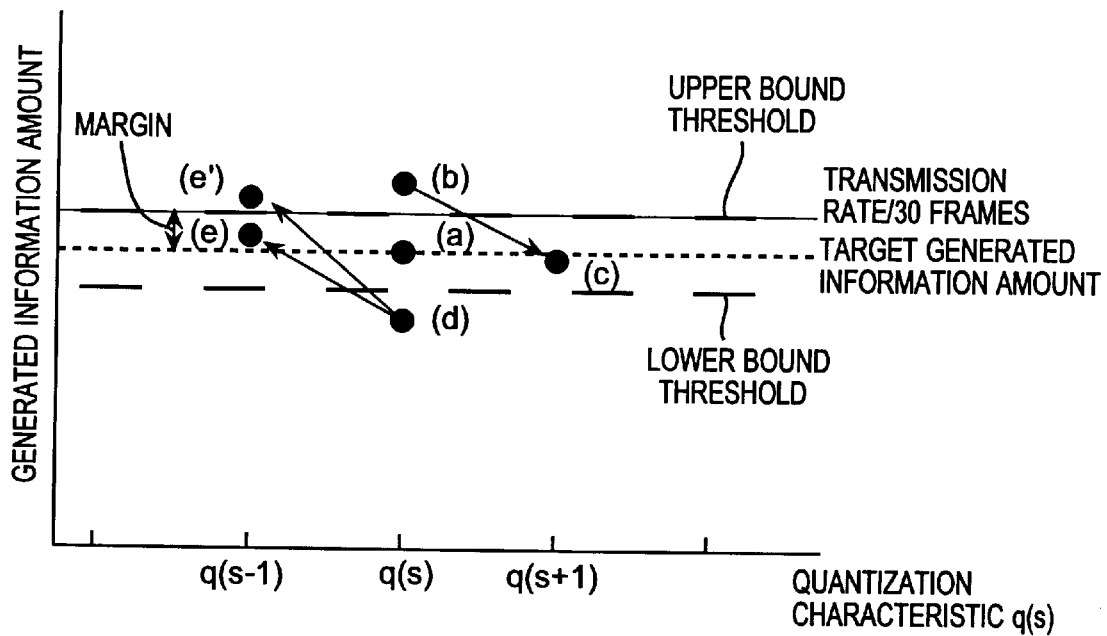
FIG. 7A is a diagram for illustrating a conventional coding control method setting a quantization characteristic every frame.
Figure 7B:
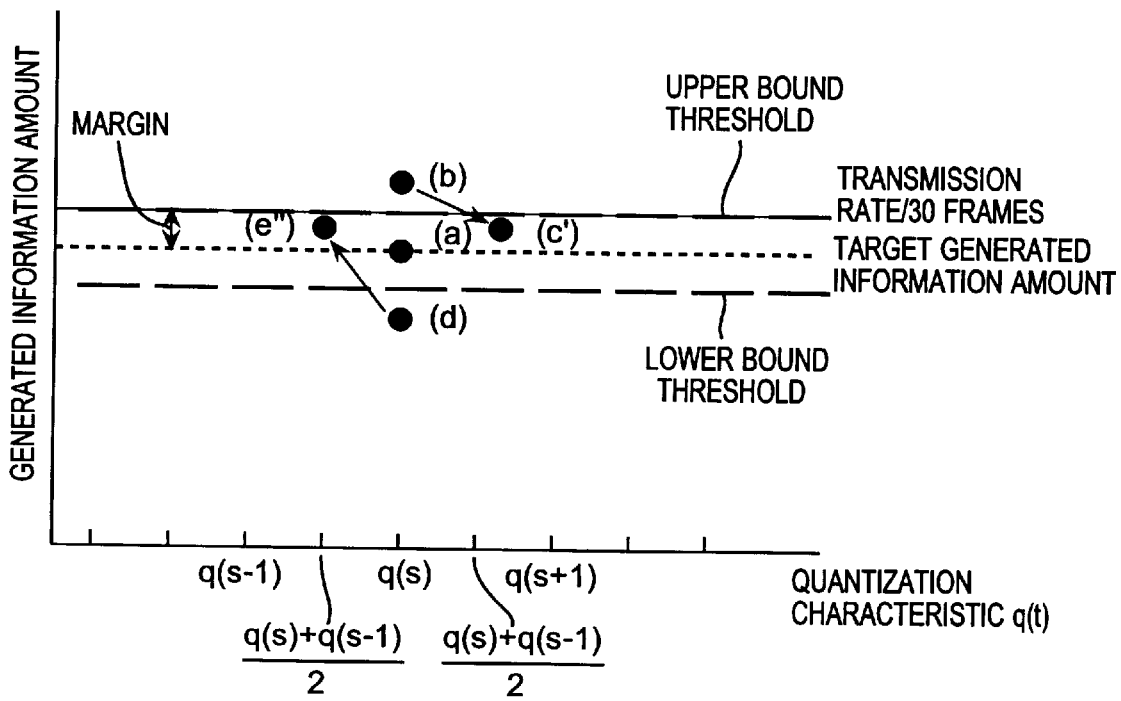
FIG. 7B is a diagram for illustrating a coding control method according to the present invention.
Figure 8A:
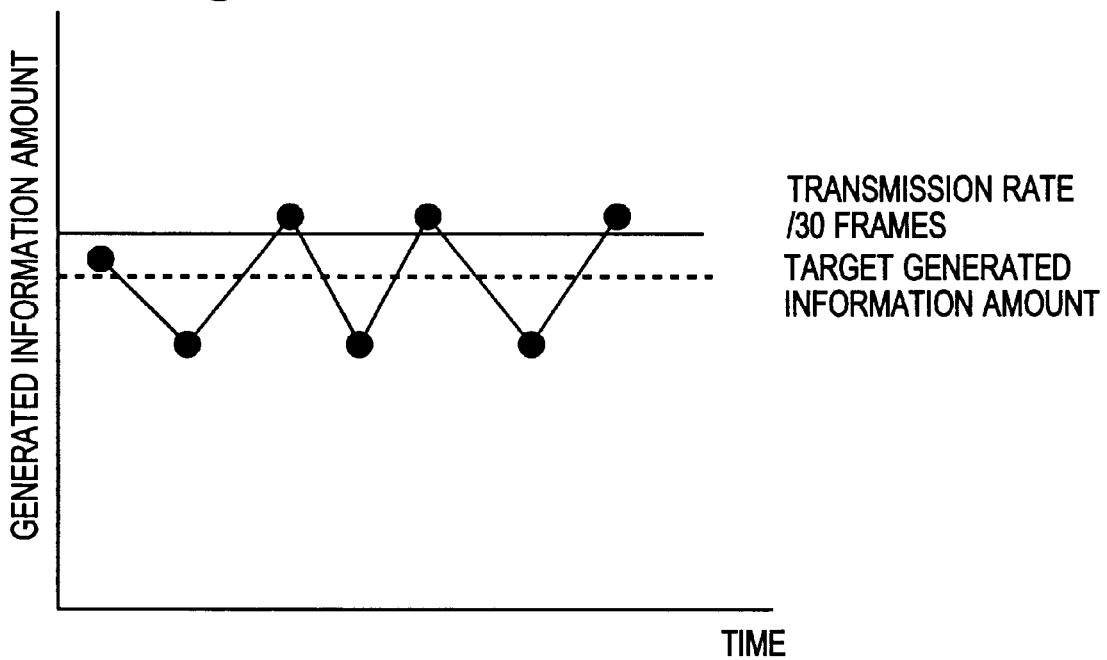
FIG. 8A is a diagram for illustrating problems of the conventional coding control method.
Figure 8B:
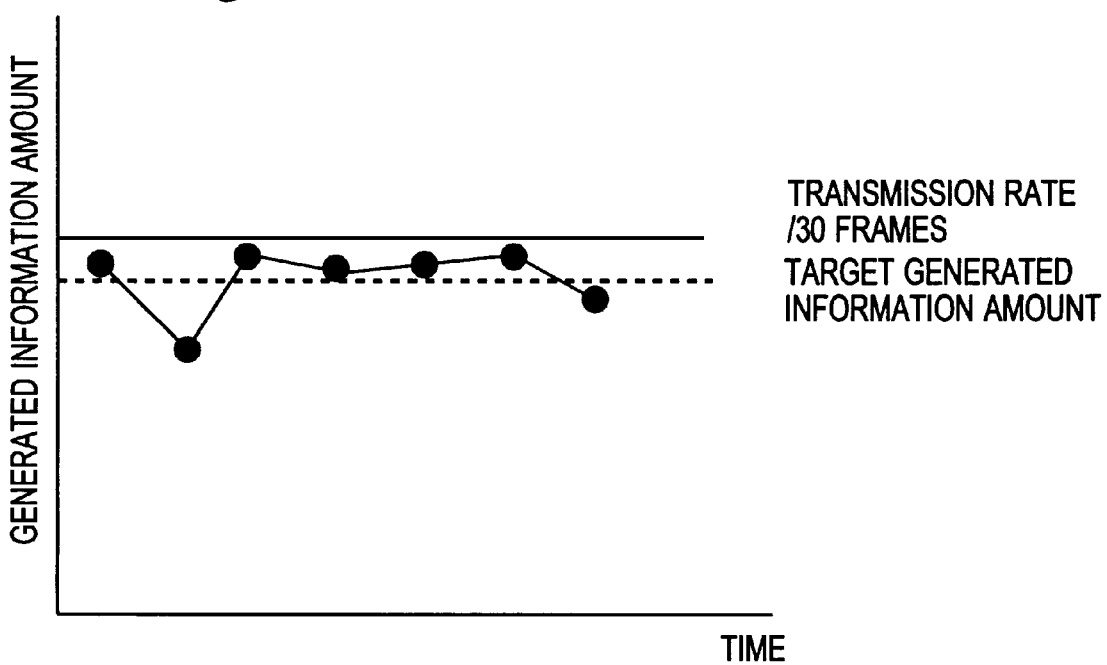
FIG. 8B is a diagram for illustrating a result in the case of applying the coding control method according to the present invention.

According to the first embodiment, as described above, even if the generated information amount resulting from performing coding with the quantization characteristic q(s), i.e., the generated information amount denoted by the point d in FIG. 7A changes due to state transition to the quantization state of the quantization characteristic q(s+1) to the generated information amount denoted by the point e' in FIG. 7A, it is possible by creating an average state of q(s) and q(s+1) to make transition to the quantization state of the quantization characteristic corresponding to the point e" as shown in FIG. 7B. Consequently, as shown in FIG. 8B, errors between the generated information amount resulting from coding and target information reduce, and the control precision of the generated information amount by the quantization control part 131 improves.

While in the aforementioned first embodiment two states are present as the coding control state, not less than three coding control states may be present. Concretely, the following coding control is considerable, for example. While in the aforementioned first embodiment grouping is so performed that, when coding each GOB of one picture frame with the same quantization characteristic the generated information amount resulting from the GOBs of the first group and the generated information amount resulting from coding the GOBs of the second group are substantially equal to each other, grouping is so performed that the generated information amount resulting from coding the GOBs of the second group is substantially twice the generated information amount resulting from coding the GOBs of the first group, for example (for example, grouping is so performed that the number of the GOBs of the second group is twice the number of the GOBs of the first group) Thus, a coding control state using the quantization characteristic q(s) for coding the GOBs of the first group and the quantization characteristic q(s+1) for coding the second group respectively and a coding state using the quantization characteristic q(s+1) for coding the GOBs of the first group and the quantization characteristic q(s) for coding the second group can be created as separate coding control states between the first coding control state 1 and the second coding control state 1. When thus increasing the state number of the coding control state, the quantization characteristics can be more finely set, whereby fluctuation of the generated information amount can be more reduced.

While the aforementioned first embodiment decides, on the basis of the generated information amount resulting coding one picture frame, the quantization characteristics employed in coding the next picture frame, the quantization characteristics employed in coding the next picture frame may be decided on the basis of an occupied amount in a smoothing buffer (transmission buffer) for transmitting coded data.

Second Embodiment

Figure 24:
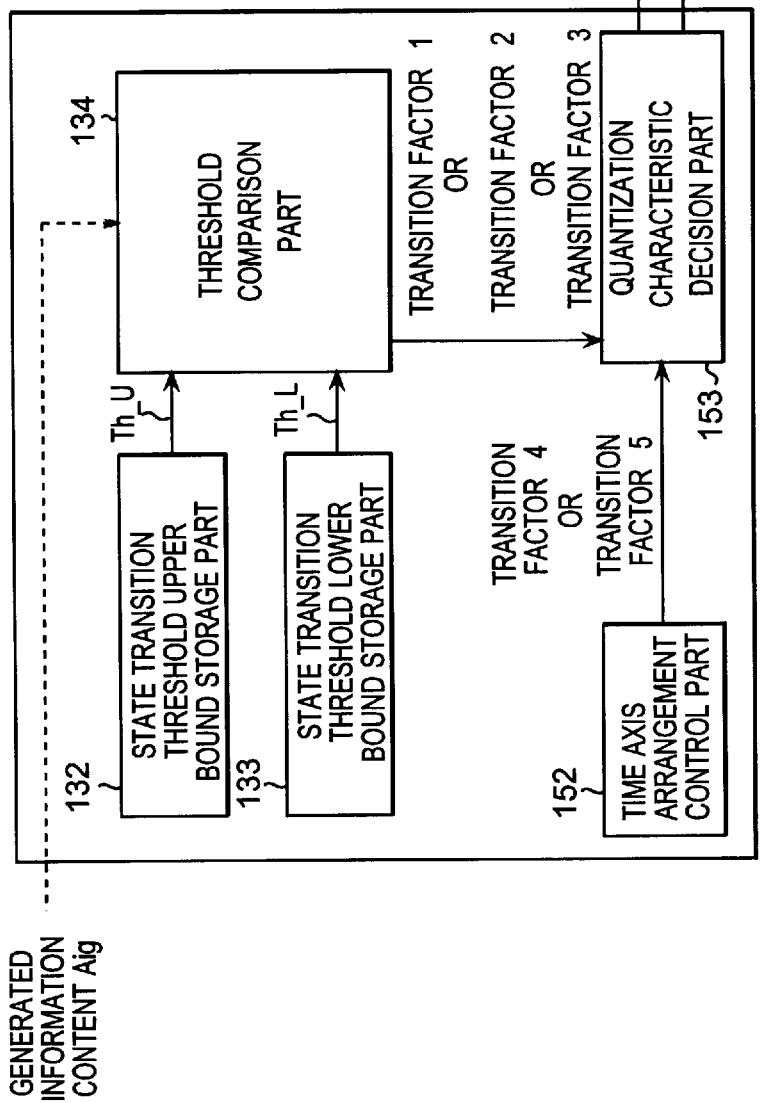
FIG. 24 is a block diagram showing the structure of a quantization control part in the coding control apparatus according to the second embodiment.

FIG. 24 is a block diagram showing the structure of a quantization control part in a coding control apparatus according to this embodiment, i.e., a block diagram showing another exemplary structure of the quantization control part 124 in the aforementioned coding control apparatus 122 shown in FIG. 21 (it is hereinafter assumed that the quantization control part of this structure is denoted by reference numeral "151"). Similarly to the quantization control part 131 in the first embodiment shown in FIG. 22, this quantization control part 151 comprises a state transition threshold upper bound storage part 132, a state transition threshold lower bound storage part 133, a threshold comparison part 134 and a quantization characteristic decision part 153. In addition to these, the quantization control part 151 comprises a time axis placement control part 152, and differs in this point from the quantization control part 131 in the first embodiment.

When the quantization control part 151 is in a quantization state belonging to a coding control state 2, this time axis placement control part 152 inputs control signals, for exchanging a quantization characteristic Q1 for a first group and a quantization characteristic Q2 for a second group every picture frame, in the quantization characteristic decision part 153. In other words, it outputs a signal indicating a transition factor 4 letting the quantization state make transition in the coding control state 2 so that the quantization characteristic Q1 for the first group is greater than the quantization characteristic Q2 for the second group and a signal indicating a transition factor 5 letting the quantization state make transition in the coding control state 2 so that the quantization characteristic Q1 for the first group is less than the quantization characteristic Q2 for the second group every picture frame alternately in the quantization characteristic decision part 153. As already described, largeness/smallness of the quantization characteristic (QUANT) corresponds to largeness/smallness of the quantization step size. Therefore, if the quantization characteristic for the first group is greater than the quantization characteristic for the second group, for example, the quantization precision in coding of GOBs of the first group is lower than the quantization precision in coding of GOBs of the second group.

The quantization characteristic decision part 153 in this embodiment inputs, on the basis of a signal indicating any of transition factors 1 to 3 outputted from the threshold comparison part 134 and a signal indicating the transition factor 4 or 5 outputted from the time axis placement control part 152, a signal indicating the quantization characteristic Q1 for the first group and a signal indicating the quantization characteristic Q2 for the second group as control signals for quantization in the video coding part 125.

The remaining elements in the quantization control part 151, other than the aforementioned time axis placement control part 152 and quantization characteristic decision part 153, are similar to those in the first embodiment, and the same reference numerals are assigned to the same parts.

FIG. 25 is a state transition diagram showing the operation of the quantization control part 151. Also in this embodiment, the quantization control part 151 has quantization states $S_1$ to $S_{61}$ similar to those in the first embodiment shown in FIG. 23. The quantization control part 151 further has, in addition to these quantization states $S_1$ to $S_{61}$, quantization states $S_{2r}$, $S_{4r}$, ... $S_{60r}$ corresponding to the quantization states $S_2, S_4, \ldots S_{60}$ belonging to the respective ones of the coding control state 2. This quantization state $S_{2ir}$ (i=1, 2, ..., 30) belongs to the coding control state 2, and is a quantization state exchanging the quantization characteristic Q1 for the first group and the quantization characteristic Q2 for the second group in the corresponding quantization state $S_{2i}$.

Consider such a case that the quantization control part 151 is in a certain quantization state $S_{2i}$ belonging to the coding control state 2 (i.e., the case of Q1≠Q2). When both the transition factor 2 and the transition factor 4 take place in this quantization state $S_{2i}$, the quantization control part 151 makes transition to the quantization state $S_{2ir}$, and the quantization characteristic decision part 153 outputs signals exchanging the signal indicating the quantization characteristic Q1 for the first group and the signal indicating the quantization characteristic Q2 for the second group in the quantization state $S_{2i}$ before the transition as the control signals for quantization. In other words, the quantization characteristic decision part 153 outputs a signal indicating a quantization characteristic (i+1) as the quantization characteristic Q1 for the first group and a signal indicating a quantization characteristic i as the quantization characteristic Q2 for the second group respectively. Thereafter, when both the transition factor 2 and the transition factor 5 take place in this quantization state $S_{2ir}$, the state of the quantization control part 151 returns to the quantization state $S_{2i}$, and the quantization characteristic decision part 153 outputs a signal indicating the quantization characteristic i as the quantization characteristic Q1 for the first group and a signal indicating the quantization characteristic (i+1) as the signal indicating the quantization characteristic Q2 for the second group respectively. As already described, a signal indicating the transition factor 2 is a signal instructing maintenance of the picture quality, and indicates that a generated information amount Aig is between an upper bound and a lower bound of a state transition threshold. Further, the transition factor 4 indicates a factor letting the quantization state make transition in the coding control state 2 so that Q1>Q2, the transition factor 5 indicates a factor letting the quantization state make transition in the coding control state 2 so that Q1<Q2, and the signal indicating the transition factor 4 and the signal indicating the transition factor 5 are every picture frame alternately inputted in the quantization characteristic decision part 153. Therefore, while the generated information amount Aig is between the upper bound and the lower bound of the state transition threshold, state transition is repeated between the quantization states $S_{2i}$ and $S_{2ir}$, whereby every picture frame a quantization characteristic for GOBs having improved the picture quality and a quantization characteristic for GOBs having not improved the picture quality are exchanged. Consequently, the GOBs having improved the picture quality disperse in relation to the time direction.

When the transition factor 1 takes place in the quantization state $S_{2ir}$, the state of the quantization control part 151 returns to a quantization state $S_{2i-1}$ belonging to the coding control state 1, and the quantization characteristic decision part 153 outputs signals both indicating the quantization characteristic i as the quantization characteristic Q1 for the first group and the quantization characteristic Q2 for the second group. When the transition factor 3 takes place in the quantization state $S_{2ir}$, on the other hand, the state of the quantization control part 151 makes transition to a quantization state $S_{2i+1}$ belonging to the coding control state 1, and the quantization characteristic decision part 153 outputs signals both indicating the quantization characteristic (i+1) as the quantization characteristic Q1 for the first group and the quantization characteristic Q2 for the second group.

State transition other than the above, i.e., state transition among quantization states $S_j$ (j=1, 2, ..., 61) and the operation of the quantization characteristic decision part 153 following the state transition are similar to the state transition and the operation of the quantization characteristic decision part 135 in the first embodiment shown in FIG. 23.

As an exemplary operation of the coding control apparatus 122 according to this embodiment comprising the aforementioned quantization control part 151, it is assumed that the quantization characteristic q(s) employed for coding each GOB is entirely the quantization characteristic 5, i.e., the state of the quantization control part 151 is the quantization state $S_9$ (first coding control state 1), and the operation in the case where the quantization state makes transition in a direction improving the picture quality is described with reference to FIG. 1.

If the generated information amount Aig when coding each GOB with the quantization characteristic 5 falls below the lower bound Th_L of the state transition threshold, the state of the quantization control part 151 makes transition to the quantization state $S_8$ belonging to the coding control state 2, while the quantization characteristic employed for coding GOBs of the first group, i.e., GOB1, 4, 5, 8, 9 and 12 is changed by the quantization characteristic decision part 153 from 5 to 4 so that the GOBs improving the picture quality disperse. Further, assuming that the generated information amount Aig when coding the GOBs of the first group with the quantization characteristic 4 and coding the GOBs of the second group which are the remaining GOBs with the quantization characteristic 5 has been between the upper bound Th_U and the lower bound Th_L of the state transition threshold, the state of the quantization control part 151 is held in the coding control state 2 while the quantization characteristic for the GOBs having improved the picture quality and the quantization characteristic for the GOBs having not improved the picture quality are exchanged by the quantization characteristic decision part 153 so that the GOBs having improved the picture quality disperse also in relation to the time direction. In other words, the quantization state alternately makes transition in the coding control state 2 between a quantization state $S_8$ and a quantization state $S_{8r}$. This is performed for the purpose of rendering non-uniformity of the picture quality resulting from the quantization characteristic varying with each GOB inconspicuous. In the example shown in FIG. 1, the quantization characteristics are so set in the quantization state $S_{8r}$ as to code GOB2, 3, 6, 7, 10 and 11 which are the GOBs of the second group with the quantization characteristic 4 and to code the GOBs of the first group which are the remaining GOBs with the quantization characteristic 5.

If the generated information amount Aig when coding each GOB with a quantization characteristic set in the coding control state 2 falls below the lower bound Th_L of the state transition threshold, the state of the quantization control part 151 makes transition to a quantization state $S_7$ belonging to the coding control state 1 (second coding control state 1), and the quantization characteristic is so set by the quantization characteristic decision part 153 as to code each GOB entirely with the quantization characteristic 4.

When the coding control state makes transition in a direction deteriorating the picture quality, i.e., when the generated information amount Aig exceeds the upper bound Th_U of the state transition threshold, it operates in a procedure reverse to the aforementioned case where the coding control state makes transition in the direction improving the picture quality, and hence description is omitted.

When the generated information amount Aig further falls below the lower bound Th_L of the state transition threshold in the second coding control state 1, the second coding control state 1 is replaced by the first coding control state 1 in the above description and the subsequent operation is performed. When the generated information amount Aig exceeds the upper bound Th_U of the state transition threshold in the first coding control state 1, the first coding control state 1 is replaced by the second coding control state 1 in the above description and the subsequent operation is performed.

According to the aforementioned second embodiment, similarly to the first embodiment, the average state of the states q(s) and q(s+1) of the quantization characteristic is introduced, thereby reducing errors between the generated information amount resulting from coding and the target generated information amount and improving control precision of the generated information amount Aig by the quantization control part 151.

According to the second embodiment, further, while the generated information amount Aig is between the upper bound Th_U and the lower bound Th_L of the state transition threshold when the quantization coding control part 151 is in the coding control state 2, the quantization characteristic Q1 for the GOBs of the first group and the quantization characteristic Q2 for the second group are exchanged every picture frame. In other words, in the coding control state 2 where Q1≠Q2, the quantization characteristic for the GOBs having improved the picture quality and the quantization characteristic for the GOBs having not improved the picture quality are exchanged every frame. Thus, the GOBs having improved the picture quality disperse also in relation to the time direction, and non-uniformity of the picture quality resulting from the quantization characteristic varying with each GOB becomes inconspicuous.

Third Embodiment

Figure 26:
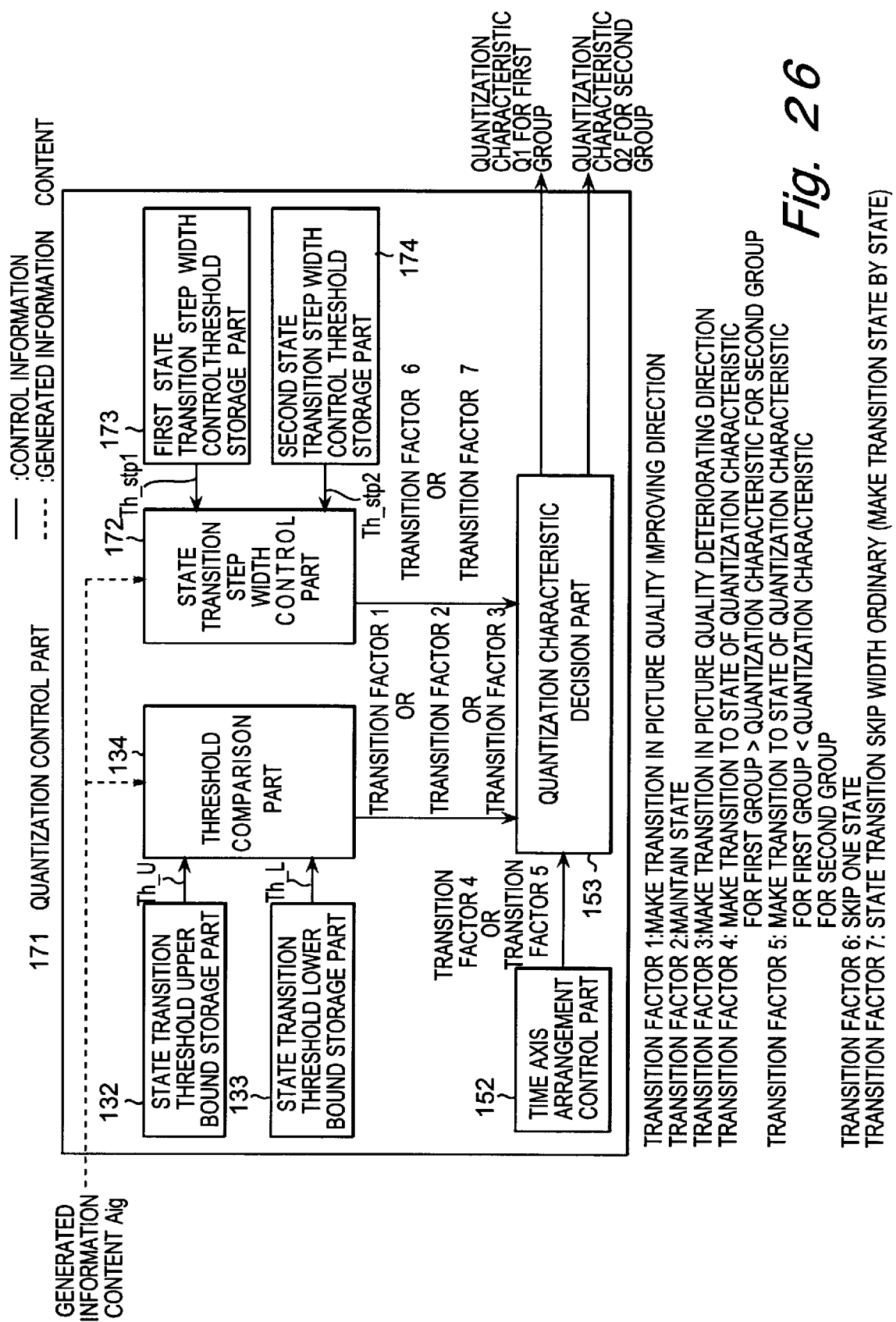
FIG. 26 is a block diagram showing the structure of a quantization control part in the coding control apparatus according to the third embodiment.

FIG. 26 is a block diagram showing the structure of a quantization control part in a coding control apparatus according to this embodiment, i.e., a block diagram showing a third exemplary structure of the quantization control part 124 in the aforementioned coding control apparatus 122 shown in FIG. 21 (it is hereinafter assumed that the quantization control part of this structure is denoted by reference numeral "171"). This quantization control part 171 comprises, similarly to the quantization control part 151 in the second embodiment shown in FIG. 24, a state transition threshold upper bound storage part 132, a state transition threshold lower bound storage part 133, a threshold comparison part 134, a time axis placement control part 152 and a quantization characteristic decision part 175. In addition to these, the quantization control part 171 comprises a state transition step width control part 172, a first state transition step width control threshold storage part 173 and a second state transition step width control threshold storage part 174, and differs in this point from the quantization control part 151 in the second embodiment.

The first state transition step width control threshold storage part 173 holds a first state transition step width control threshold Th_stp1 as a predetermined value, and the second state transition step width control threshold storage part 174 holds a second state transition step width control threshold Th_stp2 as a predetermined value respectively. The state transition step width control part 172 compares these state transition step width control thresholds Th_stp1 and Th_stp2 with a generated information amount Aig resulting from coding one picture frame, and if the generated information amount Aig exceeds the first state transition step width control threshold Th_stp1 or the generated information amount Aig falls below the second state transition step width control threshold Th_stp2, it outputs a signal instructing skipping of one quantization state as a signal indicating a transition factor 6, while, if the generated information amount Aig is between the first state transition step width control threshold Th_stp1 and the second state transition step width control threshold Th_stp2, it outputs a signal instructing an operation of not skipping but making transition one quantization state at a time as a signal indicating a transition factor 7.

In this embodiment, the quantization characteristic decision part 175 generates, on the basis of a signal indicating any of transition factors 1 to 3 outputted from the threshold comparison part 134, a signal indicating a transition factor 4 or 5 outputted from the time axis placement control part 152 and a signal indicating a transition factor 6 or 7 outputted from the state transition step width control part 172, a signal indicating a quantization characteristic Q1 for a first group and a signal indicating a quantization characteristic Q2 for a second group as control signals for quantization, to input these signals into a video coding part 125.

The remaining elements other than the aforementioned state transition step width control part 172, first state transition step width control threshold storage part 173, second state transition step width control threshold storage part 174 and quantization characteristic decision part 175 in the quantization control part 171 are similar to those in the second embodiment, and the same reference numerals are assigned to the same parts.

Figures 27A, 27B:
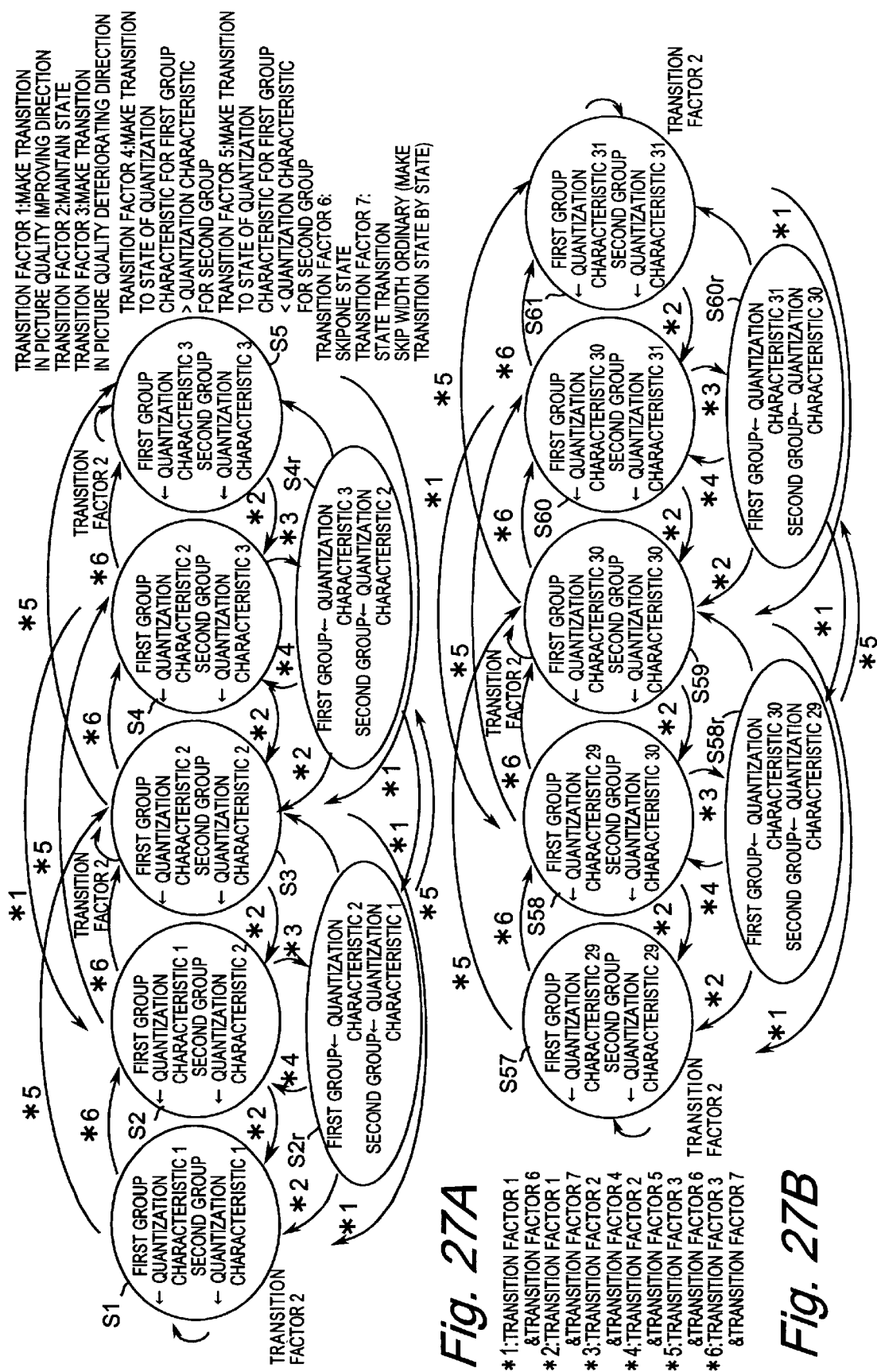
FIG. 27 is a state transition diagram showing an operation of the quantization control part in the coding control apparatus according to the third embodiment.

FIG. 27 is a state transition diagram showing the operation of the quantization control part 171. Also in this embodiment, the quantization control part 171 has quantization states $S_1, S_2, \ldots, S_6$ and quantization states $S_{2r}, S_{4r}, \ldots, S_{60r}$ similar to those in the second embodiment shown in FIG. 25. In this embodiment, however, state transition skipping one quantization state is present in addition to the state transition in the second embodiment, and in this point the state transition of this embodiment differs from the state transition of the second embodiment. This difference is now described.

While the generated information amount Aig is between the first state transition step width control threshold Th_stp1 and the second state transition step width control threshold Th_stp2, a signal indicating the transition factor 7 is outputted from the state transition step width control part 172, and state transition similar to that in the second embodiment is performed in response to the signal outputted from the threshold comparison part 134. However, if the generated information amount Aig exceeds the first state transition step width control threshold Th_stp1 or the generated information amount Aig falls below the second state transition step width control threshold Th_stp2, a signal indicating the transition factor 6 is outputted from the state transition step width control part 172, and in response to the signal indicating the transition factor 1 or 3 outputted from the threshold comparison part 134, state transition skipping one quantization state is performed. For example, when the quantization control part 171 is in a quantization state $S_i$ (i=1, 2, ..., 61), the state of the quantization control part 171 skips a quantization state $S_{i-1}$ and makes transition to a quantization state $S_{i-2}$ if the signal indicating the transition factor 6 and the signal indicating the transition factor 1 are outputted, while skipping a quantization state $S_{i+1}$ and making transition to a quantization state $S_{i+2}$ if the signal indicating the transition factor 6 and the signal indicating the transition factor 3 are outputted. When the quantization control part 171 is in a quantization state $S_{jr}$ (j=2, 4, ..., 60), the state of the quantization control part 171 skips a quantization state $S_{j-1}$ and makes transition to a quantization state $S_{(j-2)r}$ if the signal indicating the transition factor 6 and the signal indicating the transition factor 1 are outputted, while skipping a quantization state $S_{j+1}$ and making transition to a quantization state $S_{(j+2)r}$ if the signal indicating the transition factor 6 and the signal indicating the transition factor 3 are outputted.

As an exemplary operation of a coding control apparatus 122 of this embodiment comprising the aforementioned quantization control part 171, an operation when inter-frame correlation abruptly lowers due to abrupt motion of an object or scene change or when the inter-frame correlation abruptly rises is described with reference to FIG. 2.

In video coding based on ITU recommendation H.261 and H.263 employing inter-frame difference and thereby obtaining high compressibility, inter-frame correlation abruptly lowers if abrupt motion of an object or scene change takes place, and hence a generated information amount abruptly increases. When the inter-frame correlation abruptly rises, on the other hand, the generated information amount abruptly reduces. In the coding control described with reference to FIG. 1, a state of coding GOBs in one picture frame with a plurality of quantization characteristics (i.e., the coding control state 2) exists and hence, if the generated information amount abruptly increases or the generated information amount abruptly reduces, a delay occurs before setting a quantization characteristic approximating the generated information amount to a target generated information amount (or between the upper bound and the lower bound of the state transition threshold). In other words, such a phenomenon takes place that frame skip is caused when the generated information amount abruptly increases or coding is performed with a quantization characteristic for inferior picture quality although coding can be performed with a quantization characteristic capable of further improving the picture quality when the generated information amount abruptly reduces. In this embodiment, therefore, the first state transition step width control threshold Th_stp1 and the second state transition step width control threshold Th_stp2 are previously set, and when the generated information amount Aig exceeds the first state transition step width control threshold Th_stp1 or the generated information amount Aig falls below the second state transition step width control threshold Th_stp2, coding control increasing the state transition step width and quickly approximating the generated information amount to the target generated information amount is performed.

Figure 2:
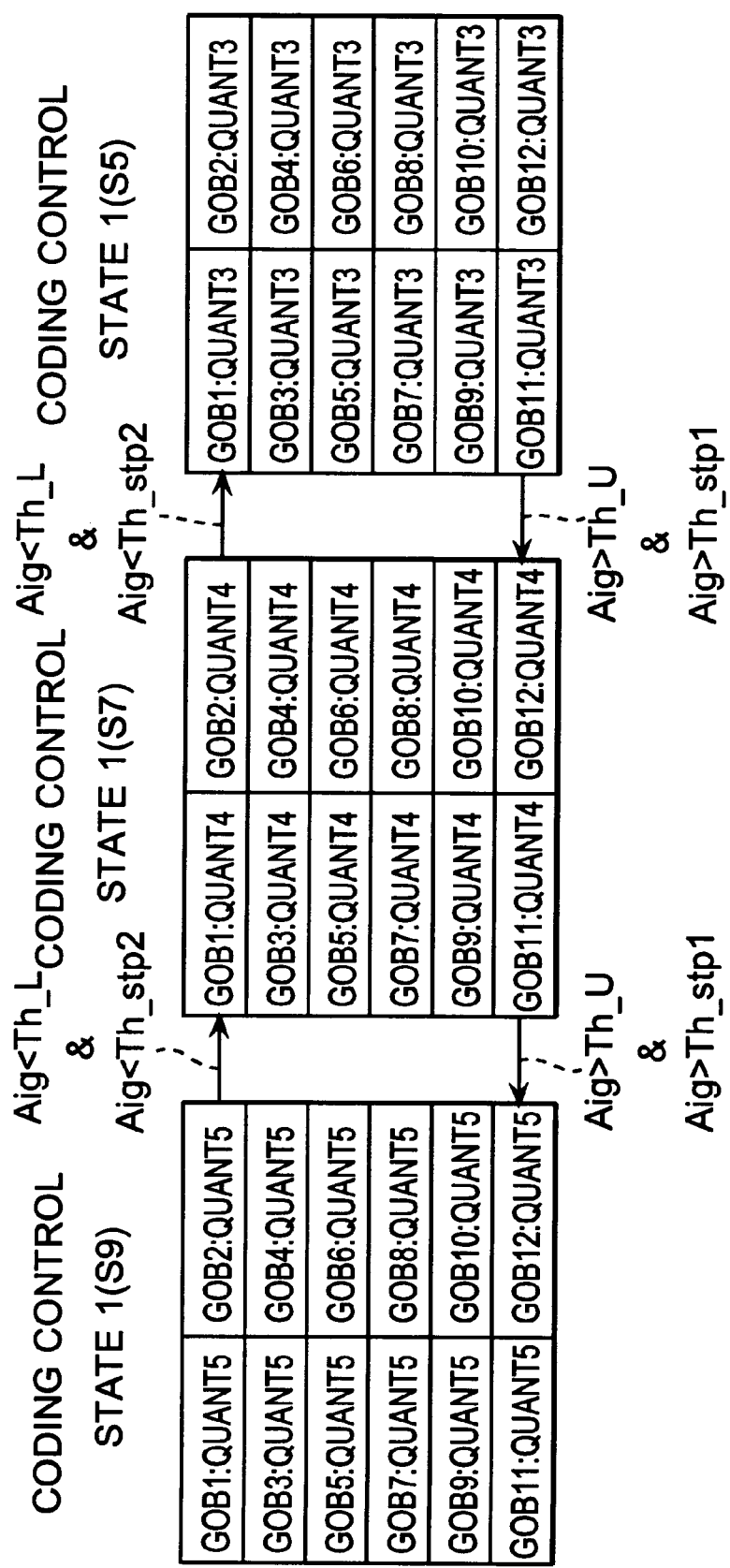
FIG. 2 is a diagram showing an exemplary operation of a coding control apparatus according to a third embodiment of the present invention.

FIG. 2 indicates transition of the quantization state when the generated information amount Aig exceeds the first state transition step width control threshold Th_stp1 and when the generated information amount Aig falls below the second state transition step width control threshold Th_stp2. It is assumed that a coding control state 1 means, similarly to the exemplary operation of the first embodiment shown in FIG. 1, such a state that all quantization characteristics for coding each GOB forming a picture frame are identical.

It is assumed that all quantization characteristics employed for coding each GOB are the quantization characteristic 5, i.e., the state of the quantization control part 171 is a quantization state $S_9$ belonging to the coding control state 1, to consider the case where the quantization state makes transition in the direction improving the picture quality. If the generated information amount Aig when coding each GOB with the quantization characteristic 5 falls below the lower bound Th_L of the state transition threshold and further falls below the second state transition step width control value Th_stp2, all quantization characteristics for each GOB are changed by the quantization control part 171 in the direction improving the picture quality, i.e., changed from the quantization characteristic 5 to the quantization characteristic 4. This means that the state of the quantization control part 171 skips a quantization state $S_8$ belonging to the coding control state 2 and makes transition to a quantization state $S_7$ belonging to the coding control state 1. If the generated information amount Aig when coding each GOB with the quantization characteristic 4 again falls below the lower bound Th_L of the state transition threshold and further falls below the second state transition step width control threshold Th_stp2, all quantization characteristics for each GOB are changed by the quantization control part 171 in the direction improving the picture quality, i.e., changed from the quantization characteristic 4 to the quantization characteristic 3. This means that the state of the quantization control part 171 skips a quantization state $S_6$ belonging to the coding control state 2 and makes transition to a quantization state $S_5$ belonging to the coding control state 1.

When the quantization state makes transition in the direction deteriorating the picture quality, i.e., when the generated information amount Aig exceeds the upper bound Th_U of the state transition threshold and further exceeds the first state transition step width control threshold Th_stp1, it operates in a procedure reverse to the aforementioned case where the quantization state makes transition in the direction improving the picture quality, and hence description is omitted.

Figure 3:
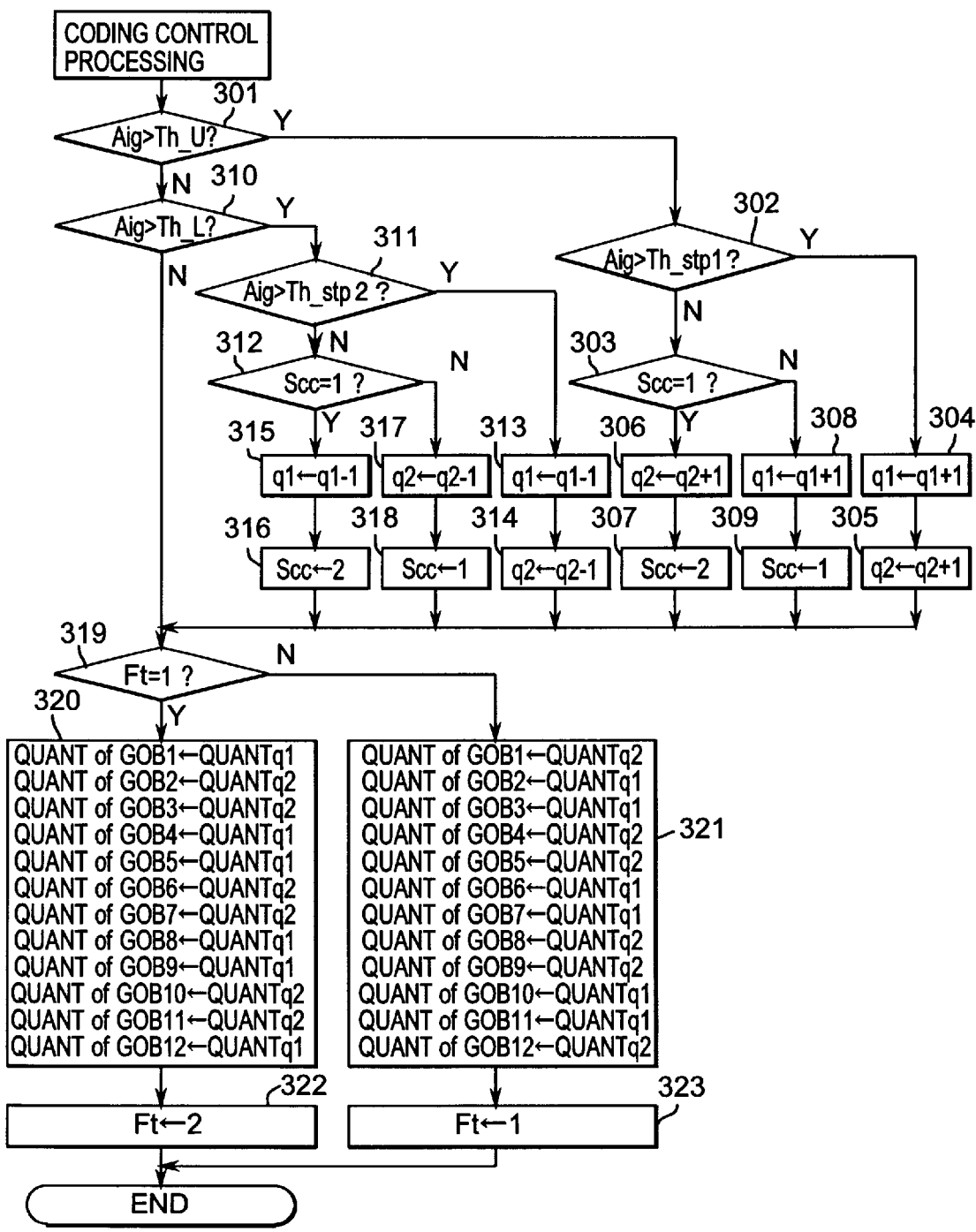
FIG. 3 is a flow chart showing a coding control method according to the third embodiment.

The coding control method used in the aforementioned coding control apparatus according to the third embodiment is now described. FIG. 3 is a flow chart showing coding control processing for one picture frame according to this coding control method. Referring to FIG. 3, quantization characteristics are denoted as "QUANT". Referring to FIG. 3, further, q1 and q2 are numerical values identifying the quantization characteristics, Scc is a variable denoting the coding control state and Ft is a time axis control flag, and it is assumed that q1, q2, Scc and Ft are previously initialized.

As shown in FIG. 3, in the coding control processing according to the third embodiment, the threshold comparison part 134 first determines whether or not the generated information amount Aig resulting coding one picture frame exceeds the upper bound Th_U of the state transition threshold (step 301). If as the result the generated information amount Aig exceeds the upper bound Th_U of the state transition threshold, steps 302 to 309 are carried out to let the quantization state make transition in the direction reducing quantization precision, i.e., the direction deteriorating the picture quality, in order to approximate the generated information amount in one picture frame to a target generated information amount. In other words, the state transition step width control part 172 first determines whether or not the generated information amount Aig exceeds the first state transition step width control threshold Th_stp1 (step 302). If, as the result, the generated information amount Aig exceeds the first state transition step width control threshold Th_stp1, inter-frame correlation abruptly lowers and the generated information amount is determined as abruptly increasing, and hence, in order to reduce the quantization precision in coding of each GOB in both of the first and second groups, the quantization characteristic decision part 175 increments q1 and q2 (steps 304 and 305). Thus, the quantization state makes transition in the direction reducing the quantization precision in a state transition width larger than the general one. Thereafter the process advances to a step 319.

If, as the result of the determination at the step 302, the generated information amount Aig resulting from coding one picture frame is not more than the first state transition step width control threshold Th_stp1, the quantization characteristic decision part 175 determines whether or not the variable Scc denoting the coding control state is "1" (step 303). If, as the result, the variable Scc is "1", the quantization characteristic decision part 175 increments q2 (step 306) and sets the variable Scc to "2" (step 307), in order to lower the quantization precision of the GOBs of either group among the GOBs of the first and second groups. If, as the result of the determination at the step 303, the variable Scc is not "1", the quantization characteristic decision part 175 increments q1 (step 308) and sets the variable Scc to "1" (step 309), in order to lower the quantization precision of each GOB of the remaining group among the GOBs of the first and second groups. Thereafter the process advances to the step 319.

If, as the result of the determination at the step 301, the generated information amount Aig resulting from coding one picture frame is not in excess of the upper bound Th_U of the state transition threshold, the threshold comparison part 134 determines whether or not the generated information amount Aig of one frame is below the lower bound Th_L of the state transition threshold (step 310). If, as the result, the generated information amount Aig is below the lower bound Th_L of the state transition threshold, steps 311 to 318 are carried out to let the quantization state make transition in the direction increasing the quantization precision, i.e., in the direction improving the picture quality, in order to approximate the generated information amount of one picture frame to the target generated information amount. In other words, the state transition step width control part 172 first determines whether or not the generated information amount Aig exceeds the second state transition step width control threshold Th_stp2 (step 311). If, as the result, the generated information amount Aig is below the second state transition step width control threshold Th_stp2, the inter-frame correlation abruptly rises and the generated information amount is determined as abruptly reducing, and hence the quantization characteristic decision part 175 decrements q1 and q2 (steps 313 and 314), in order to increase the quantization precision in coding of each GOB of both of the first and second groups. Thus, the quantization state makes transition in the direction increasing the quantization precision in a state transition width larger than the general one. Thereafter the process advances to the step 319.

If, as the result of the determination at the step 311, the generated information amount Aig resulting from coding one picture frame is not less than the second state transition step width control threshold Th_stp2, the quantization characteristic decision part 175 determines whether or not the variable Scc denoting the coding control state is "1" (Step 312). If, as the result, the variable Scc is 1, the quantization characteristic decision part 175 decrements q1 (step 315) and sets the variable Scc to "2" (step 316), in order to increase the quantization precision of each GOB of either group among the GOBs of the first and second groups. If, as the result of the determination at the step 312, the variable Scc is not "1", the quantization characteristic decision part 175 decrements q2 (step 317) and sets the variable Scc to "1" (step 318), in order to increase the quantization precision of each GOB of the remaining group among the GOBs of the first and second groups. Thereafter the process advances to the step 319.

If, as the result of the determination at the step 310, the generated information amount Aig of one picture frame is not below the lower bound Th_L of the state transition threshold, the process advances to the step 319.

At the step 319, the quantization characteristic decision part 175 determines whether or not the time axis placement control flag Ft is "1". This time axis control flag Ft is a flag used for exchanging GOBs having superior picture quality and GOBs having inferior picture quality in the picture frame every frame. When the time axis control flag Ft is "1", GOB1, 4, 5, 8, 9 and 12, i.e., each GOB of the first group is coded with the quantization characteristic q1 and the remaining GOBs, i.e., each GOB of the second group is coded with the quantization characteristic q2. When the time axis control flag Ft is "2", GOB2, 3, 6, 7, 10 and 11, i.e., each GOB of the second group is coded with the quantization characteristic q1, and the remaining GOBs, i.e., each GOB of the first group is coded with the quantization characteristic q2.

Therefore, the quantization characteristic decision part 175 sets, on the basis of the result of the determination at the step 319, the quantization characteristic for each GOB of the first group at the quantization characteristic q1 and the quantization characteristic for each GOB of the second group at the quantization characteristic q2 respectively (step 320) if the time axis placement control flag Ft is "1", while setting the quantization characteristic for each GOB of the first group at the quantization characteristic q2 and the quantization characteristic for each GOB of the second group at the quantization characteristic q1 (step 321) if the time axis placement control flag Ft is not "1". These steps 320 and 321 decide spatial arrangement of the GOBs having superior picture quality and the GOBs having inferior picture quality in the picture frame. Due to this spatial arrangement, the GOBs having superior picture quality are prevented from biasing in the picture frame or the GOBs having inferior picture quality are prevented from biasing in the picture frame.

In the case where the time axis placement control flag Ft is "1", after execution of the step 320, the time axis placement control part 152 sets this time axis placement control flag Ft to "2". In the case where the time axis placement control flag Ft is "2", after execution of the step 321, the time axis placement control part 152 sets this time axis placement control flag Ft to "1". Due to these steps 322 and 323, "1" and "2" are alternately set for the time axis placement control flag every frame, and consequently the steps 320 and 321 are alternately carried out every frame. When the state of the coding control apparatus is the coding control state 2, one picture frame is coded with the two types of quantization characteristics q1 and q2 (q1≠q2) and the GOBs having superior picture quality and the GOBs having inferior picture quality are present, while the steps 320 and 321 are thus alternately carried out every frame and hence the GOBs having improved the picture quality disperse also in the time direction. When, on the basis of the generated information amount Aig of the previously coded one picture frame, the quantization characteristics for one picture frame to be currently coded are set in the aforementioned manner, coding control for one picture frame terminates. With the quantization characteristics thus set (steps 320 and 321), coding for one picture frame is performed by the video coding part 125. Thereafter with the resulting generated information amount Aig, coding control for the next one picture frame is performed similarly to the above.

According to the third embodiment described above, similarly to the first embodiment, the quantization characteristics for the picture frame to be currently coded can be finely set on the basis of the generated information amount Aig of the previously coded picture frame with a simple algorithm by introduction of the coding control states 1 and 2, whereby dispersion of the picture quality or fluctuation of the generated information amount in one picture frame is small and a visually excellent motion picture having no frame skip can be obtained. According to the third embodiment, similarly to the second embodiment, the quantization characteristic for the GOBs having improved the picture quality and the quantization characteristic for the GOBs having not improved the picture quality are exchanged every frame in the coding control state 2, whereby the GOBs having improved the picture quality are not only spatially dispersed but also dispersed in relation to the time direction, and non-uniformity of the picture quality resulting from the quantization characteristics varying with the GOBs is inconspicuous. According to the third embodiment, further, even if the inter-frame correlation abruptly rises or lowers and hence abrupt increase/decrease of the generated information amount takes place, coding can be quickly performed with quantization characteristics responsive to the characteristics of the picture by increasing the state transition step width with state transition skipping one quantization state. In addition, the quantization characteristics are decided in units of the GOBs so that quantization employed for coding may not be transmitted every macroblock to the decoding side, whereby the transmission band can be effectively utilized and a motion picture having excellent picture quality can be obtained.

While the generated information amount Aig precedent by one frame is employed for state transition of the quantization state or the coding control state, a generated information amount of a plurality of previously coded picture frames may be held for performing state transition with a generated information amount per frame which is the average value thereof. In this case, coding control not influenced by temporary increase/decrease of the generated information amount can be performed.

While two states are present as the coding control state, not less than three coding control states may be present. When increasing the state number of the coding control state, the quantization characteristics can be more finely set and hence fluctuation of the generated information amount can be further reduced.

It is assumed that throughput in transmission of coded video data is constant. When applying the coding control method of this embodiment to such a system that throughput fluctuates owing to repeat control due to a transmission error, coding control responsive to the throughput can be performed by adding processing of calculating average throughput $Tp\_av$ from an information amount transmitted within a predetermined constant time and correcting the upper bound $Th\_U$ and the lower bound $Th\_L$ of the state transition threshold as well as the first state transition step width control threshold $Th\_stp1$ and the second state transition step width control threshold $Th\_stp2$ through the following equations. In other words, assuming in this case that corrected values of the upper bound and the lower bound of the state transition threshold as well as the first state transition step width control threshold and the second state transition step width control threshold are expressed as $Th\_Ua$, $Th\_La$, $Th\_stp1a$ and $Th\_stp2a$ respectively, $Th\_Ua = Th\_U \times Tp\_av$ $Th\_La = Th\_L \times Tp\_av$ $Th\_stp1a = Th\_stp1 \times Tp\_av$ $Th\_stp2a = Th\_stp2 \times Tp\_av$ $(0 \leq Tp\_av \leq 1)$ Fourth Embodiment A coding control method and a coding control apparatus according to a fourth embodiment of the present invention are now described.

This embodiment applies the present invention to a video transmission system transmitting a CIF picture of H.261 or H.263 recommended by ITU, which is a video transmission system having a function of performing refresh by INTRA coding when mismatch between frame memories of a transmission side and a receiving side takes place due to a transmission error. In this embodiment, it is assumed that the aforementioned refresh function INTRA-codes one GOB every picture frame and thereby performing forced updating. FIG. 4 and FIG. 5 show an example of INTRA-coding GOB1 in the first picture frame, INTRA-coding GOB2 in the next picture frame, and INTRA-coding GOB3 in the subsequent picture frame.

The structure of the coding control apparatus according to this embodiment is similar to the coding control apparatus 122 of the third embodiment comprising the quantization control part 171 shown in FIG. 26 except the point that the same has no time axis placement control part 152, and hence it is assumed that the same numerals are assigned to the same parts and description of each part is omitted.

An exemplary operation of the coding control apparatus according to this embodiment is described with reference to FIG. 4 and FIG. 5.

FIG. 4 shows transition of a quantization state when a generated information amount Aig resulting from coding one picture frame falls below a lower bound $Th\_L$ of a state transition threshold and when the generated information amount Aig exceeds an upper bound $Th\_U$ of the state transition threshold.

A coding control state 1 means such a state that all quantization characteristics employed for coding each GOB forming the picture frame are identical, and a coding control state 2 means such a state that GOBs are previously divided into two groups (in this embodiment, divided into a group formed by one GOB to be INTRA-coded and a group formed by a plurality of GOBs to be INTER-coded) and the quantization characteristic employed for coding the GOB(s) in the same group is identical and quantization characteristics employed for coding the GOBs of the different groups are different.

First, it is assumed that all quantization characteristics employed for coding each GOB are in the state of a quantization characteristic 5, i.e., a quantization state as a first coding control state 1, and an exemplary operation in the case where the quantization state makes transition in a direction improving the picture quality is described. If the generated information amount Aig when coding each GOB with the quantization characteristic 5 falls below the lower bound $Th\_L$ of the state transition threshold, the state of the quantization control part makes transition to a quantization state belonging to the coding control state 2, while the quantization characteristic for the GOBs (GOB1 and GOB3 to 12) other than GOB subjected to INTRA coding is changed in the direction improving the picture quality from 5 to 4. If the generated information amount Aig when coding each GOB with the quantization characteristic set in the coding control state 2 again falls below the lower bound $Th\_L$ of the state transition threshold, the quantization characteristic for each GOB is entirely set by a quantization characteristic decision part 175 at a quantization characteristic 4 and the state of the coding control apparatus again makes transition to the coding control state 1, i.e., the state of the quantization control part makes transition to a quantization state corresponding to a second coding control state 1.

An exemplary operation when the quantization state makes transition in the direction deteriorating the picture quality is described. Similarly to the case where the quantization state makes transition in the direction improving the picture quality, it is assumed that all quantization characteristics employed for coding each GOB are in the state of a quantization characteristic 3, i.e., a quantization state belonging to the first coding control state 1. If the generated information amount Aig when coding each GOB with the quantization characteristic 3 exceeds the upper bound Th_U of the state transition threshold, the state of the quantization control part makes transition to a quantization state belonging to the coding control state 2, while the quantization characteristic for the GOBs (GOB1 and GOB3 to 12) other than the GOB subjected to INTRA coding is changed by the quantization characteristic decision part 175 in the direction deteriorating the picture quality from 3 to 4. If the generated information amount Aig when coding each GOB with the quantization characteristic set in the coding control state 2 again exceeds the upper bound Th_U of the state transition threshold, all quantization characteristics for each GOB are set by the quantization characteristic decision part 175 at a quantization characteristic 4, and the state of the coding control apparatus again makes transition to the coding control state 1, i.e., the state of the quantization control part makes transition to a quantization state corresponding to a second coding control state 1.

As an exemplary operation of the coding control apparatus according to this embodiment, an operation when interframe correlation abruptly lowers due to abrupt motion of an object or scene change or when inter-frame correlation abruptly rises is described with reference to FIG. 5.

In video coding based on ITU recommendation H.261 or H.263 attaining high compressibility by employing interframe difference, inter-frame correlation abruptly lowers if abrupt motion of the object or scene change takes place, and hence a generated information amount abruptly increases. When the inter-frame correlation abruptly rises, on the other hand, the generated information amount abruptly reduces. In the coding control described with reference to FIG. 4, a state such as the coding control state 2 which codes GOBs in one picture frame with a plurality of quantization characteristics (i.e., the coding control state 2) is present and hence, if the generated information amount abruptly increases or the generated information amount abruptly reduces, a delay occurs before setting a quantization characteristic approximating the generated information amount to a target generated information amount (between the upper bound and the lower bound of the state transition threshold), and such a phenomenon takes place that frame skip is caused in the case where the generated information amount abruptly increases or coding is performed with a quantization characteristic for inferior picture quality although coding can be performed with a quantization characteristic capable of further increasing the picture quality in the case where the generated information amount abruptly reduces. In this embodiment, therefore, similarly to the third embodiment, a first state transition step width control threshold Th_stp1 and a second state transition step width control threshold Th_stp2 are previously set, and when the generated information amount Aig exceeds the first state transition step width control threshold Th_stp1 or the generated information amount Aig falls below the second state transition step width control threshold Th_stp2, coding control increasing the state transition step width and quickly approximating the generated information amount to the target generated information amount is performed.

FIG. 5 shows transition of the quantization state when the generated information amount Aig exceeds the first state transition step width control threshold Th_stp1 and when the generated information amount Aig falls below the second state transition step width control threshold. It is assumed that the coding control state 1 means, similarly to the exemplary operation shown in FIG. 4, such a state that all quantization characteristics for coding each GOB forming the picture frame are identical.

First, it is assumed that all quantization characteristics employed for coding each GOB are in the quantization state (coding control state 1) of the quantization characteristic 5, and an exemplary operation in the case where the coding control state makes transition in the direction improving the picture quality is described. If the generated information amount Aig when coding each GOB with the quantization characteristic 5 falls below the lower bound Th_L of the state transition threshold while lowering the second state transition step width control threshold Th_stp2, the quantization characteristic for each GOB is entirely changed by the quantization control part 171, regardless of whether it is the GOB subjected to INTRA coding or the GOBs subjected to INTER coding, in the direction improving the picture quality from 5 to 4. This means that the quantization state has made transition from the first coding control state 1 to the second coding control state 1 skipping the coding control state 2. If the generated information amount Aig when coding each GOB with the quantization characteristic 4 again falls below the lower bound Th_L of the state transition threshold and further falls below the second state transition step width control threshold Th_stp2, the quantization characteristic for each GOB is entirely changed by the quantization control part 171 in the direction improving the picture quality from 4 to 3. This means that the quantization state has made transition from the second coding control state 1 to a third coding control state 1 skipping the coding control state 2.

When the quantization state makes transition in the direction deteriorating the picture quality, i.e., when the generated information amount Aig exceeds the upper bound Th_U of the state transition threshold and further exceeds the first state transition step width control threshold Th_stp1, it operates in a procedure reverse to the aforementioned case where the quantization state makes transition in the direction improving the picture quality, and hence description is omitted.

Figure 6:
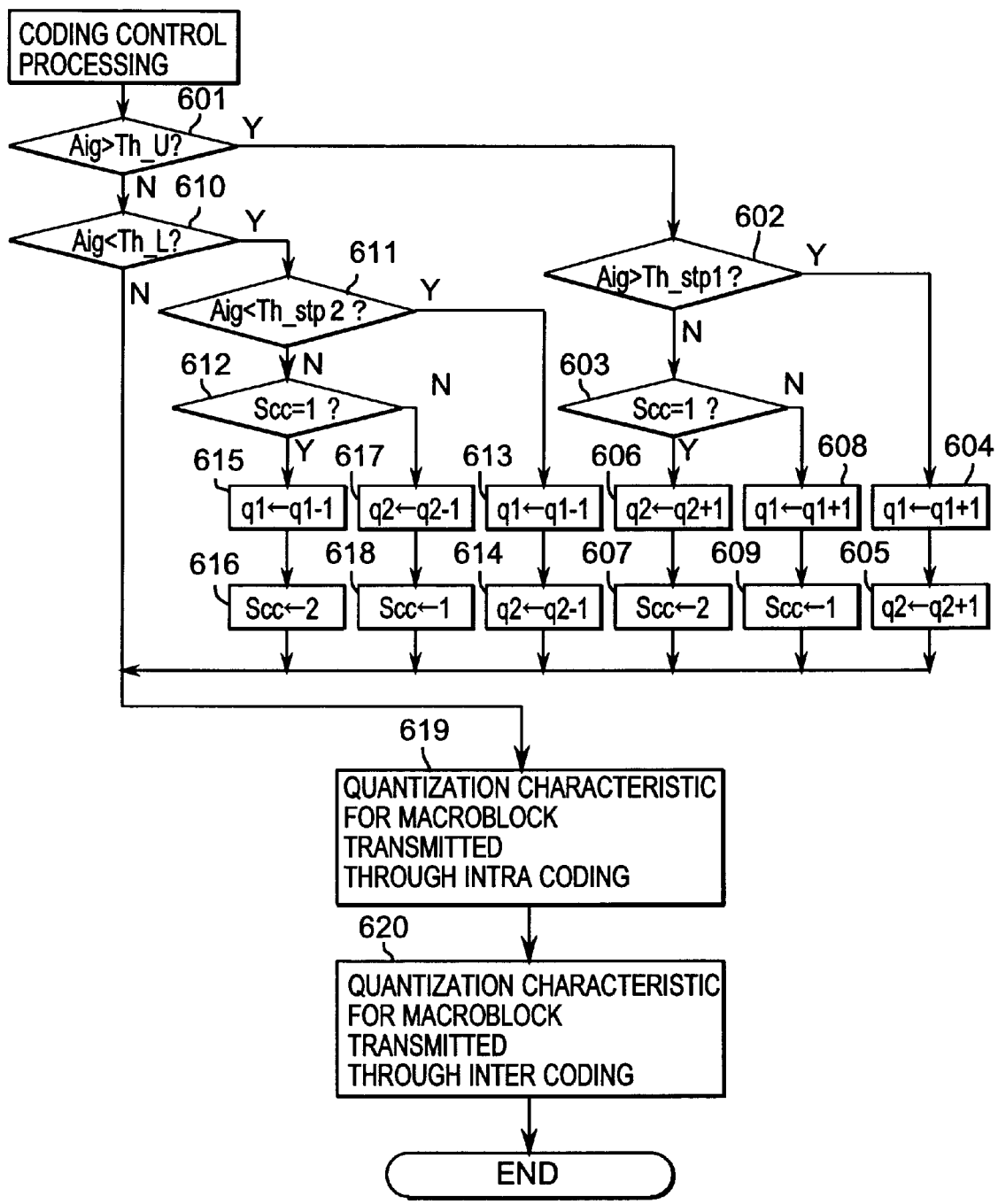
FIG. 6 is a flow chart showing a coding control method according to the fourth embodiment.

The detail of the coding control method used in the aforementioned coding control apparatus according to the fourth embodiment is now described. FIG. 6 is a flow chart showing coding control processing for one picture frame by this coding control method. Referring to FIG. 6, quantization characteristics are denoted as "QUANT". Referring to FIG. 6, further, q1 and q2 are numerical values identifying the quantization characteristics, Scc is a variable denoting the coding control state, and Ft is a time axis control flag, and it is assumed that q1, q2, Scc and Ft are previously initialized.

As shown in FIG. 6, in the coding control method according to the fourth embodiment, a threshold comparison part 134 first determines whether or not the generated information amount Aig resulting from coding one picture frame exceeds the upper bound Th_U of the state transition threshold (step 601). If as the result the generated information amount Aig exceeds the upper bound Th_U of the state transition threshold, steps 602 to 609 are carried out and thereby letting the quantization state make transition in a direction reducing quantization precision, i.e., in the direction deteriorating the picture quality, in order to approximate the generated information amount of one picture frame to a target generated information amount. Namely, a state transition step width control part 172 first determines whether or not the generated information amount Aig exceeds the first state transition step width control threshold Th_stp1 (step 602). If, as the result, the generated information amount Aig exceeds the first state transition step width control threshold Th_stp1, inter-frame correlation abruptly lowers and the generated information amount is determined as abruptly increasing, and hence the quantization characteristic decision part 175 increments q1 and q2 (steps 604 and 605), in order to reduce quantization precision of both of the GOB to be INTRA-coded and the GOBs to be INTER-coded. Thus, the quantization state makes transition in the direction reducing the quantization precision in a state transition width larger than the general one. Thereafter the process advances to a step 619. If, as the result of the determination at the step 602, the generated information amount Aig resulting from coding one picture frame is not more than the first state transition step width control threshold Th_stp1, the quantization characteristic decision part 175 determines whether or not the variable Scc denoting the coding control state is "1" (step 603). If, as the result, the variable Scc is 1, the quantization characteristic decision part 175 increments q2 (step 606) and sets the variable Scc to "2" (step 607), in order to lower the quantization precision of each GOB to be INTER-coded. If, as the result of the determination at the step 303, the variable Scc is not "1", the quantization characteristic decision part 175 increments q1 (step 608) and sets the variable Scc to "1" (step 609), in order to lower the quantization precision of the GOB to be INTRA-coded. Thereafter the process advances to the step 619.

If, as the result of the determination at the step 601, the generated information amount Aig resulting from coding one picture frame is not in excess of the upper bound Th_U of the state transition threshold, the threshold comparison part 134 determines whether or not the generated information amount Aig of one picture frame is below the lower bound Th_L of the state transition threshold (step 610). If, as the result, the generated information amount Aig is below the lower bound Th_L of the state transition threshold, steps 611 to 618 are carried out and thereby letting the quantization state make transition in the direction increasing the quantization precision, i.e., in the direction improving the picture quality, in order to approximate the generated information amount of one picture frame to the target generated information amount. Namely, the state transition step width control part 172 first determines whether or not the generated information amount Aig exceeds the second state transition step width control threshold Th_stp2 (step 611). If, as the result, the generated information amount Aig is below the second state transition step width control threshold Th_stp2, inter-frame correlation abruptly rises and the generated information amount is determined as abruptly reducing, and hence the quantization characteristic decision part 175 decrements q1 and q2 (steps 613 and 614), in order to increase the quantization precision of both of the GOB to be INTRA-coded and the GOBs to be INTER-coded. Thus, the quantization state makes transition in the direction increasing the quantization precision in a state transition width larger than the general one. Thereafter the process advances to the step 619. If, as the result of the determination at the step 611, the generated information amount Aig resulting from coding one picture frame is not less than the second state transition step width control threshold Th_stp2, the quantization characteristic decision part 175 determines whether or not the variable Scc denoting the coding control state is "1" (step 612). If, as the result, the variable Scc is 1, the quantization characteristic decision part 175 decrements q1 (step 615) and sets the variable Scc to "2" (step 616), in order to increase the quantization precision of the GOB to be INTRA-coded. If, as the result of the determination at the step 612, the variable Scc is not "1", the quantization characteristic decision part 175 decrements q2 (step 617) and sets the variable Scc to "1" (step 618), in order to increase the quantization precision of each GOB to be INTER-coded. Thereafter the process advances to the step 619.

If, as the result of the determination at the step 610, the generated information amount Aig of one picture frame is not below the lower bound Th_L of the state transition threshold, the process advances to the step 619. At the step 619, the quantization characteristic decision part 175 sets the quantization characteristic for the GOB to be INTRA-coded at the quantization characteristic q1. Then, at a step 620, the quantization characteristic decision part 175 sets the quantization characteristic for the GOBs not INTRA-coded, i.e., the GOBs to be INTER-coded at q2.

In the aforementioned manner, when the quantization characteristics for one picture frame to be currently coded are set on the basis of the generated information amount Aig of the previously coded one picture frame, coding control for one frame terminates. With the quantization characteristics thus set (steps 619 and 620), coding for one picture frame is performed by the video coding part 125. Thereafter with the resulting generated information amount Aig, coding control for the next one picture frame is performed similarly to the above.

According to the aforementioned fourth embodiment, similarly to the third embodiment, although forced updating is executed by INTRA coding, the quantization characteristics for the picture frame can be finely set with a simple algorithm, whereby dispersion of the picture quality or fluctuation of a generated information amount in one picture frame is small and a visually excellent motion picture having no frame skip can be obtained. According to the fourth embodiment, similarly to the third embodiment, even if inter-frame correlation abruptly rises or lowers and hence abrupt increase/decrease of the generated information amount takes place, coding can be quickly performed with quantization characteristics responsive to the characteristics of the picture by increasing the state transition step width. Further, the quantization characteristics are decided in units of the GOBs so that quantization employed for coding may not be transmitted every macroblock to the decoding side, whereby the transmission band can be effectively utilized and a motion picture having excellent picture quality can be obtained.

While in the fourth embodiment the generated information amount Aig precedent by one frame is employed for state transition of the quantization state or the coding control state, a generated information amount of a plurality of previously coded picture frames may be held for performing state transition with a generated information amount per frame which is the average value thereof. In this case, coding control not influenced by temporary increase/decrease of the generated information amount can be performed.

While in the fourth embodiments two states are present as the coding control state, not less than three coding control states may be present. When increasing the state number of the coding control state, the quantization characteristics can be more finely set and hence fluctuation of the generated information amount can be further reduced.

In the fourth embodiment, further, it is assumed that forced updating is performed by INTRA-coding one GOB every picture frame. However, when applying the coding control method according to the fourth embodiment to a frame subjected to forced updating, while applying the coding control method according to the third embodiment to a frame not subjected to forced updating, the present invention can be also applied to coding of a picture in which forced updating is intermittently inserted.

In the fourth embodiment, it is assumed that throughput in transmission of coded video data is constant. When applying the coding control method of this embodiment to such a system that throughput fluctuates owing to repeat control due to a transmission error, coding control responsive to the throughput can be performed by adding processing of calculating average throughput $Tp\_av$ from an information amount transmitted within a predetermined constant time and correcting the upper bound $Th\_U$ and the lower bound $Th\_L$ of the state transmission threshold as well as the first state transition step width control threshold $Th\_stp1$ and the second state transition step width control threshold $Th\_stp2$ through the following equations. In other words, assuming in this case that corrected values of the upper bound and the lower bound of the state transition threshold as well as the first state transition step width control threshold and the second state transition step width control threshold are expressed as $Th\_Ua$, $Th\_La$, $Th\_stp1a$ and $Th\_stp2a$ respectively, $$Th\_Ua = Th\_U \times Tp\_av$$

$$Th\_La = Th\_L \times Tp\_av$$

$$Th\_stp1a = Th\_stp1 \times Tp\_av$$

$$Th\_stp2a = Th\_stp2 \times Tp\_av$$

$$(0 \leq Tp\_av \leq 1)$$

Fifth Embodiment

In the aforementioned fourth embodiment, it is assumed that forced updating is performed by INTRA-coding one GOB every picture frame, and in the coding control state 2, coding control is so performed that the GOB to be INTRA-coded and the GOBs to be INTER-coded are coded with different quantization characteristics. In this case, it is preferable in consideration of suppression of non-uniformity of the picture quality to set the quantization characteristics so that the quantization precision of the GOB to be INTRA-coded is regularly higher than the quantization precision of the GOBs to be INTER-coded. Accordingly, a coding control method and a coding control apparatus in which such setting of the quantization characteristics is performed are described as a fifth embodiment.

The structure of the coding control apparatus according to this embodiment is similar to the coding control apparatus 122 of the third embodiment comprising the quantization control part 171 shown in FIG. 26 except the point that it has no time axis placement control part 152, and hence it is assumed that the same numerals are assigned to the same parts and description of each part is omitted.

FIG. 9 shows transition of the quantization state when a generated information amount Aig resulting from coding one picture frame falls below a lower bound $Th\_L$ of a state transition threshold and when the generated information amount Aig exceeds an upper bound $Th\_U$ of the state transition threshold. A coding control state 1 means such a state that all quantization characteristics employed for coding each GOB forming the picture frame are identical, and a coding control state 2 means such a state that GOBs are previously divided into two groups (in this embodiment, divided into a group formed by one GOB to be INTRA-coded and a group formed by a plurality of GOBs to be INTER-coded) and the quantization characteristic employed for coding the GOB(s) in the same group is identical and quantization characteristics employed for coding the GOBs of the different groups are different.

First, it is assumed that all quantization characteristics employed for coding each GOB are in the state of a quantization characteristic 5, i.e., a quantization state as a first coding control state 1, and an exemplary operation when the quantization state makes transition in a direction improving the picture quality is described. If a generated information amount Aig when coding each GOB with the quantization characteristic 5 falls below the lower bound $Th\_L$ of the state transition threshold, the state of a quantization control part makes transition to a quantization state belonging to the coding state 2, while only the quantization characteristic for GOB2 to be INTRA-coded is changed by a quantization characteristic decision part 175 in the direction improving the picture quality from 5 to 4. This point is different from the fourth embodiment in which the quantization characteristic for GOB1 and GOB3 to 12 which are the GOBs to be INTER-coded has been changed in the direction improving the picture quality from 5 to 4. If the generated information amount Aig when coding each GOB with the quantization characteristic set in the coding control state 2 again falls below the lower bound $Th\_L$ of the state transition threshold, all quantization characteristics for each GOB are set by the quantization characteristic decision part 175 at the quantization characteristic 4, and the state of the coding control apparatus again makes transition to the coding control state 1, i.e., the state of the quantization control part makes transition to a quantization state corresponding to the second coding control state.

An exemplary operation when the quantization state makes transition in a direction deteriorating the picture quality is described. Similarly to the case where the quantization state makes transition in the direction improving the picture quality, it is assumed that all quantization characteristics employed for coding each GOB are in the state of a quantization characteristic 3, i.e., a quantization state as the first coding control state 1. If the generated information amount Aig when coding each GOB with the quantization characteristic 3 exceeds the upper bound $Th\_U$ of the state transition threshold, the state of the quantization control part makes transition to a quantization state belonging to the coding control state 2, while the quantization characteristic for the GOBs (GOB1 and GOB3 to 12) other than the GOB subjected to INTRA coding is changed by the quantization characteristic decision part 175 in the direction deteriorating the picture quality from 3 to 4. If the generated information amount Aig when coding each GOB with the quantization characteristic set in the coding control state 2 again exceeds the upper bound $Th\_U$ of the state transition threshold, all quantization characteristics for each GOB are set by the quantization characteristic decision part 175 at the quantization characteristic 4, and the state of the coding control apparatus again makes transition to the coding control state 1, i.e., the state of the quantization control part makes transition to a quantization state corresponding to the second coding control state.

Figure 10:
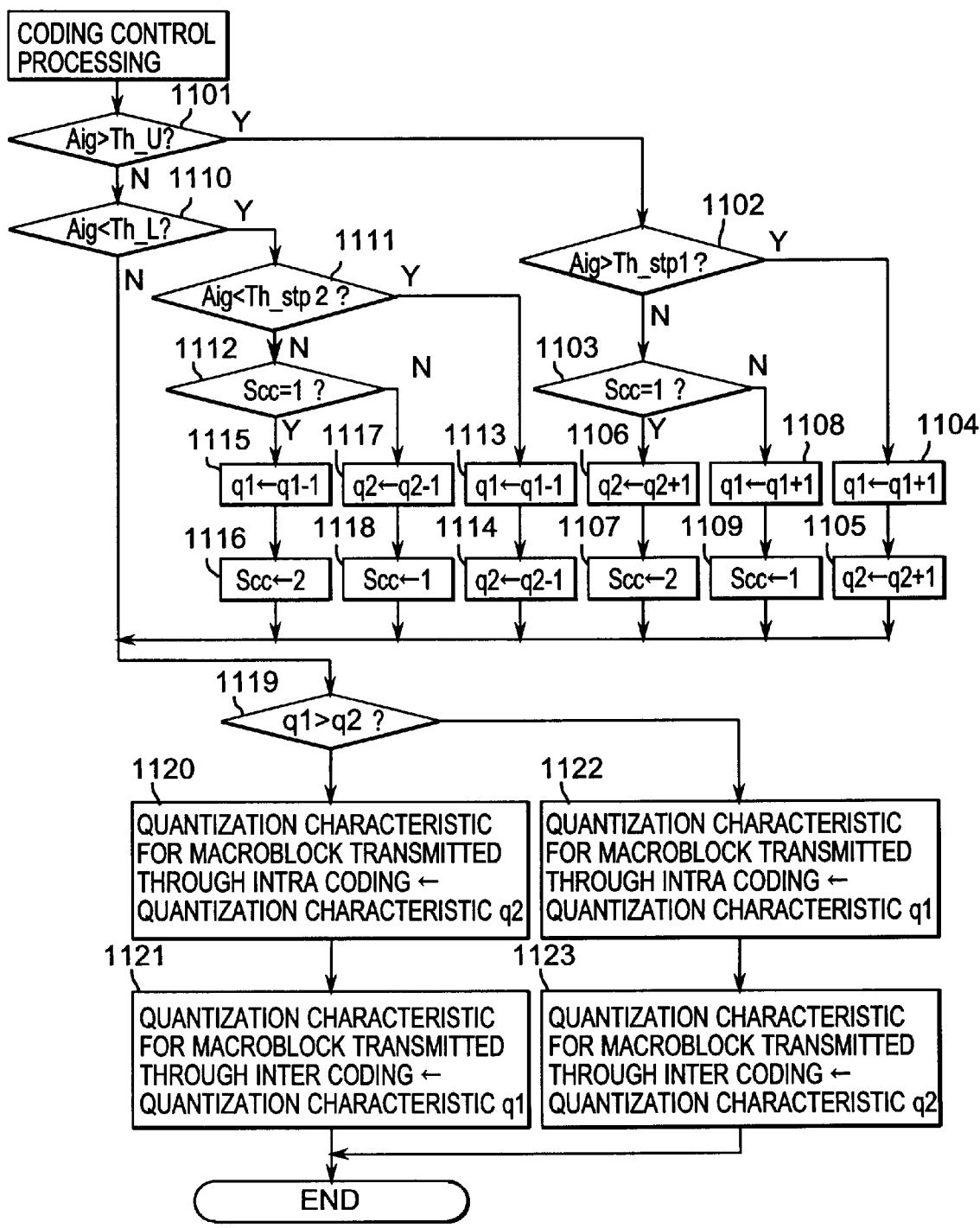
FIG. 10 is a flow chart showing a coding control method according to the fifth embodiment.

FIG. 10 is a flow chart showing coding control processing for one picture frame by the coding control method according to this embodiment.

Steps 1101 to 1118 in the flow chart of FIG. 10 correspond to the steps 601 to 608 in the flow chart of FIG. 6 showing the coding control method according to the fourth embodiment respectively. In each step of the steps 1101 to 1118, processing similar to the step corresponding to each step among the steps 601 to 608 is performed, and hence description thereof is omitted.

On the other hand, processing formed by steps 1119 to 1123 in the flow chart of FIG. 10 corresponds to the processing formed by the steps 619 and 620 in the flow chart of FIG. 6, while the processing is different. In this embodiment, the quantization characteristic decision part 175 first compares at the step 1119 two numerical values q1 and q2 indicating quantization characteristics and determines whether or not q1 is greater than q2. If q1>q2, as the result, the quantization characteristic decision part 175 sets the quantization characteristic for the GOB to be INTRA-coded at the quantization characteristic q2, and sets the quantization characteristic for the GOBs to be INTER-coded at q1. If q1≦q2, as the result of the determination at the step 1119, the quantization characteristic decision part 175 sets the quantization characteristic for the GOB to be INTRA-coded at the quantization characteristic q1, and sets the quantization characteristic for the GOBs to be INTER-coded at q2. Thus, the quantization characteristic for each GOB is set so that the quantization precision of the GOB to be INTRA-coded is not lower than the quantization precision of the GOBs to be INTER-coded.

According to the aforementioned fifth embodiment, in the coding control state 2 where different quantization characteristics are set for the GOB to be INTRA-coded and the GOBs to be INTER-coded, the quantization precision of the GOB to be INTRA-coded is regularly higher than the quantization precision of the GOBs to be INTER-coded, whereby block distortion due to INTRA coding is reduced.

Sixth Embodiment

The coding control apparatus 122 in the video coding apparatus 121 shown in FIG. 21 comprises the motion start/end detection part 123, and the motion start/end detection part 123 detects the motion start and the motion end of the object in the picture indicated by the input video signal Sv, while the quantization control part 124 employs the detection results and controls the quantization characteristics in coding by the video coding part 125. An embodiment of such a coding control apparatus 122 is now described as a sixth embodiment.

FIG. 28 is a block diagram showing the structure of a motion start/end detection part in the coding control apparatus according to this embodiment, i.e., a block diagram showing an exemplary structure of the motion start/end detection part 123 in the coding control apparatus 122 shown in FIG. 21 (hereinafter it is assumed that a motion start/end detection part of this structure is denoted by reference numeral "191"). This motion start/end detection part 191 comprises a motion vector absolute value sum calculation part 193, a motion vector absolute value sum storage part 192, a motion start detection part 194 and a motion end detection part 195, and inputs from a video coding part 125 a signal indicating motion vector information Imv of one picture frame.

The motion vector absolute value sum calculation part 193 inputs into itself the motion vector information Imv of one picture frame from the video coding part 125, and calculates a motion vector absolute value sum Smv. The motion vector absolute value sum storage part 192 holds the calculated motion vector absolute value sum Smv. The motion start detection part 194 generates a signal indicating motion start information Ims with the motion vector absolute value sum Smv, and the motion end detection part 195 generates a signal indicating motion end information Ime with this motion vector absolute value sum Smv. These signals indicating the motion start information Ims and the motion end information Ime are inputted in a quantization control part 124, and in the quantization control part 124, quantization characteristics in coding of a next picture frame are controlled on the basis of these motion start information Ims and motion end information Ime.

Figure 11:
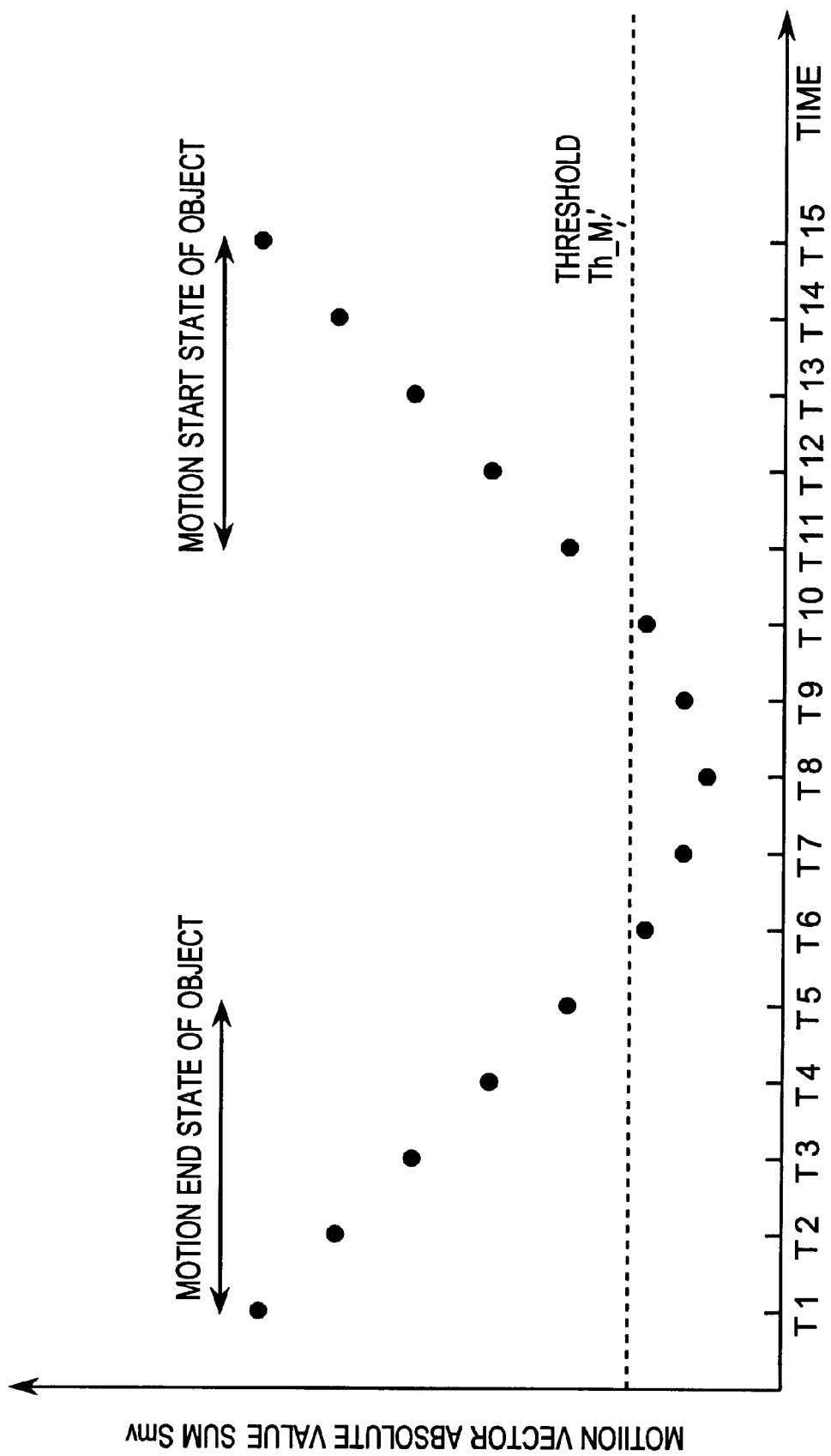
FIG. 11 is an explanatory diagram for defining a motion start state and a motion end state of an object.

FIG. 11 is an explanatory diagram for defining a motion start state and a motion end state of the object. The vertical axis in FIG. 11 shows the sum Smv of the absolute values of motion vectors of one picture frame, and the upper direction of this vertical axis is assumed to be a direction increasing the sum Smv of the absolute values of the motion vectors. The horizontal axis in FIG. 11 shows passage of time. Referring to FIG. 11, "threshold Th_M" is a threshold employed for determination as to whether or not there is motion of the object, and it is determined that there is no motion of the object if the sum Smv of the absolute values of the motion vectors is less than the threshold Th_M, while it is determined that there is motion if it is greater than the threshold Th_M. Further, "motion end state" means such a state that, as shown in FIG. 11, the sum Smv of the absolute values of the motion vectors exceeds the threshold value Th_M and the sum Smv of the absolute values of the motion vectors gradually reduces. In addition, "motion start state" means such a state that the sum Smv of the absolute values of the motion vectors exceeds the threshold value Th_M and the sum Smv of the absolute values of the motion vectors gradually increases. The meanings of these "threshold Th_M", "motion start state" and "motion end state" are similar in the remaining embodiments described later.

An exemplary operation of the coding control apparatus according to this embodiment is now described.

Figure 12:
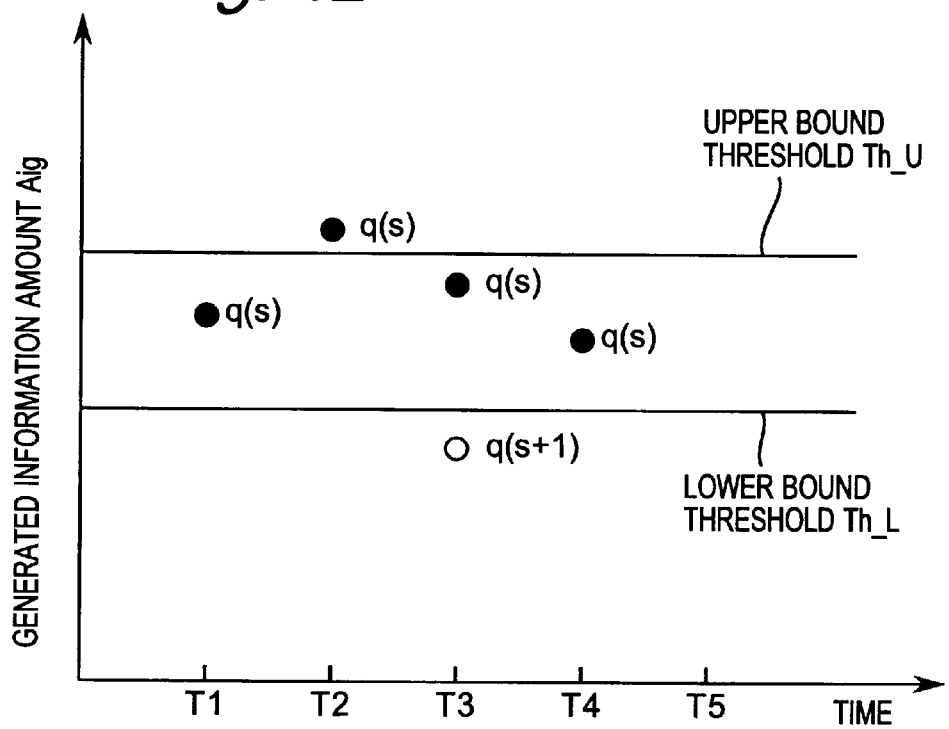
FIG. 12 is a diagram for illustrating an operation of a coding control apparatus according to a sixth embodiment of the present invention in the motion end state of the object.

First, coding control in the motion end state of the object is described with reference to FIG. 12. The vertical axis in FIG. 12 indicates a generated information amount, and the upper direction of this vertical axis is assumed to be a direction increasing the generated information amount. The horizontal axis in FIG. 12 shows passage of time. "Upper bound threshold Th_U" and "lower bound threshold Th_L" are similar to those described with reference to the prior art (those identical to the respective ones of the upper bound Th_U and the lower bound Th_L of the state transition threshold in each of the already described embodiments), and employed for setting the quantization characteristics. Referring to FIG. 12, further, black circles "●" indicate a generated information amount resulting from coding one picture frame in the case of using the coding control apparatus according to this embodiment, while a white circle "○" indicates a generated information amount resulting from coding one picture frame in the case of using the conventional coding control apparatus. Those shown by the vertical axis and the horizontal axis of the graph and the meanings of "upper bound threshold Th_U" and "lower bound threshold Th_L" are also similar in FIGS. 13, 15, 16, 18 and 19 described later.

It is assumed that, at a time T1, a generated information amount Aig, when coding one picture frame with a quantization characteristic q(s), has been between the upper bound threshold Th_U and the lower bound threshold Th_L. At this time, the generated information amount Aig is located between the upper bound threshold Th_U and the lower bound threshold Th_L, and hence a next frame is coded while the quantization characteristic is left intact. It is assumed that, at a time T2, a background having a fine pattern hidden behind the object appears due to movement of the object and the generated information amount Aig resulting from performing coding with the quantization characteristic q(s) exceeds the upper bound threshold Th_U. In the conventional coding control apparatus, when the generated information amount Aig exceeds the upper bound threshold Th_U, the quantization characteristic employed for coding the next picture frame is changed in the direction deteriorating the picture quality and set at q(s+1). In the motion end state of the object, however, inter-frame correlation rises and the generated information amount gradually reduces, and hence, if the quantization characteristic is changed in the direction deteriorating the picture quality, the generated information amount extremely reduces due to the synergistic effect of the inter-frame correlation and the quantization characteristic, to fall below the lower bound threshold Th_L, as shown by "○" at a time T3. In this embodiment, therefore, even if the generated information amount Aig exceeds the upper bound threshold Th_U, the quantization characteristic is not changed in the direction deteriorating the picture quality in the motion end state of the object. Although the generated information amount Aig has exceeded the upper bound threshold Th_U at the time 2, the picture frame is coded at the time T3 with the quantization characteristic q(s). Thereafter an operation similar to the conventional coding control apparatus is performed.

Figure 13:
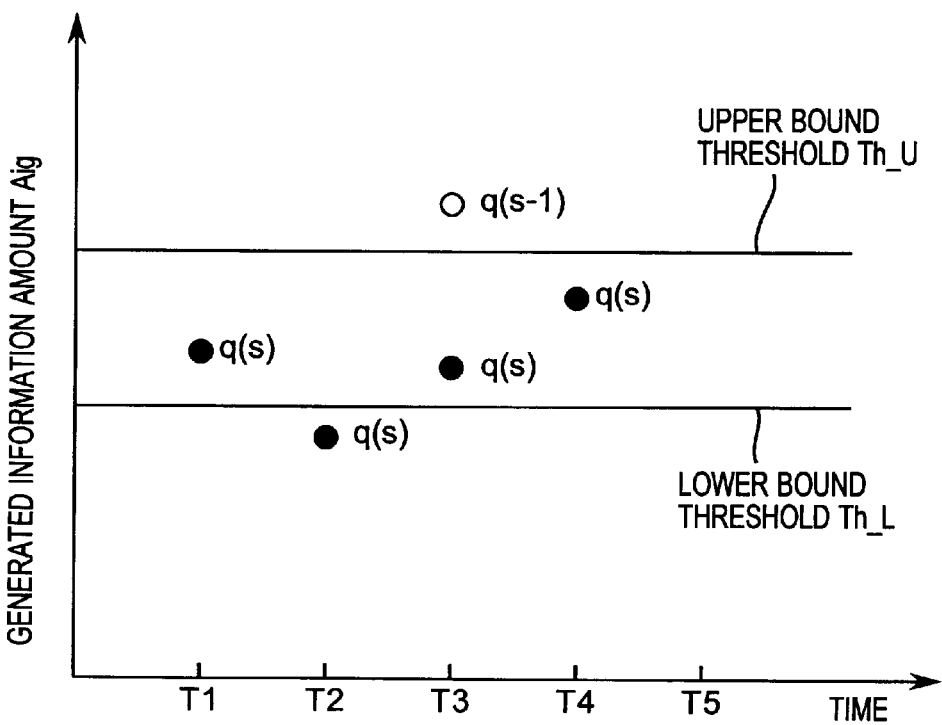
FIG. 13 is a diagram for illustrating an operation of the coding control apparatus according to the sixth embodiment in the motion start state of the object.

Coding control in the motion start state of the object is now described with reference to FIG. 13.

It is assumed that, at a time T1, a generated information amount Aig when coding the picture frame with the quantization characteristic q(s) has been between the upper bound threshold Th_U and the lower bound threshold Th_L. At this time, the generated information amount Aig is located between the upper bound threshold Th_U and the lower bound threshold Th_L, and hence the next frame is coded while the quantization characteristic is left intact. It is assumed that, at a time T2, a background having a coarse pattern hidden behind the object appears due to movement of the object and the generated information amount Aig resulting from performing coding with the quantization characteristic q(s) falls below the lower bound threshold Th_L. In the conventional coding apparatus, when the generated information amount Aig falls below the lower bound threshold Th_L, the quantization characteristic employed for coding the next picture frame is changed in the direction improving the picture quality and set at q(s−1). In the motion start state of the object, however, inter-frame correlation lowers and the generated information amount gradually increases, and hence, if the quantization characteristic is changed in the direction improving the picture quality, the generated information amount extremely increases due to the synergistic effect of the inter-frame correlation and the quantization characteristic, to exceed the upper bound threshold Th_U as shown by "○" at a time T3. In this embodiment, therefore, the quantization characteristic is not changed in the direction improving the picture quality even if the generated information amount Aig falls below the lower bound threshold Th_L. Although the generated information amount Aig has fallen below the lower bound threshold Th_L at the time T2, the picture frame is coded at the time T3 with the quantization characteristic q(s). Thereafter an operation similar to the conventional coding control apparatus is performed.

Figure 14:
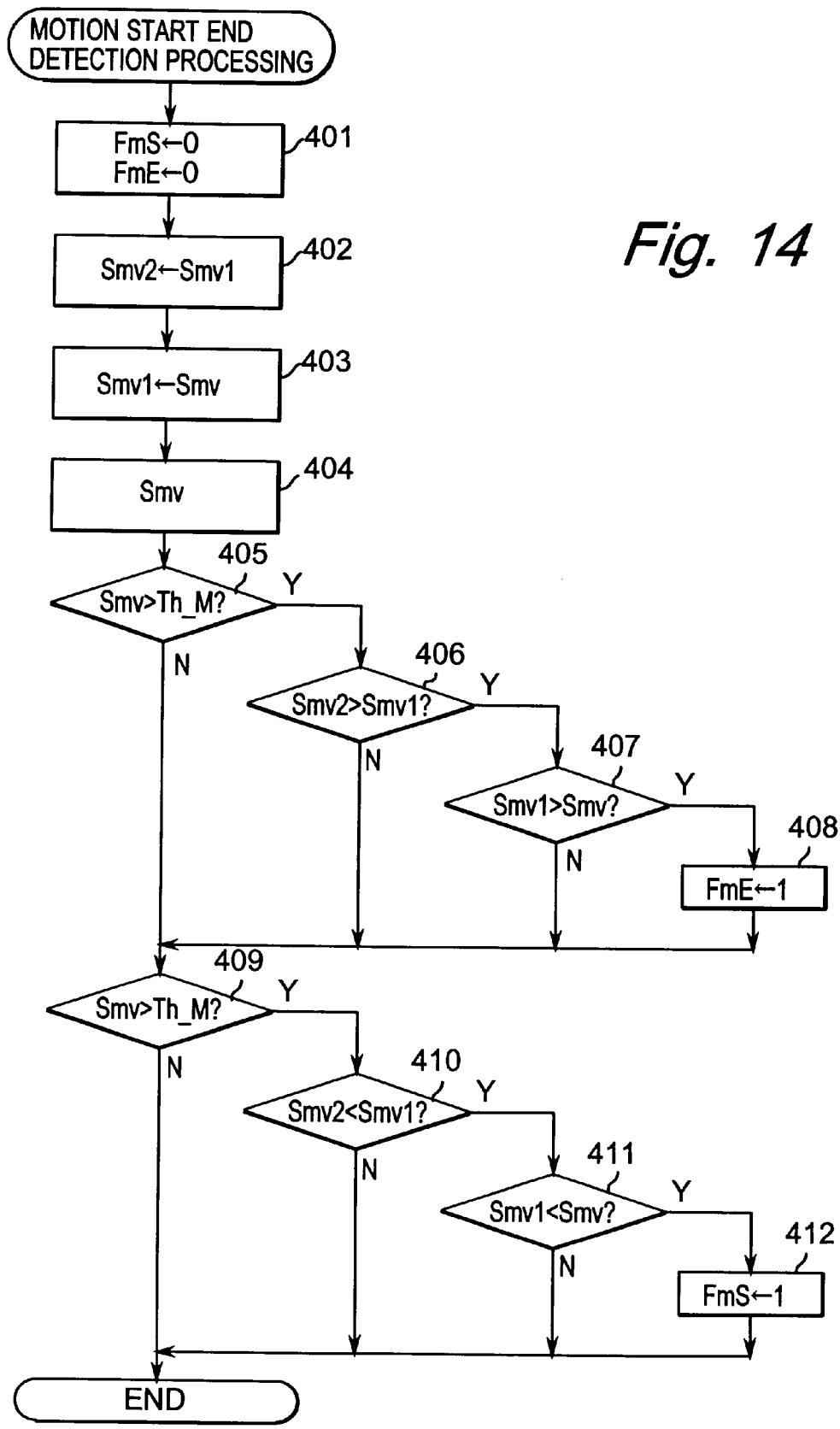
FIG. 14 is a flow chart showing motion start end detection processing by the coding control apparatus according to the sixth embodiment.

FIG. 14 is a flow chart showing motion start end detection processing for one picture frame by the coding control apparatus according to this embodiment performing the aforementioned operation. In this motion start end detection processing, the motion vector absolute value sum calculation part 193 first resets a motion start identification flag FmS and a motion end identification flag FmE (FmS=0, FmE=0) (step 401). The motion start identification flag FmS and the motion end identification flag FmE are employed for determination as to whether or not to perform state transition, and the quantization control part 124 does not let the quantization state make transition in the direction improving the picture quality if the motion start identification flag FmS is set, i.e., if FmS=1, and does not let the quantization state make transition in the direction deteriorating the picture quality if the motion end identification flag FmE is set, i.e., if FmE=1. As to the processing of state transition, it is similar to that in the conventional coding method except that whether or not to perform state transition is decided with reference to the motion start identification flag FmS and the motion end identification flag FmE, and hence detailed description is omitted.

Then, the motion vector absolute sum storage part 192 stores the sum Smv1 of the absolute values of motion vectors in one picture frame precedent by two frames as a motion vector absolute value sum Smv2 (step 402). Then, it stores the sum Smv of the absolute values of motion vectors in one picture frame precedent by one frame as the motion vector absolute value sum Smv1 (step 403). Thereafter the motion vector absolute value sum calculation part 193 calculates the sum Smv of the absolute values of the motion vectors of the currently coded one picture frame (current frame) The motion vector absolute value sum Smv of the current frame, the motion vector absolute value sum Smv1 precedent by one frame and the motion vector absolute value sum Smv2 precedent by two frames are employed for detection of the motion start and the motion end of the object as follows, and it is determined as the motion end of the object if the motion vector absolute value sum gradually reduces from Smv2 to Smv, while it is determined as the motion start of the object if the motion vector absolute value sum gradually increases from Smv2 to Smv.

Namely, the motion end detection part 195 first determines whether or not the motion vector absolute value sum Smv of the current frame is greater than the threshold Th_M (step 405). If Smv>Th_M, as the result, whether or not it is the motion end is detected through steps 406 to 408. Namely, the motion end detection part 195 determines, if there are relations Smv2>Smv1>Smv between the motion vector absolute value sum Smv2 precedent by two frames, the motion vector absolute value sum Smv1 precedent by one frame and the motion vector absolute value sum Smv of the current frame, that the object is in the motion end state and sets the motion end identification flag FmE (FmE=1) (step 408). Thereafter the process advances to a step 409. If Smv≦Th_M, as the result of the determination at the step 405, the process directly advances to the step 409.

At the step 409, the motion start detection part 194 determines whether or not the motion vector absolute value sum Smv of the current frame is greater than the threshold Th_M. If as the result Smv>Th_M, whether or not it is the motion start is determined through steps 409 to 412. Namely, the motion start detection part 194 determines, if there are relations Smv2<Smv1<Smv between the motion vector absolute value sum Smv2 precedent by two frames, the motion vector absolute value sum Smv1 precedent by one frame and the motion vector absolute value sum Smv of the current frame, that the object is in the motion start state and sets the motion start identification flag FmS (FmS=1)

(step 412). Thus, the motion start end detection processing for one picture frame terminates. If Smv≦Th_M, as the result of the determination at th step 409, the motion start end detection processing for one picture frame is directly ended.

When, in this manner, the motion start end detection processing for one picture frame terminates, the motion start identification flag FmS and the motion end identification flag FmE are inputted respectively as the motion start information Ims and the motion end information Ime in the quantization control part 124. The quantization control part 124 decides the quantization characteristic employed for coding the next picture frame with the information. At this time, the quantization control part 124 does not change the quantization characteristic in the direction deteriorating the picture quality but keeps the same at q(s) if the motion end identification flag FmE is set (FmE=1) even if the generated information amount Aig resulting from coding one picture frame with the quantization characteristic q(s) exceeds the upper bound threshold Th_U. Further, the quantization control part 124 does not change the quantization characteristic in the direction improving the picture quality but keeps the same at q(s) if the motion start identification flag FmS is set (FmS=1) even if the generated information amount Aig resulting from coding one picture frame with the quantization characteristic q(s) falls below the lower bound threshold Th_L. With the quantization characteristic set in this manner, coding for the next one picture frame is performed by the video coding part 125. Thereafter on the basis of the motion vector information Imv obtained in the coding, motion start end detection processing for the next one picture frame is performed similarly to the above (steps 401 to 412).

According to the aforementioned sixth embodiment, the motion start state and the motion end state of the object are detected for not changing the quantization characteristic in the direction improving the picture quality in the motion start state of the object while not changing the quantization characteristic in the direction deteriorating the picture quality in the motion end state of the object, whereby fluctuation of the generated information amount resulting from coding the picture frame can be suppressed and coding control of excellent precision can be performed. Further, the sixth embodiment employs for detection of the motion start state and the motion end state of the object the motion vectors employed for INTER coding, whereby it is not necessary to newly provide processing for detection of the motion start state of the object and the motion end state of the object but reduction of coding processing ability can be prevented, as the result, low power consumption and cost reduction can be realized.

While the aforementioned embodiment employs for detection of the motion start state and the motion end state of the object the sums Smv2, Smv1 and Smv of the absolute values of the motion vectors of three frames to make determination, the frames for detection of the motion start state and the motion end state of the object are not restricted to three frames but may be not less than three frames or not more than three frames. When detecting the motion start state and the motion end state of the object through not less than three frames, the motion start state and the motion end state of the object can be more correctly detected. When detecting the motion start state and the motion end state of the object through not more than three frames, on the other hand, coding control responsive to the motion of the object can be quickly performed.

In the aforementioned sixth embodiment, the sum of the absolute values of motion vectors of one picture frame is used as the motion quantity for detecting the motion start state and the motion end state of the object. Instead, on the basis of comparison the absolute values of motion vectors for the respective macroblocks forming the picture frame with a previously set threshold, the number of macroblocks whose absolute value of motion vector exceed the threshold may be considered the motion quantity. In this case, the motion start state and the motion end state of the object can be more accurately detected.

In the aforementioned embodiment, it is assumed that throughput in transmission of coded video data is constant. When applying the coding control method of this embodiment to such a system that throughput fluctuates owing to repeat control due to a transmission error, coding control responsive to the throughput can be performed by adding processing of calculating average throughput Tp_av from an information amount transmitted within a predetermined constant time and correcting the upper bound threshold Th_U and the lower bound threshold Th_L through the following equations. In other words, assuming in this case that corrected values of the upper bound threshold and the lower bound threshold are expressed as Th_Ua and Th_La respectively, $$Th\_Ua = Th\_U \times Tp\_av$$

$$Th\_La = Th\_L \times Tp\_av$$

$$(0 \leq Tp\_av \leq 1)$$

Seventh Embodiment

Figure 29:
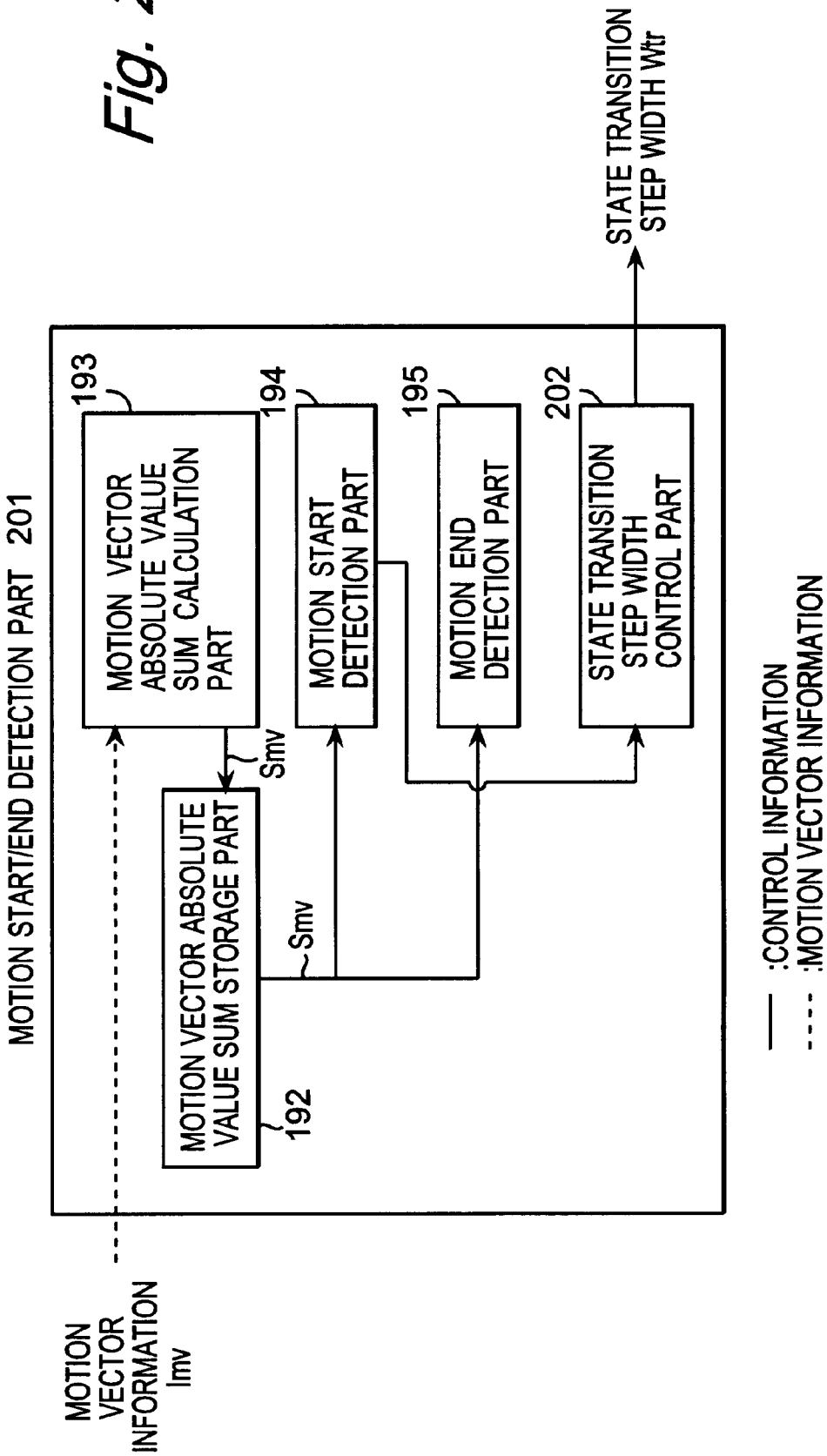
FIG. 29 is a block diagram showing the structure of a motion start/end detection part in the coding control apparatus according to the seventh embodiment.

FIG. 29 is a block diagram showing the structure of a motion start/end detection part in a coding control apparatus according to this embodiment, i.e., a block diagram showing another exemplary structure of the motion start/end detection part 123 in the coding control apparatus 122 shown in FIG. 21 (hereinafter it is assumed that a motion start/end detection part of this structure is denoted by reference numeral "201"). This motion start/end detection part 201 comprises, similarly to the motion start/end detection part 191 in the sixth embodiment, a motion vector absolute value sum calculation part 193, a motion vector absolute value sum storage part 192, a motion start detection part 194 and a motion end detection part 195, and inputs from a video coding part 125 a signal indicating motion vector information Imv of one picture frame. In addition to these, the motion start/end detection part 201 comprises a state transition step width control part 202, and differs in this point from the motion start/end detection part 191 in the sixth embodiment.

This state transition step width control part 202 outputs, on the basis of a detection result by the motion start detection part 194 and a detection result by the motion end detection part 195, a state transition step width Wtr. The remaining elements other than this state transition step width control part 202 in the motion start/end detection part 202 are similar to those in the sixth embodiment, and the same reference numbers are assigned to the same parts.

Figure 15:
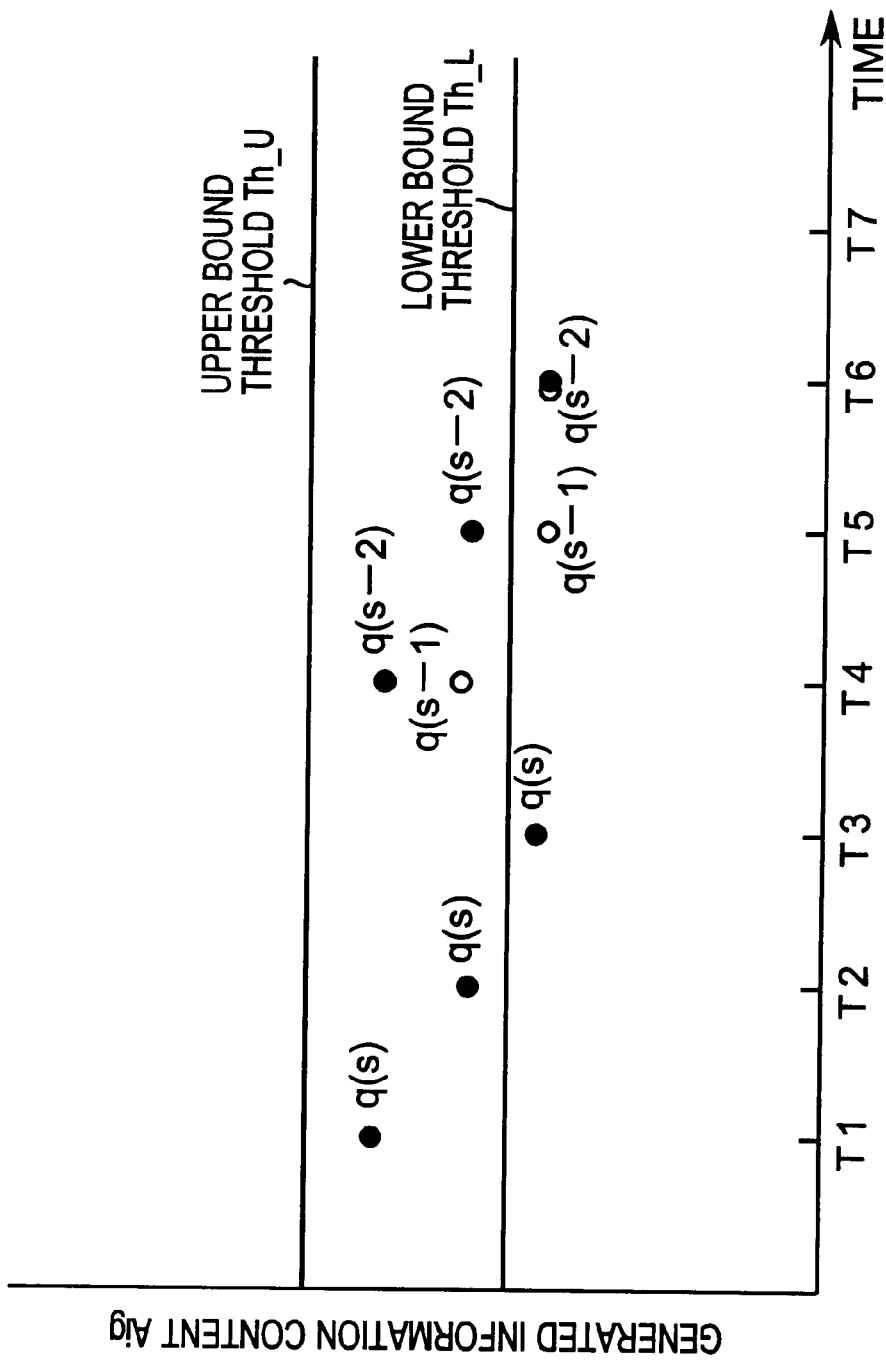
FIG. 15 is a diagram for illustrating an operation of a coding control apparatus according to a seventh embodiment of the present invention in the motion end state of the object.
Figure 16:
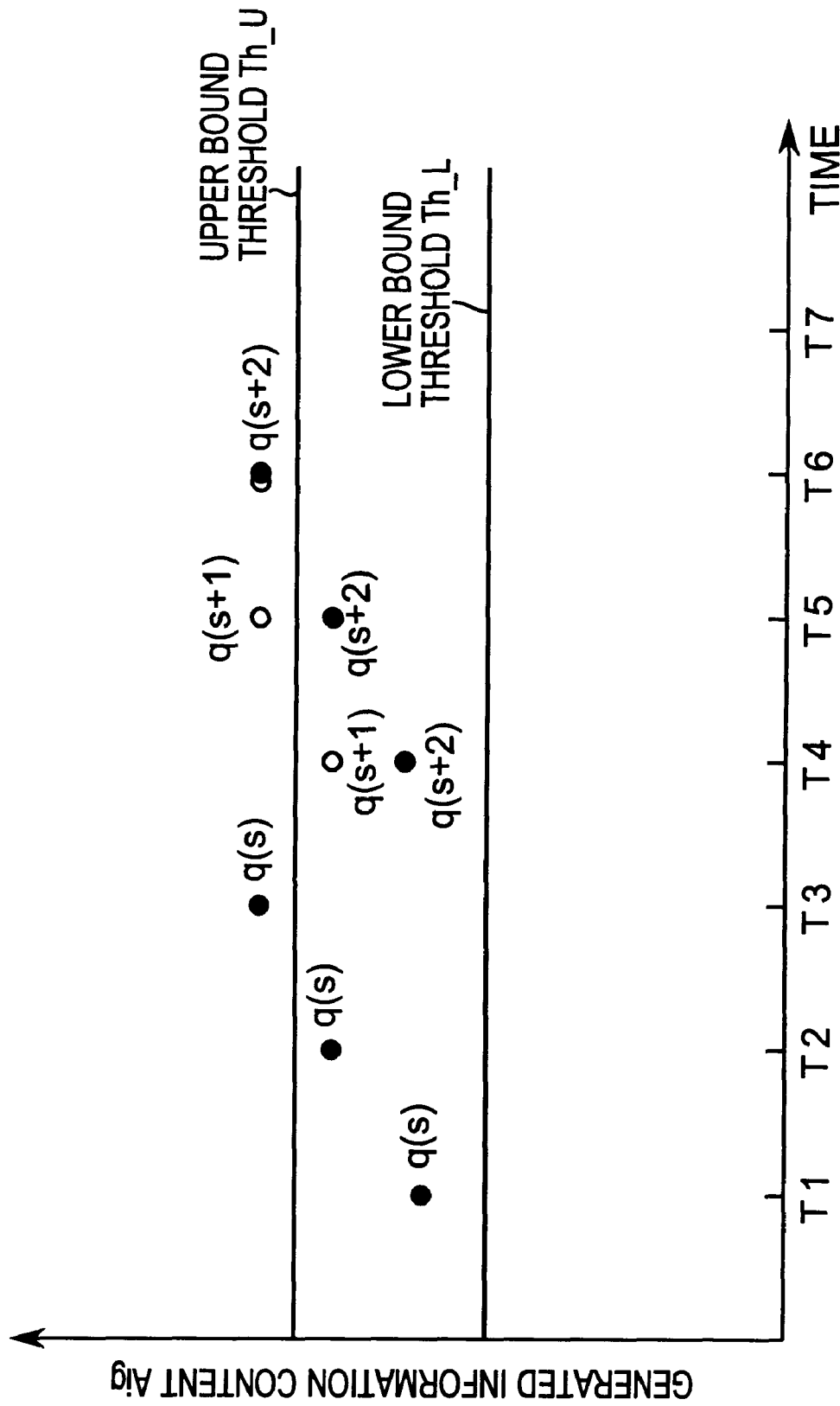
FIG. 16 is a diagram for illustrating an operation of the coding control apparatus according to the seventh embodiment in the motion start state of the object.

An exemplary operation of the coding control apparatus according to this embodiment comprising the aforementioned motion start/end detection part 201 is now described with reference to FIG. 15 and FIG. 16. Referring to these FIG. 16 and FIG. 17, black circles "●" indicate a generated information amount resulting from coding a picture frame in the case of using the coding control apparatus according to this embodiment, while white circles "○" indicate a generated information amount resulting from coding a picture frame in the case of using the conventional coding control apparatus.

First, coding control in the motion end state of the object is described with reference to FIG. 15. It is assumed that, at a time T1, a generated information amount Aig when coding one picture frame with a quantization characteristic q(s) has been between an upper bound threshold Th_U and a lower bound threshold Th_L. At this time, the generated information amount Aig is located between the upper bound threshold Th_U and the lower bound threshold Th_L, and hence a next frame is coded while the quantization characteristic is left intact. Similarly, also at a time T2, the generated information amount Aig when performing coding with the quantization characteristic q(s) is located between the upper bound threshold Th_U and the lower bound threshold Th_L, and hence the next frame is coded while the quantization characteristic is left intact. At a time T3, the generated information amount Aig resulting from performing coding with the quantization characteristic q(s) is below the lower bound threshold Th_L, and hence the state of the quantization characteristic makes transition to a state improving the picture quality. At this time, in the conventional coding control apparatus, the state of the quantization characteristic makes stepwise transition to the state improving the picture quality, and hence the quantization characteristic is set at q(s−1). In the motion end state of the object, however, inter-frame correlation rises and the generated information amount gradually reduces, and hence, as shown by "○" at a time T4, the generated information amount reaches a value around the lower bound threshold Th_L. Similarly, the generated information amount gradually reduces due to the motion end state of the object, and hence, at a time T5, it again falls below the lower bound threshold Th_L, the state of the quantization characteristic makes transition to the state improving the picture quality, and the quantization characteristic is set at q(s−2). However, due to the reduction of the generated information amount by the motion end state of the object, the generated information amount falls below the lower bound threshold Th_L also at a time T6. Thus, when performing coding control by the conventional coding control apparatus in the motion end state of the object, coding is so performed that the generated information amount is around the lower bound threshold Th_L. Thus, the transmission band cannot be effectively used in transmission of coded data of a motion picture, while improvement of the picture quality in the motion end state of the object is delayed.

When, at the time T3, the generated information amount Aig falls below the lower bound threshold Th_L, therefore, the coding control apparatus of this embodiment increases the state transition step width Wtr which is a step width in state transition of the quantization characteristic, and sets the quantization characteristic at q(s−2). Thus, as shown by "●" at the time T4, the generated information amount reaches a value, separating from the lower bound threshold Th_L, between the upper bound threshold value Th_U and the lower bound threshold Th_L. At times T5 and T6, operations similar to those at the times T2 and T3 are performed respectively.

Coding control in the motion start state of the object is now described with reference to FIG. 16. It is assumed that, at a time T1, a generated information amount Aig when coding one picture frame with the quantization characteristic q(s) has been between the upper bound threshold Th_U and the lower bound threshold Th_L. At this time, the generated information amount Aig is located between the upper bound threshold Th_U and the lower bound threshold Th_L, and hence a next frame is coded while the quantization characteristic is left intact. Also at a time T2, the generated information amount Aig when performing coding with the quantization characteristic q(s) is located between the upper bound threshold Th_U and the lower bound threshold Th_L, and hence the next frame is coded while the quantization characteristic is left intact. At a time T3, the generated information amount Aig resulting from performing coding with the quantization characteristic q(s) exceeds the upper bound threshold Th_U, and hence the state of the quantization characteristic makes transition to a state deteriorating the picture quality. In the conventional coding control apparatus, the state of the quantization characteristic makes stepwise transition to the state deteriorating the picture quality, and hence the quantization characteristic is set at q(s+1). In the motion start state of the object, however, inter-frame correlation lowers and the generated information amount gradually increases, and hence, as shown by "○" at a time T4, the generated information amount reaches a value around the upper bound threshold Th_U. Similarly, the generated information amount gradually increases due to the motion start state of the object, and hence, at a time T5, it again exceeds the upper bound threshold Th_U, the state of the quantization characteristic makes transition to the state deteriorating the picture quality, and the quantization characteristic is set at q(s+2). However, due to the increase of the generated information amount by the motion start state of the object, the generated information amount exceeds the upper bound threshold Th_U also at a time T6. Thus, when performing coding control by the conventional coding control apparatus in the motion start state of the object, coding is so performed that the generated information amount is around the upper bound threshold Th_U. Thus, frame skip is caused and it follows that a motion picture having stiff motion is obtained.

When, at the timing of the time T3, the generated information amount exceeds the upper bound threshold Th_U, therefore, the coding control apparatus according to this embodiment increases the state transition step width Wtr which is the step width in state transition of the quantization characteristic, and sets the quantization characteristic at q(s+2). Thus, as shown by "●" at the time T4, the generated information amount reaches a value, separating from the upper bound threshold Th_U, between the upper bound threshold value Th_U and the lower bound threshold Th_L. At the timings of T5 and T6, operations similar to T2 and T3 are performed.

Figure 17:
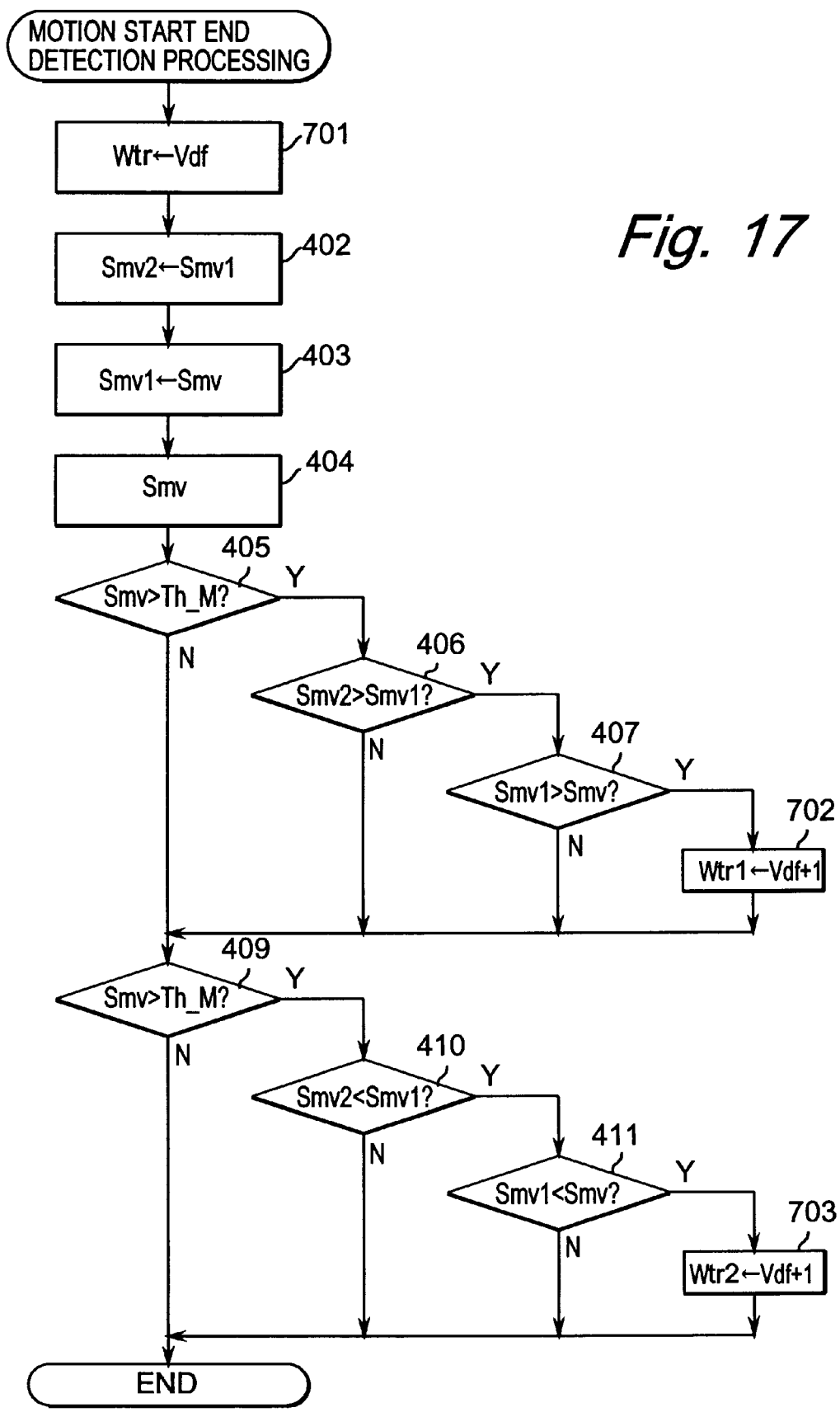
FIG. 17 is a flow chart showing motion start end detection processing by the coding control apparatus according to the seventh embodiment.

FIG. 17 is a flow chart showing motion start end detection processing for one picture frame by the coding control apparatus according to this embodiment performing the aforementioned operation. In this motion start end detection processing, the step 401 in the motion start end detection processing (FIG. 14) in the sixth embodiment is replaced by a step 701, the step 408 is replaced by a step 702, and the step 412 is replaced by a step 703 respectively. The remaining steps 402 to 407 and 409 and 411 are similar to the motion start motion end detection processing in the sixth embodiment and similar processing is performed, and hence description is omitted.

At the step 701, the state transition step width control part 202 sets the first state transition step width Wtr1 and the second state transition step width Wtr2 at a default Vdf. The default Vdf is a state transition step width when in a state other than the motion start state and the motion end state of the object the generated information amount exceeds the upper bound threshold Th_U or falls below the lower bound threshold Th_L. In general, in order to make transition to the state of an adjacent quantization characteristic, "1" is set as the default Vdf.

Also in the motion start end detection processing of this embodiment, when a motion vector absolute value sum Smv of a current frame is greater than the threshold Th_M and there are relations Smv2>Smv1>Smv between a motion vector absolute value sum Smv2 precedent by two frames, a motion vector absolute value sum Smv1 precedent by one frame and the motion vector absolute value sum Smv of the current frame, the motion end detection part 195 determines that the object is in the motion end state (steps 405 to 407). In this case, at the step 702, the first state transition step width control part 202 sets the first state transition step width Wtr1 and the second state transition step width Wtr2 at "default Vdf+1".

Also in this embodiment, when there are relations Smv>Th_M and Smv2<Smv1<Smv, the motion start detection part 194 determines that the object is in the motion start state (steps 409 to 411). In this case, at the step 703, the state transition step width control part 202 sets the state transition step width Wtr at "default Vdf+1". By this setting, motion start end detection processing for one picture frame terminates.

When, in this manner, the motion start end detection processing for one picture frame terminates, the first state transition step width Wtr1 and the second state transition step width Wtr2 are inputted in the quantization control part 124. The quantization control part 124 employs these first state transition step width Wtr1 and the second state transition step width Wtr2 and decides the quantization characteristic employed for coding the next picture frame. At this time, the quantization control part 124 lets, if the generated information amount Aig resulting from coding one picture frame with the quantization characteristic q(s) exceeds the upper bound threshold Th_U, the state of the quantization characteristic make transition by the second state transition step width Wtr2 in the direction deteriorating the picture quality, while, if the generated information amount Aig falls below the lower bound threshold Th_L, it lets the state of the quantization characteristic make transition by the second state transition step width Wtr2 in the direction improving the picture quality. Namely, the quantization control part 124 sets the quantization characteristic employed for coding the next picture frame at q(s+Wtr2) if Aig>Th_U, and sets the same at q(s−Wtr2) if Aig<Th_L.

According to the aforementioned seventh embodiment, when the motion start state or the motion end state of the object is detected, the state transition step width increases. In the motion end state of the object, therefore, no coding is performed in the state where the generated information amount resulting from coding reaches a value around the lower bound threshold Th_L, the transmission band can be efficiently used, and the picture quality can be quickly improved. In the motion start state of the object, no coding is performed in the state where the generated information amount resulting from coding reaches a value around the upper bound threshold Th_U, and a smooth motion picture having no frame skip can be obtained.

While it is assumed in the aforementioned embodiment that the first state transition step width Wtr1 and the second state transition step width Wtr2 is identical in the case of detecting the motion start state of the object and in the case of detecting the motion end state of the object, different state transition step widths may be employed in the motion start state of the object and the motion end state of the object. In this case, coding control of higher precision can be performed.

While, in the aforementioned embodiment, the first state transition step width Wtr1 and the second state transition step width Wtr2 is set at "default Vdf+1" in the case of detecting the motion start state of the object and the case of detecting the motion end state of the object, the same may be set not less than this, or may be set not more than this. When increasing the state transition step width Wtr, the speed of coding control can be improved.

Further, the state transition step width Wtr may vary during coding in accordance with the motion characteristic of the object or the characteristic of the picture. In this case, coding control responsive to the motion characteristic of the object or the picture characteristic such as the background changing from moment to moment can be performed.

In the aforementioned seventh embodiment, the sum of the absolute values of motion vectors of one picture frame is used as the motion quantity for detecting the motion start state and the motion end state of the object. Instead, on the basis of comparison the absolute values of motion vectors for the respective macroblocks forming the picture frame with a previously set threshold, the number of macroblocks whose absolute value of motion vector exceed the threshold may be considered the motion quantity. In this case, the motion start state and the motion end state of the object can be more accurately detected.

Eighth Embodiment

Figure 30:
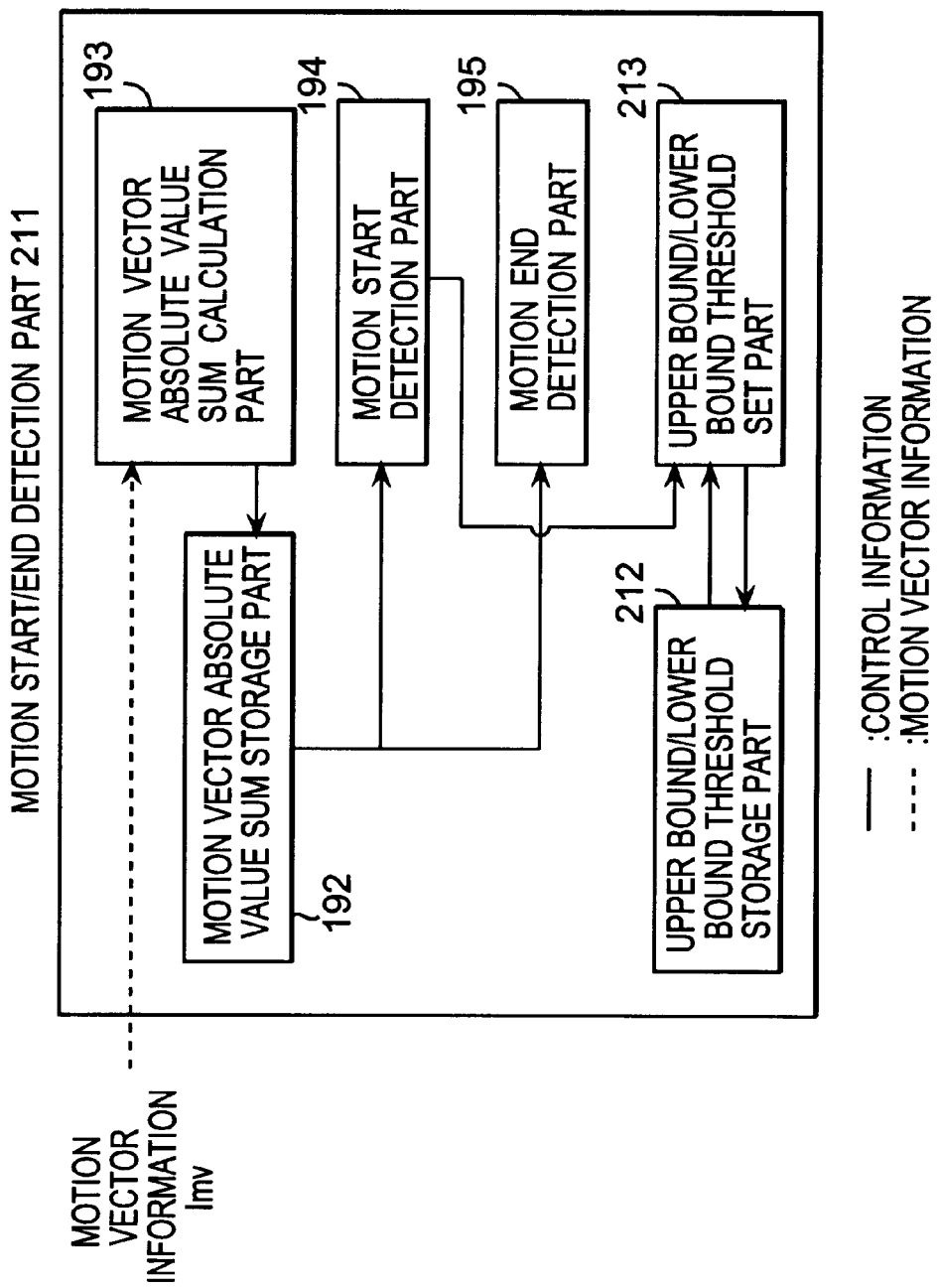
FIG. 30 is a block diagram showing the structure of a motion start/end detection part in the coding control apparatus according to the eighth embodiment.
Figure 32:
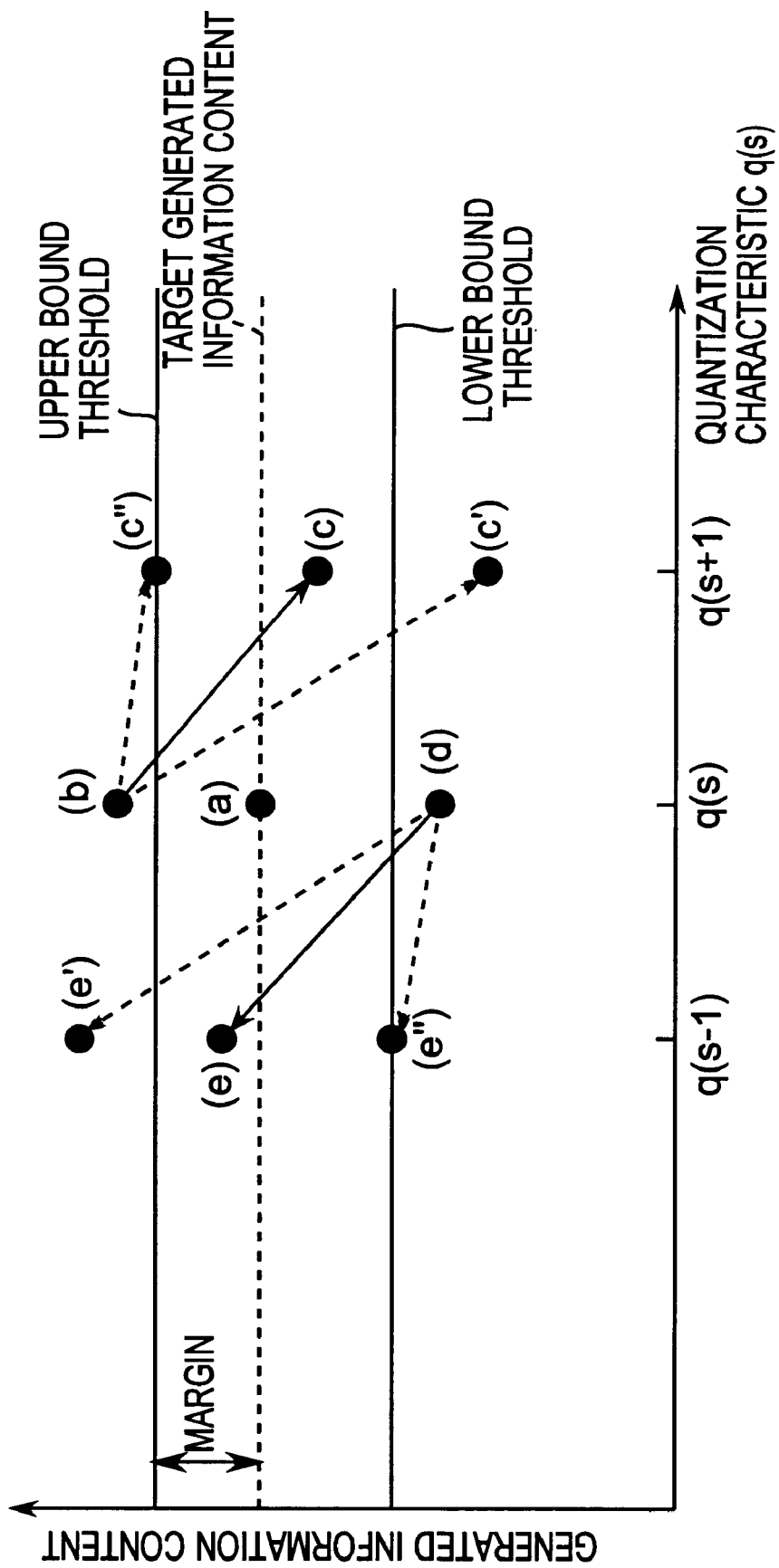
FIG. 32 is a diagram for illustrating a conventional coding control method setting a quantization characteristic every frame.
Figure 33A:
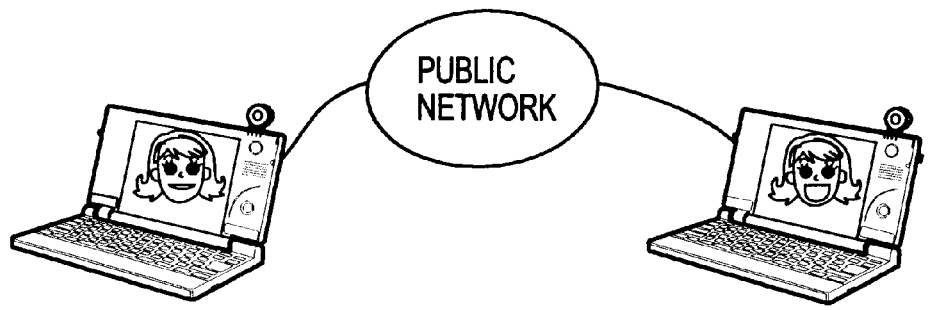
FIGS. 33A to 33C are system diagrams for illustrating application fields of the present invention.
Figure 33B:
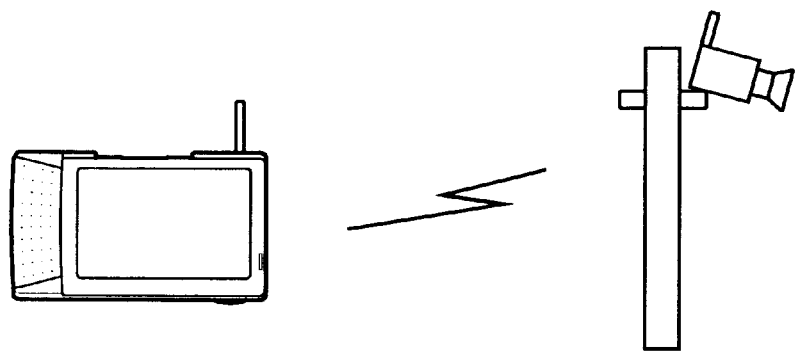
Figure 33C:
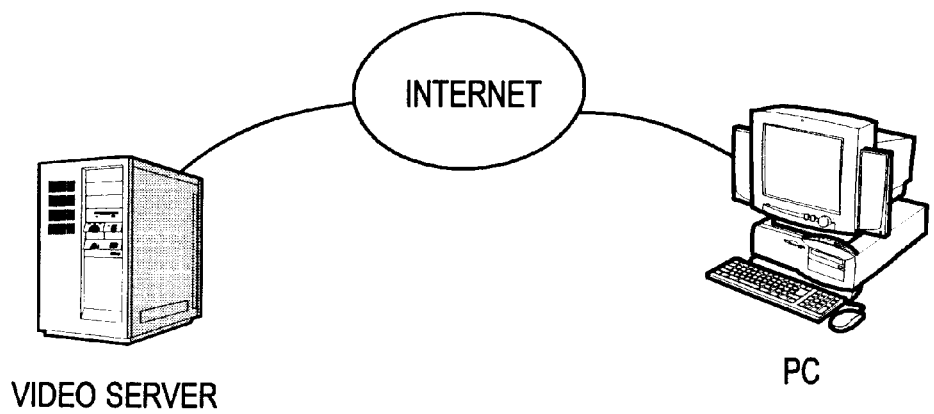

FIG. 30 is a block diagram showing the structure of a motion start/end detection part in a coding control apparatus according to this embodiment, i.e., a block diagram showing a third exemplary structure of the motion start/end detection part 123 in the coding control apparatus 122 shown in FIG. 21 (it is hereinafter assumed that the motion start/end detection part of this structure is denoted by reference numeral "211") This motion start/end detection part 211 comprises, similarly to the motion start/end detection part 201 in the seventh embodiment, a motion vector absolute value sum calculation part 193, a motion vector absolute sum storage part 192, a motion start detection part 194 and a motion end detection part 195, and inputs from a video coding part 125 a signal indicating motion vector information Imv of one picture frame. In addition to these, the motion start/end detection part 211 comprises an upper bound/lower bound threshold storage part 212, while comprising, in place of the state transition step width control part 202 in the motion start/end detection part 201 of the seventh embodiment, an upper bound/lower bound threshold set part 213.

The upper bound/lower bound threshold storage part 212 holds the already described upper bound threshold value Th_U and lower bound threshold value Th_L used for decision of a quantization characteristic by a quantization control part 124. The upper bound/lower bound threshold set part 213 changes, on the basis of a detection result by the motion start detection part 194 and a detection result by the motion end detection part 195, the upper bound threshold Th_U and the lower bound threshold Th_L held in the upper bound/lower bound threshold storage part 212 at need. The remaining elements other than the upper bound/lower bound threshold storage part 212 and the upper bound/lower bound threshold set part 213 in the motion start/end detection part 211 are similar to those in the seventh embodiment, and the same reference numerals are assigned to the same parts.

Figure 18:
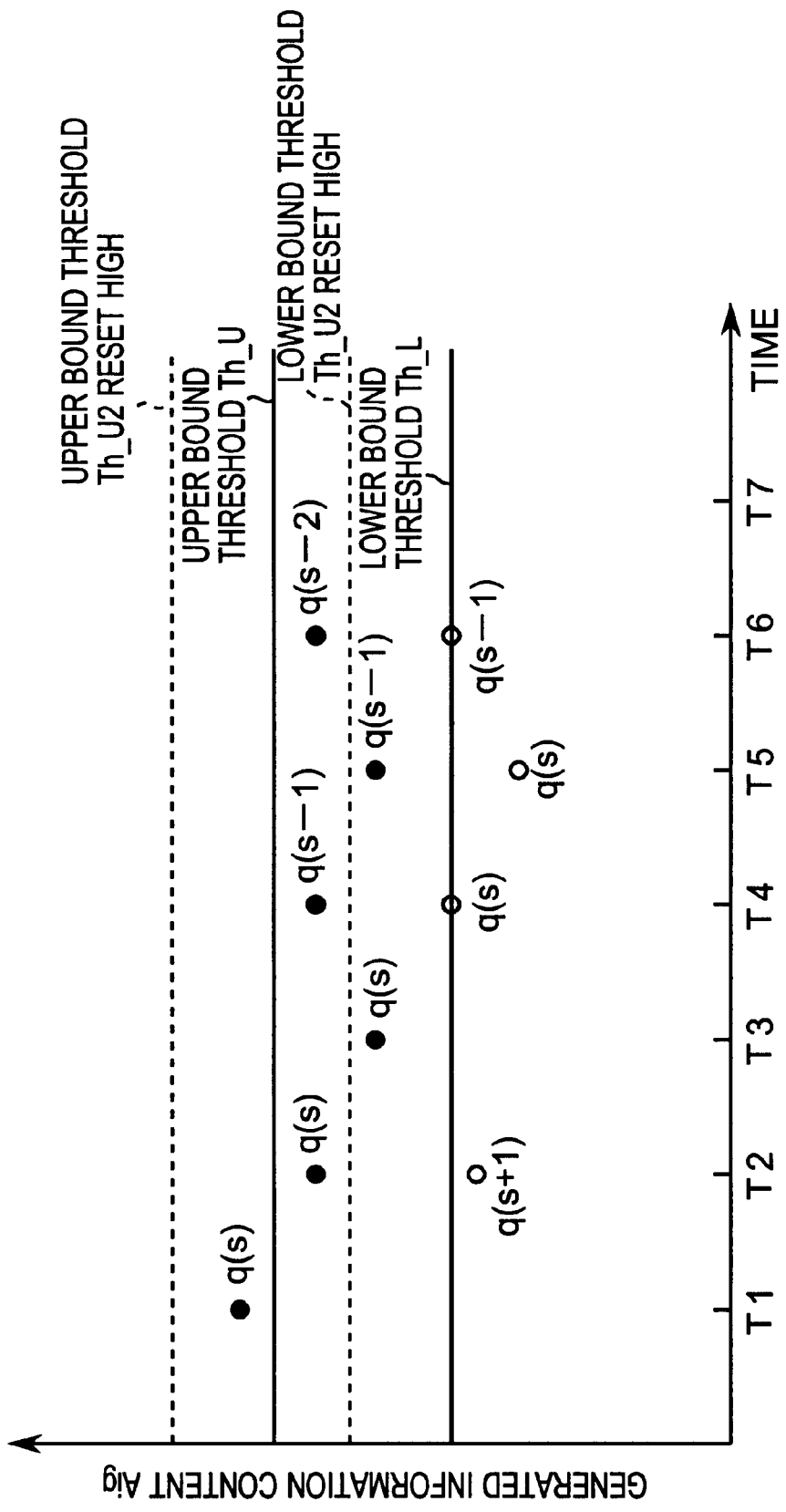
FIG. 18 is a diagram for illustrating an operation of a coding control apparatus according to an eighth embodiment of the present invention in the motion end state of the object.
Figure 19:
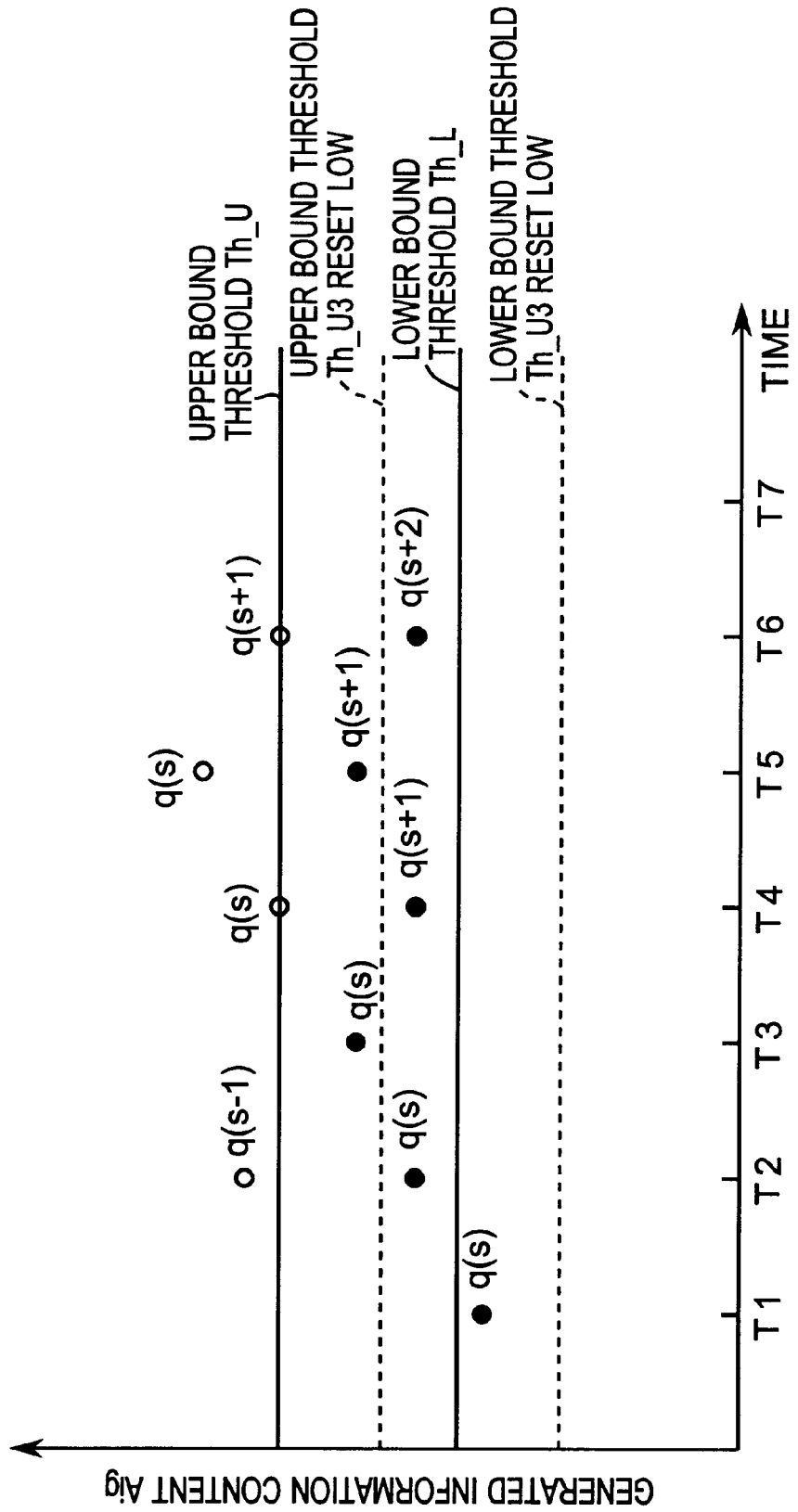
FIG. 19 is a diagram for illustrating an operation of the coding control apparatus according to the eighth embodiment in the motion start state of the object.

An exemplary operation of the coding control apparatus according to this embodiment comprising the aforementioned motion start/end detection part 211 is now described with reference to FIG. 18 and FIG. 19. In these FIG. 18 and FIG. 19, black circles "●" indicate a generated information amount resulting from coding one picture frame in the case of using the coding control apparatus according to this embodiment, and white circles "○" indicate a generated information amount resulting from coding one picture frame in the case of using the conventional coding control apparatus.

Coding control in a motion end state of an object is now described with reference to FIG. 18. It is assumed that, at a time T1, a generated information amount Aig when coding one picture frame with a quantization characteristic q(s) has exceeded the upper bound threshold Th_U. At this time, in the conventional coding control apparatus, the generated information amount is in excess of the upper bound threshold Th_U and hence the quantization characteristic for a next picture frame is changed in a direction deteriorating the picture quality and set at q(s+1). In the motion end state, however, inter-frame correlation rises and the generated information amount gradually reduces, and hence, if the quantization characteristic is changed in the direction deteriorating the picture quality, the generated information amount extremely reduces due to the synergistic effect of the inter-frame correlation and the quantization characteristic, and, as shown by "○" at a time T2, the generated information amount falls below the lower bound threshold Th_L. Therefore, when detecting the motion end state of the object, the coding control apparatus of this embodiment resets the upper bound threshold Th_U high and also resets the lower bound threshold Th_L high. At the time T1, therefore, the generated information amount has exceeded the ordinary upper bound threshold Th_U but is not in excess of the reset upper bound threshold Th_U2, and hence, at a time T2, the picture frame is coded with the quantization characteristic q(s). At the time T2, the generated information amount when performing coding with the quantization characteristic q(s) is between the reset upper bound threshold Th_U2 and lower bound threshold Th_L2, and hence the quantization characteristic q(s) is maintained. At a time T3, the generated information amount when performing coding with the quantization characteristic q(s) is below the reset lower bound threshold Th_L2, and hence the quantization characteristic is changed in a direction improving the picture quality and set at q(s−1).

In the conventional coding control apparatus, as shown by "○" at a time T5, the quantization characteristic is changed in the direction improving the picture quality and set at q(s−1) when the generated information amount falls below the ordinary lower bound threshold Th_L. In the motion end state of the object, however, the generated information amount reduces and hence, as shown by "○" at a time T6, it follows that coding is so performed that the generated information amount reaches a value around the ordinary lower bound threshold Th_L, and a transmission band cannot be efficiently used in transmission of coded data of a motion picture. On the contrary, the coding control apparatus according to this embodiment performs, as to after the time T4, an operation similar to the times T2 and T3. If at each time a background having a fine pattern hidden behind the object appears due to movement of the object, for example, and as the result the generated information amount exceeds the reset upper bound threshold Th_U2, the quantization characteristic is changed in the direction deteriorating the picture quality.

Coding control in the motion start state of the object is now described with reference to FIG. 19. It is assumed that, at a time T1, a generated information amount when coding one picture frame with the quantization characteristic q(s) has fallen below the lower bound threshold Th_L. At this time, in the conventional coding control apparatus, the generated information amount is below the lower bound threshold Th_L and hence the quantization characteristic for the next picture frame is changed in the direction improving the picture quality and set at q(s−1). In the motion start state of the object, however, inter-frame correlation lowers and the generated information amount gradually increases, and hence, if the quantization characteristic is changed in the direction improving the picture quality, the generated information amount extremely increases due to the synergistic effect of the inter-frame correlation and the quantization characteristic, to exceed the upper bound threshold Th_U as shown by "○" at a time T2. When detecting the motion start state of the object, therefore, the coding control apparatus according to this embodiment resets the upper bound threshold Th_U low and also resets the lower bound threshold Th_L low. Therefore, at the time T1, the generated information amount has been below the ordinary lower bound threshold Th_L at the time T1 but is not below the reset lower bound threshold Th=L3, and hence, at the time T2, the picture frame is coded at the time T2 with the quantization characteristic q(s). At the time T2, the generated information amount when performing coding with the quantization characteristic q(s) is between the reset upper bound threshold Th_U3 and lower bound threshold Th_L3, and hence the quantization characteristic q(s) is maintained. At the time T3, the generated information amount when performing coding with the quantization characteristic q(s) is in excess of the reset upper bound threshold Th_U3, and hence the quantization characteristic is changed in the direction deteriorating the picture quality and set at q(s+1).

In the conventional coding control apparatus, as shown by "○" at a time T5, the quantization characteristic is changed in the direction deteriorating the picture quality when the generated information amount exceeds the ordinary upper bound threshold Th_U and set at q(s+1). In the motion start state of the object, however, the generated information amount increases and hence, as shown by "○" at a time T6, it follows that coding is so performed that the generated information amount reaches a value around the ordinary upper bound threshold Th_U and frame skip readily takes place. On the contrary, the coding control apparatus according to this embodiment performs, as to after the time T4, operations similar to the times T2 and T3. If at each time the generated information amount falls below the reset lower bound threshold Th_L3due to appearance of a background having a coarse pattern hidden behind the object by movement of the object, for example, the quantization characteristic is changed in the direction improving the picture quality.

Figure 20:
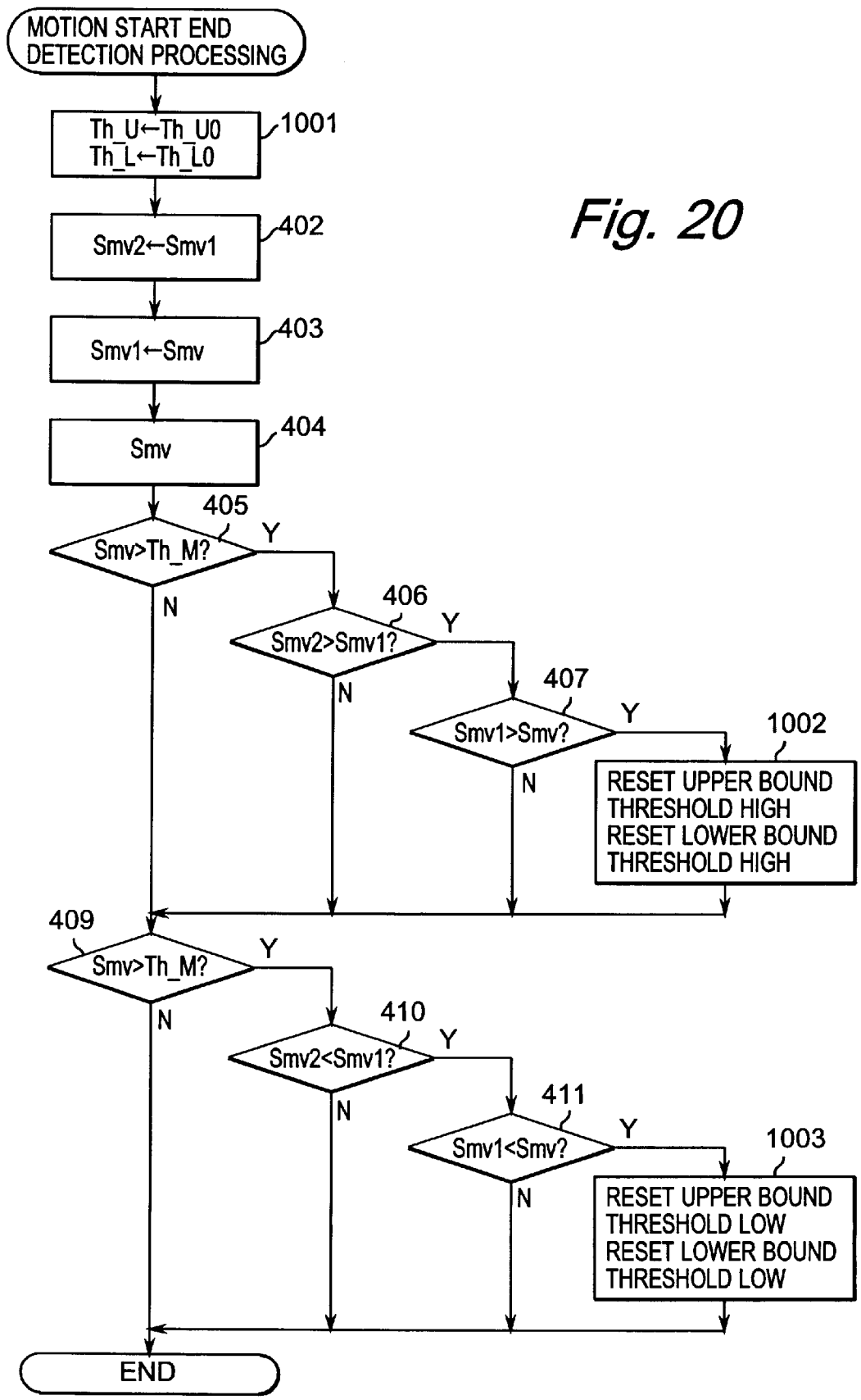
FIG. 20 is a flow chart showing motion start end detection processing by the coding control apparatus according to the eighth embodiment.

FIG. 20 is a flow chart showing motion start end detection processing for one picture frame according to the coding control apparatus performing the aforementioned operation. In this motion start end detection processing, the step 401 in the motion start end detection processing (FIG. 14) in the sixth embodiment is replaced by a step 1001, the step 408 is replaced by a step 1002 and the step 412 is replaced by a step 1003 respectively. The remaining steps 402 to 407 and 409 to 411 are similar to the motion start end detection processing in the sixth embodiment and similar processing is performed, and hence description is omitted.

At the step 1001, the upper bound/lower bound threshold set part 213 sets the upper bound threshold Th_U at a default upper bound threshold Th_U0 and the lower bound threshold Th_L at a default lower bound threshold Th_L0 respectively. The default upper bound threshold Th_U0 and lower bound threshold Th_L0 are an upper bound threshold and a lower bound threshold previously set every state respectively.

Also in the motion start end detection processing of this embodiment, when a motion vector absolute value sum Smv of a current frame is greater than a threshold Th_M and there are relations Smv2>Smv1>Smv between a motion vector absolute value sum Smv2 precedent by two frames, a motion vector absolute value sum Smv1 precedent by one frame and the motion vector absolute value sum Smv of the current frame, the motion end detection part 195 determines that the object is in the motion end state (steps 405 to 407). In this case, at the step 1002, the upper bound/lower bound threshold set part 213 resets the upper bound threshold Th_U higher than the default upper bound threshold Th_U0 (Th_U=Th_U2>Th_U0), and resets the lower bound threshold Th_L higher than the default lower bound threshold Th_L0 (Th_L=Th_L2>Th_L0). It is assumed that the reset values Th_U2 and Th_L2 are prepared as predetermined values.

Also in this embodiment, when there are relations Smv>Th_M and Smv2<Smv1<Smv, the motion start detection part 194 determines that the object is in the motion start state (steps 409 to 411). In this case, at the step 1003, the upper bound/lower bound threshold set part 213 resets the upper bound threshold Th_U lower than the default upper bound threshold Th_U0 (Th_U=Th_U3<Th_U0), and resets the lower bound threshold Th_L lower than the default lower bound threshold Th_L0 (Th_L=Th_L3<Th_L0). It is assumed that the reset values Th_U3 and Th_L3 are also prepared as predetermined values. By this resetting at the step 1003, motion start end detection processing for one frame terminates.

When, in this manner, the motion start end detection processing for one picture frame terminates, if the upper bound threshold Th_U or the lower bound threshold Th_L is reset by the upper bound/lower bound threshold set part 213, the reset threshold is held in the upper bound/lower bound threshold storage part 212. The quantization coding part 124 decides the quantization characteristic employed for coding the next picture frame with the upper bound threshold Th_U or the lower bound threshold Th_L held in the upper bound/lower bound threshold storage part 212. Concretely, it decides the quantization characteristic by the coding control processing shown in FIG. 3, for example.

As hereinabove described, the eighth embodiment detects the motion start state or the motion end state of the object, and resets the upper bound threshold Th_U and the lower bound threshold Th_L low in the motion start state of the object, and resets the upper bound threshold Th_U and the lower bound threshold Th_L high in the motion end state of the object, thereby letting the state of the quantization characteristic hardly make transition in the direction improving the picture quality in the motion start state of the object while letting the state of the quantization characteristic hardly make transition in the direction deteriorating the picture quality in the motion end state of the object. Thus, fluctuation of the generated information amount resulting from coding the picture frame is suppressed and coding control of excellent precision can be performed. Further, the eighth embodiment uses for detection of the motion start state and the motion end state of the object the motion vectors employed for INTER coding, whereby it is not necessary to newly provide processing for detection of the motion start state of the object and the motion end state of the object, and consequently reduction of the coding processing ability can be prevented and low power consumption and cost reduction can be attained.

While it is assumed in the aforementioned eighth embodiment that the upper bound threshold Th_U and the lower bound threshold Th_L in the case of detecting the motion start state of the object and the case of detecting the motion end state of the object are predetermined values, these reset values may be changed during coding in response to the motion characteristic of the object or the characteristic of the picture. In this case, coding control responsive to the motion characteristic or the picture characteristic of the background or the like changing from moment to moment can be performed.

In the aforementioned eighth embodiment, the sum of the absolute values of motion vectors of one picture frame is used as the motion quantity for detecting the motion start state and the motion end state of the object. Instead, on the basis of comparison the absolute values of motion vectors for the respective macroblocks forming the picture frame with a previously set threshold, the number of macroblocks whose absolute value of motion vector exceed the threshold may be considered the motion quantity. In this case, the motion start state and the motion end state of the object can be more accurately detected.

While the invention has been described in detail, the foregoing description is in all aspects illustrative and not restrictive. It is understood that numerous other modifications and variations can be devised without departing from the scope of the invention.

What is claimed is:

1. A coding control apparatus for deciding, in coding data formed by a plurality of frames on the basis of a generated information amount being the amount of coded data generated by coding one frame or an occupied amount in a smoothing buffer used for transmission of data after coding, a quantization characteristic employed for coding a next frame to said one frame, comprising:

comparison means for comparing said generated information amount or said occupied amount with a predetermined value; and quantization characteristic decision means for dividing each frame of said plurality of frames previously into a plurality of areas while classifying said plurality of areas in said each frame into a first group and a second group for setting in response to a comparison result by said comparison means the same quantization characteristic for said first and second groups or setting one of most approximate two different quantization characteristics for said first group and the other one for said second group respectively.

2. The coding control apparatus in accordance with claim 1, wherein said plurality of areas are so classified that the amount of coded data obtained by coding said first group and the amount of coded data obtained by coding said second group balance with each other previously into said first and second groups.

3. The coding control apparatus in accordance with claim 2, wherein said areas belonging to said first group and said areas belonging to said second group are spatially alternately arranged.

4. The coding control apparatus in accordance with claim 2, further comprising time axis placement control means for outputting a signal instructing an operation of exchanging a quantization characteristic to be set for said first group and a quantization characteristic to be set for said second group every prescribed time as a time axis placement control signal, wherein said quantization characteristic decision means sets in response to said time axis placement control signal quantization characteristics for said first and second groups.

5. The coding control apparatus in accordance with claim 2, wherein, in the case that forced updating by INTRA coding is performed on any one area among said plurality of areas when coding said data formed by said plurality of frames, said quantization characteristic decision means classifies, among said plurality of areas, an area to be subjected to forced updating to said first group, while classifying the remaining areas other than said area to be subjected to forced updating to said second group.

6. The coding control apparatus in accordance with claim 5, wherein said quantization characteristic decision means sets quantization characteristics for said first and second groups so that quantization precision for coding areas to be subjected to forced updating among said plurality of areas is higher or equal to quantization precision for coding the remaining areas other than said areas to be subjected to forced updating.

7. The coding control apparatus in accordance with claim 1, wherein said areas are groups of blocks.

8. The coding control apparatus in accordance with claim 1, further comprising:

transition step width control means for comparing previously set upper bound and lower bound transition step width control thresholds with said generated information amount; wherein quantization characteristic set means sets, on the basis of a comparison result by said transition step width control means, said quantization characteristic employed for coding said next frame so that, when said generated information amount is less than said upper bound transition step width control threshold and greater than said lower bound transition step width control threshold, only a quantization characteristic having been set for one of said first and second groups is changed or quantization characteristics for said first and second groups are maintained, and sets said quantization characteristic employed for coding said next frame so that, when said generated information amount is greater than said upper bound transition step width control threshold or less than said lower bound transition step width control threshold, both said quantization characteristics having been set for said first and second groups are changed.

9. A coding control apparatus deciding, in coding motion picture data formed by a plurality of frames on the basis of a generated information amount being the amount of coded data generated by coding one frame or an occupied amount in a smoothing buffer used for transmission of data after coding, a quantization characteristic employed for coding a next frame to said one frame, comprising:

detection means for detecting, on the basis of a motion quantity of an object expressed by said motion picture, data either one or both of a motion start state of said object and a motion end state of said object; and quantization control means for deciding, on the basis of said generated information amount or said occupied amount and a detection result by said detection means, said quantization characteristic employed for coding said next frame.

10. The coding control apparatus in accordance with claim 9, wherein said quantization control means suppresses on the basis of said detection result by said detection means change of a quantization characteristic employed for frame coding in said motion start state of said object in a direction improving the picture quality.

11. The coding control apparatus in accordance with claim 9, wherein said quantization control means suppresses, on the basis of said detection result by said detection means, change of a quantization characteristic employed for frame coding in said motion end state of said object in a direction deteriorating the picture quality.

12. The coding control apparatus in accordance with claim 9, wherein said quantization control means changes, in the case of changing said quantization characteristic in a direction deteriorating the picture quality, when said motion start state of said object is detected by said detection means, said quantization characteristic more largely than that when said motion start state of said object is not detected.

13. The coding control apparatus in accordance with claim 9, wherein said quantization control means changes, in the case of changing said quantization characteristic in a direction improving the picture quality, when said motion end state of said object is detected by said detection means, said quantization characteristic more largely than that when said motion end state of said object is not detected.

14. The coding control apparatus in accordance with claim 9, further comprising:

storage means for storing an upper bound threshold and a lower bound threshold for said generated information amount or said occupied amount; and threshold set means for setting, on the basis of said detection result by said detection means, said upper bound threshold in a period of said motion start state of said object at a value lower than said upper bound threshold in a period other than said period of said motion start state of said object, wherein said quantization control means changes said quantization characteristic in a direction deteriorating the picture quality when said generated information amount or said occupied amount exceeds said upper bound threshold and changes said quantization characteristic in a direction improving the picture quality when said generated information amount or said occupied amount falls below said lower bound threshold.

15. The coding control apparatus in accordance with claim 9, further comprising:

storage means for storing an upper bound threshold and a lower bound threshold for said generated information amount or said occupied amount; and threshold set means for setting on the basis of said detection result by said detection means said lower bound threshold in a period of said motion start state of said object at a value lower than said lower bound threshold in a period other than said period of said motion start state of said object, wherein said quantization control means changes said quantization characteristic in a direction deteriorating the picture quality when said generated information amount or said occupied amount exceeds said upper bound threshold and changes said quantization characteristic in a direction improving the picture quality when said generated information amount or said occupied amount falls below said lower bound threshold.

16. The coding control apparatus in accordance with claim 9, further comprising:

storage means for storing an upper bound threshold and a lower bound threshold for said generated information amount or said occupied amount; and threshold set means for setting on the basis of said detection result by said detection means said upper bound threshold in a period of said motion end state of said object at a value higher than said upper bound threshold in a period other than said period of said motion end state of said object, wherein said quantization control means changes said quantization characteristic in a direction deteriorating the picture quality when said generated information amount or said occupied amount exceeds said upper bound threshold and changes said quantization characteristic in a direction improving the picture quality when said generated information amount or said occupied amount falls below said lower bound threshold.

17. The coding control apparatus in accordance with claim 9, further comprising:

storage means for storing an upper bound threshold and a lower bound threshold for said generated information amount or said occupied amount; and threshold set means for setting, on the basis of said detection result by said detection means, said lower bound threshold in a period of said motion end state of said object at a value higher than said lower bound threshold in a period other than said period of said motion end state of said object, wherein said quantization control means changes said quantization characteristic in a direction deteriorating the picture quality when said generated information amount or said occupied amount exceeds said upper bound threshold and changes said quantization characteristic in a direction improving the picture quality when said generated information amount or said occupied amount falls below said lower bound threshold.

18. The coding control apparatus in accordance with claim 9, wherein said detection means detects such a state that a motion quantity of said object is greater than a previously set threshold and said motion quantity of said object continuously increases as motion start state of said object.

19. The coding control apparatus in accordance with claim 9, wherein said detection means detects such a state that a motion quantity of said object is greater than a previously set threshold and said motion quantity of said object continuously reduces as motion end state of said object.

20. The coding control apparatus in accordance with claim 9, wherein said motion quantity is the sum of absolute values of motion vectors being coded data when performing motion prediction inter-frame differential coding.

21. A coding control method employed in coding data formed by a plurality of frames on the basis of a generated information amount being the amount of coded data generated by coding one frame or an occupied amount in a smoothing buffer used for transmission of data after coding, for deciding a quantization characteristic employed for coding a next frame to said one frame, comprising:

a comparison step of comparing said generated information amount or said occupied amount with a predetermined value; and a quantization characteristic decision step of dividing each frame of said plurality of frames previously into a plurality of areas while classifying said plurality of areas in said each frame into a first group and a second group for in response to a comparison result by said comparison step setting the same quantization characteristic for said first and second groups or setting one of most approximate two different quantization characteristics for said first group and the other one for said second group respectively.

22. The coding control method in accordance with claim 21, wherein said plurality of areas are classified previously into said first and second groups so that the amount of coded data obtained by coding said first group and the amount of coded data obtained by coding said second group can balance with each other.

23. The coding control method in accordance with claim 22, wherein said areas belonging to said first group and areas belonging to said second group are spatially alternately arranged.

24. The coding control method in accordance with claim 22, wherein a quantization characteristic to be set for said first group and a quantization characteristic to be set for said second group are exchanged every prescribed time in said quantization characteristic decision steps.

25. The coding control method in accordance with claim 22, wherein, in case that forced updating by INTRA coding is performed on any one area among said plurality of areas when coding said data formed by said plurality of frames, an area to be subjected to forced updating among said plurality of areas is classified to said first group, while the remaining areas other than said area to be subjected to forced updating is classified to said second group in said quantization characteristic decision steps.

26. The coding control method in accordance with claim 21, wherein said areas are groups of blocks.

27. The coding control method in accordance with claim 21, comprising:

a second comparison step of comparing previously set upper bound and lower bound transition step width control thresholds with said generated information amount; wherein in quantization characteristic decision, on the basis of a comparison result by said second comparison step, said quantization characteristic employed for coding said next frame is set so that, when said generated information amount is less than said upper bound transition step width control threshold and greater than said lower bound transition step width control threshold, only a quantization characteristic having been set for one of said first and second groups is changed or quantization characteristics for said first and second groups are maintained, and said quantization characteristic employed for coding said next frame is set so that, when said generated information amount is greater than said upper bound transition step width control threshold or less than said lower bound transition step width control threshold, both said quantization characteristics having been set for said first and second groups are changed.

28. A coding control method for deciding, in coding motion picture data formed by a plurality of frames, on the basis of a generated information amount being the amount of coded data generated by coding one frame or an occupied amount in a smoothing buffer used for transmission of data after coding, a quantization characteristic employed for coding a next frame to said one frame, comprising:

a detection step of detecting, on the basis of a motion quantity of an object expressed by said motion picture data, either one or both of a motion start state of said object and a motion end state of said object; and quantization control step of deciding, on the basis of said generated information amount or said occupied amount and a detection result by said detection step, said quantization characteristic employed for coding said next frame.

29. The coding control method in accordance with claim 28, wherein, on the basis of said detection result by said detection step, change of a quantization characteristic employed for frame coding in said motion start state of said object in a direction improving the picture quality is suppressed in said quantization control step.

30. The coding control method in accordance with claim 28, wherein, on the basis of said detection result by said detection step, change of a quantization characteristic employed for frame coding in said motion end state of said object in a direction deteriorating the picture quality is suppressed in said quantization control step.

31. The coding control method in accordance with claim 28, wherein, in the case of changing said quantization characteristic in a direction deteriorating the picture quality, when said motion start state of said object is detected by said detection step, said quantization characteristic is changed more largely than that when said motion start state of said object is not detected in said quantization control step.

32. The coding control method in accordance with claim 28, wherein, in the case of changing said quantization characteristic in a direction improving the picture quality, when said motion end state of said object is detected by said detection step, said quantization characteristic is changed more largely than that when said motion end state of said object is not detected in said quantization control step.

33. The coding control method in accordance with claim 28, further comprising:
  a first set step of setting an upper bound threshold and a lower bound threshold for said generated information amount or said occupied amount; and
  a second set step of setting, on the basis of said detection result by said detection steps, said upper bound threshold in a period of said motion start state of said object at a value lower than said upper bound threshold in a period other than said period of said motion start state of said object, wherein
    said quantization characteristic is changed in a direction deteriorating the picture quality when said generated information amount or said occupied amount exceeds said upper bound threshold and said quantization characteristic is changed in a direction improving the picture quality when said generated information amount or said occupied amount falls below said lower bound threshold in said quantization control step.

34. The coding control method in accordance with claim 28, further comprising:
  a first set step of setting an upper bound threshold and a lower bound threshold for said generated information amount or said occupied amount; and
  a second set step of setting again, on the basis of said detection result by said detection step, said lower bound threshold in a period of said motion start state of said object at a value lower than said lower bound threshold in a period other than said period of said motion start state of said object, wherein
    said quantization characteristic is changed in a direction deteriorating the picture quality when said generated information amount or said occupied amount exceeds said upper bound threshold and said quantization characteristic is changed in a direction improving the picture quality when said generated information amount or said occupied amount falls below said lower bound threshold in said quantization control step.

35. The coding control method in accordance with claim 28, further comprising:
  a first set step of setting an upper bound threshold and a lower bound threshold for said generated information amount or said occupied amount; and
  a third set step of setting again, on the basis of said detection result by said detection step, said upper bound threshold in a period of said motion end state of said object at a value higher than said upper bound threshold in a period other than said period of said motion end state of said object, wherein
    said quantization characteristic is changed in a direction deteriorating the picture quality when said generated information amount or said occupied amount exceeds said upper bound threshold and said quantization characteristic is changed in a direction improving the picture quality when said generated information amount or said occupied amount falls below said lower bound threshold in said quantization control step.

36. The coding control method in accordance with claim 28, further comprising:
  a first set step of setting an upper bound threshold and a lower bound threshold for said generated information amount or said occupied amount; and
  a third set step of setting, on the basis of said detection result by said detection step, said lower bound threshold in a period of said motion end state of said object at a value higher than said lower bound threshold in a period other than said period of said motion end state of said object, wherein
    said quantization characteristic is changed in a direction deteriorating the picture quality when said generated information amount or said occupied amount exceeds said upper bound threshold and said quantization characteristic is changed in a direction improving the picture quality when said generated information amount or said occupied amount falls below said lower bound threshold in said quantization control step.

37. The coding control method in accordance with claim 28, wherein such a state that a motion quantity of said object is greater than a previously set threshold and said motion quantity of said object continuously increases is detected as said motion start state of said object in said detection step.

38. The coding control method in accordance with claim 28, wherein such a state that a motion quantity of said object is greater than a previously set threshold and said motion quantity of said object continuously reduces is detected as said motion end state of said object in said detection steps.

39. The coding control method in accordance with claim 28, wherein said motion quantity is the sum of absolute values of motion vectors being coded data when performing motion prediction inter-frame differential coding.

40. A storage medium containing a coding control program deciding, in coding data formed by a plurality of frames on the basis of a generated information amount which is the amount of coded data generated by coding one frame or an occupied amount in a smoothing buffer used for transmission of data after coding, a quantization characteristic employed in coding of a next frame to the one frame as a program executed in a computer unit, wherein said coding control program implementing on the computer unit an operating environment which includes:
  comparison step of comparing the generated information amount or the occupied amount with a predetermined value, and
  quantization characteristic decision step of dividing each frame of the plurality of frames previously into a plurality of areas while classifying the plurality of areas in each frame into a first group and a second group for setting in response to a comparison result by the comparison steps the same quantization characteristic for the first and second groups or setting one of most approximate two different quantization characteristics for the first group and the other one for the second group respectively.

41. A storage medium containing a coding control program deciding, in coding motion picture data formed by a plurality of frames on the basis of a generated information amount which is the amount of coded data generated by coding one frame or an occupied amount in a smoothing buffer used for transmission of data after coding, a quantization characteristic employed in coding of a next frame to the one frame as a program executed in a computer unit, wherein said coding control program implementing on the computer unit an operating environment which includes:

a detection step of detecting, on the basis of a motion quantity of an object expressed by the motion picture data, either one or both of a motion start state of the object and a motion end state of the object, and a quantization control step of deciding, on the basis of the generated information amount or the occupied amount and a detection result by said detection step, the quantization characteristic employed in coding of the next frame.

42. The coding control apparatus in accordance with claim 9, wherein said motion quantity is the sum of the macroblocks whose absolute values of motion vectors being coded data at the time of motion prediction inter-frame differential coding performed to the respective macroblocks exceed a previously set threshold.

43. The coding control method in accordance with claim 28, wherein said motion quantity is the sum of the macroblocks whose absolute values of motion vectors being coded data at the time of motion prediction inter-frame differential coding performed to the respective macroblocks exceed a previously set threshold.

* * * * *